US008948564B1

(12) United States Patent
Sherman et al.

(10) Patent No.: US 8,948,564 B1
(45) Date of Patent: Feb. 3, 2015

(54) SPLINE LAMP WITH OPPOSING LIGHT SOURCE ORIENTATION

(75) Inventors: Matthew Sherman, Sharon, MA (US); David Morin, Salem, NH (US); Timothy Kelly, Brookline, MA (US); Terence Yeo, Boston, MA (US)

(73) Assignee: Fusion Uptix, Inc., Woburn, MA (US)

( * ) Notice: Subject to any disclaimer, the term of this patent is extended or adjusted under 35 U.S.C. 154(b) by 230 days.

(21) Appl. No.: 13/602,063

(22) Filed: Aug. 31, 2012

Related U.S. Application Data

(63) Continuation-in-part of application No. 13/539,297, filed on Jun. 29, 2012, which is a continuation-in-part of application No. 13/459,249, filed on Apr. 29, 2012, now Pat. No. 8,750,671, which is a continuation-in-part of application No. 12/762,253, filed on Apr. 16, 2010, now Pat. No. 8,761,565.

(60) Provisional application No. 61/170,038, filed on Apr. 16, 2009, provisional application No. 61/529,901, filed on Aug. 31, 2011.

(51) Int. Cl.
*G02B 6/43* (2006.01)
*F21V 7/04* (2006.01)
*F21V 5/04* (2006.01)
*F21V 11/00* (2006.01)

(52) U.S. Cl.
CPC .................................... *F21V 11/00* (2013.01)
USPC ............................ 385/146; 362/335; 362/628

(58) Field of Classification Search
None
See application file for complete search history.

(56) References Cited

U.S. PATENT DOCUMENTS

2008/0170392 A1* 7/2008 Speier et al. ................. 362/227

* cited by examiner

*Primary Examiner* — Jerry Rahll

(57) ABSTRACT

Optical and thermal splines are integrated in the external envelope of a non-planar lamp allowing the optical output of discrete light sources such as LEDs to be distributed for uniform output and the achievement of desired light distributions such as omnidirectional output. Opposing orientation of light sources is utilized to create integrated optical and thermal splines for improved thermal and optical performance.

16 Claims, 39 Drawing Sheets

(a) Incandescent A-Lamp Distribution (b) LED Replacement Lamp "Cosine" Distribution (c) LED Replacement Lamp "Spiky" Distribution (d) LED Replacement Lamp "Semi-Diffuse" Distribution

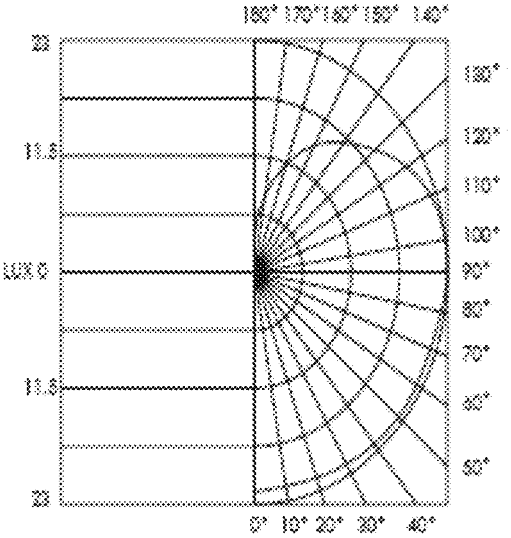
40W INCANDESCENT LIGHT DISTRIBUTION
MEASUREMENT TAKEN @ 1METER AWAY
FIG. 40
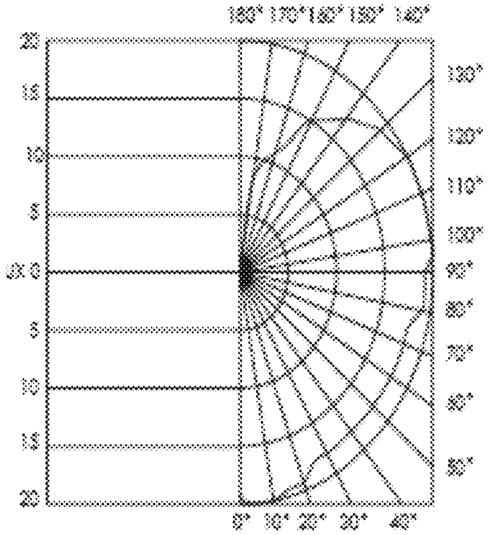
ARCUATE SECTION LIGHT DISTRIBUTION
FIG. 41
| | Measured Light Distribution (Lux) | | | |
|---|---|---|---|---|
| | A19 40W Incandescent | | A19 LED Prototype | |
| Angle | Lux | % of max | Lux | % of max |
| 0 | 20 | 100% | 11 | 100% |
| 25 | 20 | 100% | 11 | 100% |
| 50 | 22 | 110% | 12 | 109% |
| 75 | 22 | 110% | 12 | 109% |
| 90 | 23 | 115% | 11 | 100% |
| 115 | 22 | 110% | 10 | 91% |
| 135 | 18 | 90% | 9 | 82% |
| 150 | 14 | 70% | 7 | 64% |
| 175 | 5 | 25% | 6 | 55% |
FIG. 42

SPLINE LAMP WITH OPPOSING LIGHT SOURCE ORIENTATION

RELATED APPLICATIONS

This application is a continuation-in-part of non-provisional application Ser. No. 13/539,297 “Spline Optic and Lighting Device” filed Jun. 29, 2012, itself a continuation-in-part of non-provisional application Ser. No. 13/459,249 “LED Light Bulb with Omnidirectional Output” filed Apr. 29, 2012, itself a continuation-in-part of non-provisional application Ser. No. 12/762,253 “Arcuate lightguide and light emitting device comprising the same” filed Apr. 16, 2010 which claims the benefit of provisional patent application Ser. No. 61/170,038 titled “Arcuate lightguide and light emitting device comprising the same” filed Apr. 16, 2009. Additionally, this application claims the benefit of provisional filing 61529901 titled “Lamp with furcated optical path” filed Aug. 31, 2011.

FIELD OF THE INVENTION

The invention relates generally to optical components, light emitting devices, LED lamps, and bulbs for illumination applications.

BACKGROUND OF THE INVENTION

Compared to conventional incandescent lamps, light emitting diode (LED) lamps offer significant advantage in luminous efficacy leading to significant energy saving in most applications. However, due to differences in light distribution and non-uniformities in brightness and color, typical LED lamps are not well suited for direct replacement of incandescent lamps. A-type designates a very common standard light bulb shape also known as an Edison bulb. These lamps have a very wide angle and largely omnidirectional light distribution which is difficult to achieve with typical LED lamps. A19 is a particular size of “A” type lamp which is particularly prevalent in residential lighting. In addition to A (Arbitrary) type other common types of omnidirectional incandescent lamps are B (Bulged), C (Conical), F (Flame). All of these are commonly described as omnidirectional and have uniform intensity over a wide angular range. However, these lamps are not literally 100% omnidirectional as the bulb geometry of all these types connects to a base which typically blocks light transmission.

SUMMARY OF THE INVENTION

Optical and thermal splines are integrated in the external envelope of a non-planar lamp allowing the optical output of discrete light sources such as LEDs to be distributed for uniform output and the achievement of desired light distributions such as omnidirectional output. Opposing orientation of light sources is utilized to create integrated optical and thermal splines for improved thermal and optical performance.

LED lamps and lighting system embodiments are suitable for replacement of existing incandescent lamps or for new applications.

BRIEF DESCRIPTION OF THE DRAWINGS

FIG. 40 shows typical light distribution of a 40 W incandescent A-lamp.

FIG. 41 shows the measured intensity vs. angle light distribution of a fabricated prototype A type LED lamp embodiment.

FIG. 42 is a table comparing the light distributions of a 40 W A-lamp vs. the measured light distribution of a fabricated prototype A type LED lamp embodiment. It compares the data of FIG. 40 and FIG. 41.

DETAILED DESCRIPTION OF THE INVENTION

Figure 1:
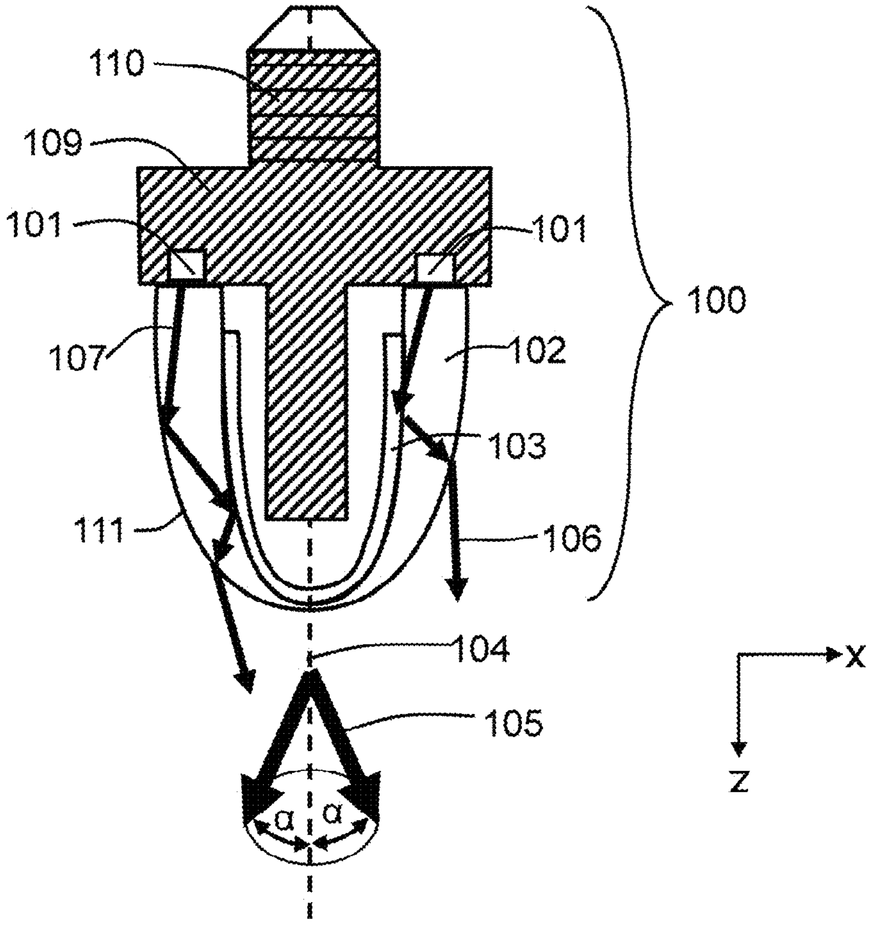
FIG. 1 is a cross-sectional side view of a screw-socket light bulb light emitting device of one embodiment of this invention comprising an arcuate lightguide.

The features and other details of the invention will now be more particularly described with reference to the accompanying drawings, in which embodiments of the inventive subject matter are shown. It will be understood that particular embodiments described herein are shown by way of illustration and not as limitations of the invention. However, this inventive subject matter should not be construed as limited to the embodiments set forth herein. Rather, these embodiments are provided so that this disclosure will be thorough and complete, and will fully convey the scope of the inventive subject matter to those skilled in the art. The principal features of this invention can be employed in various embodiments without departing from the scope of the invention. All parts and percentages are by weight unless otherwise specified. All patent applications and patents referenced herein are incorporated by reference.

The terminology used herein is for the purpose of describing particular embodiments only and is not intended to be limiting of the inventive subject matter. Like numbers refer to like elements throughout. As used herein the term "and/or" includes any and all combinations of one or more of the associated listed items. Also, as used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

DEFINITIONS

For convenience, certain terms used in the specification and examples are collected here.

"Speckle", often referred to also as scintillation, includes the optical interference pattern visible on a scattering element or perceived as coming from or near a scattering element. This can include color or intensity variations within an small area of interest.

"Speckle Contrast" is defined herein to include the ratio of the standard deviation of the intensity fluctuation to the mean intensity over the area of interest.

"Scatter," "Scattering," "Diffuse" and "Diffusing" as defined herein includes light scattering by reflection, refraction or diffraction from particles, surfaces, or layers.

"Optically coupled" is defined herein as including the coupling, attaching or adhering two or more regions or layers such that the intensity of light passing from one region to the other is not substantially reduced due to Fresnel interfacial reflection losses due to differences in refractive indices between the regions. Optical coupling methods include joining two regions having similar refractive indices, or by using an optical adhesive with a refractive index substantially near or in-between at least one of the regions or layers such as Optically Clear Adhesive 8161 from 3M (with a refractive index at 633 nm of 1.474). Examples of optically coupling include lamination using an index-matched optical adhesive such as a pressure sensitive adhesive; lamination using a UV curable transparent adhesive; coating a region or layer onto another region or layer; extruding a region or layer onto another region or layer; or hot lamination using applied pressure to join two or more layers or regions that have substantially close refractive indices. A "substantially close" refractive index difference is about 0.5, 0.4, 0.3 or less, e.g., 0.2 or 0.1.

"Diffusion angle" is a measurement of the angular diffusion profile of the intensity of light within a plane of emitted light. Typically the diffusion angle is defined according to an angular Full-Width-at-Half-Maximum (FWHM) intensity defined by the total angular width at 50% of the maximum intensity of the angular light output profile. For diffusive films and sheets, this is typically measured with collimated light at a specific wavelength or white light incident normal to the film. Typically, for anisotropic diffusers, the FWHM values are specified in two orthogonal planes such as the horizontal and vertical planes orthogonal to the plane of the film. For example, if angles of +35° and −35° were measured to have one-half of the maximum intensity in the horizontal direction, the FWHM diffusion angle in the horizontal direction for the diffuser would be 70°. Similarly, the full-width at one-third maximum and full-width at one-tenth maximum can be measured from the angles at which the intensity is one-third and one-tenth of the maximum light intensity respectively.

The "asymmetry ratio" is the FWHM diffusion angle in a first light exiting plane divided by the FWHM diffusion angle in a second light exiting plane orthogonal to the first, and thus is a measure of the degree of asymmetry between the intensity profile in two orthogonal planes of light exiting the diffuser.

A "spheroidal" or "symmetric" particle includes those substantially resembling a sphere. A spheroidal particle may contain surface incongruities and irregularities but has a generally circular cross-section in substantially all directions. A spheroid is a type of ellipsoid wherein two of the 3 axes are equal. An "asymmetric" particle is referred to here as an "ellipsoidal" particle wherein each of the three axis can be a different length. Ellipsoidal particles can range in shapes from squashed or stretched spheres to very long filament like shapes.

A "spherical" or "symmetric" disperse phase domain includes gaseous voids, micro-bodies, or particles that substantially resemble a sphere. A spherical domain may contain surface incongruities and irregularities but has a generally circular cross-section in substantially all directions. A "spheroid" is a type of ellipsoid wherein two of the three axes are equal. An "asymmetric" domain is referred to here as an "ellipsoidal" domain wherein each of the three axis can be a different length. Typically, ellipsoidal domains resemble squashed or stretched spheres. "Non-spherical" domains include ellipsoidal domains and other domains defined by shapes that do not resemble a sphere such as those that not have constant radii. For example, a non-spherical particle may have finger-like extensions within one plane (amoeba-like) and substantially planar in a perpendicular plane. Also, fibrous domains are also non-spherical disperse phase domains that may have aspect ratios of 10:1, 100:1 or larger.

"Light guide" or "waveguide" refers to a region bounded by the condition that light rays traveling at an angle that is larger than the critical angle will reflect and remain within the region. In a light guide, the light will reflect or TIR (totally internally reflect) if it the angle (α) from the surface normal does not satisfy the condition $$\alpha < \sin^{-1}\left(\frac{n_2}{n_1}\right)$$

where $n_1$ is the refractive index of the medium inside the light guide and $n_2$ is the refractive index of the medium outside the light guide. Typically, $n_2$ is air with a refractive index of $n \approx 1$, however, high and low refractive index materials can be used to achieve light guide regions. The light guide may comprise reflective components such as reflective films, aluminized coatings, surface relief features, and other components that can re-direct or reflect light. The light guide may also contain non-scattering regions such as substrates. Light can be incident on a light guide region from the sides or below and surface relief features or light scattering domains, phases or elements within the region can direct light into larger angles such that it totally internally reflects into smaller angles such that the light escapes the light guide. The light guide does not need to be optically coupled to all of its components to be considered as a light guide. Light may enter from any face (or interfacial refractive index boundary) of the lightguide region and may totally internally reflect from the same or another refractive index interfacial boundary. A region can be functional as a lightguide for purposes illustrated herein as long as the thickness is larger than the wavelength of light of interest. For example, a light guide may be a 5 micron region with 2 micron×3 micron ellipsoidal dispersed particles or it may be a 3 millimeter diffuser plate with 2.5 micron×70 micron dispersed phase particles.

"Planarized," "Planarization," and "Planar," includes creating a substantially flat surface on an element. A flat surface refers to one that does not have a substantially varying surface normal angle across a surface of the element. More than one surface may be planarized. As typically used herein, a material region is combined with a surface of an element that has a surface structure such that the surface of the material opposite the element is substantially planar. Typically, planarized films or components can be easily laminated to another element using pressure sensitive adhesives or hot-lamination without trapping air bubbles of sufficient size to affect the optical performance of the combined element. Coatings, such as thin coatings used in some anti-reflection coatings can be applied more uniformly to planarized elements.

"Arcuate" includes curves or surfaces wherein the surface normal changes angle as one moves along the surface. These can include continuously changing surfaces or curves as well as discretely changing (sharp corners) transitions. The curves may be in more than one plane and may be changing at varying rates in more than one plane. For purposes of this invention, the term arcuate refers to the "macro" changes or the changes in the surface normal angles on the scale along the surface of meters, centimeters, or millimeters. The changes may be regular, random, repeated, semi-random, predetermined spacing or variable with constraining conditions.

"Tapered" refers to the dimensional length, width, height, radius or other dimension decreasing along at least one direction. The dimension may decrease discretely, continuously, regularly, irregularly, randomly, etc. The dimension in two or more directions may decrease along one of the first two or a third direction. The dimensional length does not need to converge to a point in a give plane or direction. The taper may be over a particular region or portion of an element.

When an element such as a layer, region or substrate is referred to herein as being "on" or extending "onto" another element, it can be directly on or extend directly onto the other element or intervening elements may also be present. In contrast, when an element is referred to herein as being "directly on" or extending "directly onto" another element, there are no intervening elements present. Also, when an element is referred to herein as being "connected" or "coupled" to another element, it can be directly connected or coupled to the other element or intervening elements may be present. In contrast, when an element is referred to herein as being "directly connected" or "directly coupled" to another element, there are no intervening elements present.

Although the terms "first", "second", etc. may be used herein to describe various elements, components, regions, layers, sections and/or parameters, these elements, components, regions, layers, sections and/or parameters should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive subject matter.

The terms "sheet," "film," "element," "layer," "component," "section," and "region" are used herein to describe a region of a material, and the use of one term over another should not limit the scope of the embodiment. The use of the term sheet or film is ambiguous, for example, across different industries and something that may be considered a film in one industry may be a sheet in another industry. Similarly, a device may have a scattering region that is a film. Thus, a sheet, film, element, layer, component, section and region discussed in an embodiment of this invention could also be termed a sheet, film, element, layer, component, section or region without departing from the teachings of the present inventive subject matter.

Furthermore, relative terms, such as "lower" or "bottom" and "upper" or "top," may be used herein to describe one element's relationship to another elements as illustrated in the Figures. Such relative terms are intended to encompass different orientations of the device in addition to the orientation depicted in the Figures. For example, if the device in the Figures is turned over, elements described as being on the "lower" side of other elements would then be oriented on "upper" sides of the other elements. The exemplary term "lower", can therefore, encompass both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

The expression "illumination" (or "illuminated"), as used herein when referring to a light source, means that at least some current is being supplied to the solid state light emitter to cause the solid state light emitter to emit at least some light. The expression "illuminated" encompasses situations where the light source emits light continuously or intermittently at a rate such that a human eye would perceive it as emitting light continuously, or where a plurality of solid state light emitters of the same color or different colors are emitting light intermittently and/or alternatingly (with or without overlap in "on" times) in such a way that a human eye would perceive them as emitting light continuously (and, in cases where different colors are emitted, as a mixture of those colors).

A "luminophor" emits light when it becomes excited. The expression "excited" means that at least some electromagnetic radiation (e.g., visible light, UV light or infrared light) is contacting the luminophor, causing the luminophor to emit at least some light. The expression "excited" encompasses situations where the luminophor emits light continuously or intermittently at a rate such that a human eye would perceive it as emitting light continuously, or where a plurality of luminophors of the same color or different colors are emitting light intermittently and/or alternatingly (with or without overlap in "on" times) in such a way that a human eye would perceive them as emitting light continuously (and, in cases where different colors are emitted, as a mixture of those colors).

"A-type" refers to the standard incandescent lamp type also known as an Edison bulb and often referred to as having omnidirectional output. NEMA ANSI C79.1:2002 is a standard which defines the bulb shape of such lamps. Different standards may be used to quantify the "omnidirectional" light distribution requirement. In it's 2009 L Prize competition requirements, The US Department of Energy defined omnidirectional A-typelight distribution as having an even distribution of luminous intensity within the 0° to 150° zone (axially symmetrical) and required that luminous intensity at any angle within this zone shall not differ from the mean luminous intensity for the entire 0° to 150° zone by more than 10%. The ENERGY STAR® Program Requirements for Integral LED Lamps (Eligibility Criteria-Version 1.4) states that omnidirectional, including A-type, LED lamps shall have an even distribution of luminous intensity (candelas) within the 0° to 135° zone (vertically axially symmetrical). Luminous intensity at any angle within this zone shall not differ from the mean luminous intensity for the entire 0° to 135° zone by more than 20%. At least 5% of total flux (lumens) must be emitted in the 135°-180° zone. Distribution shall be vertically symmetrical as measured in three vertical planes at 0°, 45°, and 90°.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein. It will also be appreciated by those of skill in the art that references to a structure or feature that is disposed "adjacent" another feature may have portions that overlap or underlie the adjacent feature.

Light Emitting Device

In one embodiment of this invention, a lightguide is arcuate in shape and comprises at least one of light extraction surface features or a volumetric region. In a further embodiment, the lightguide is tapered in a first direction. In a further embodiment of this invention, a light emitting device comprises a lightguide with at least one quadric surfaces. In one embodiment of this invention, a light emitting device comprises at least one light source and at least one arcuate lightguide. In a further embodiment of this invention, a light emitting device comprises a lightguide with at least one inflection point on the light output surface. In a further embodiment of this invention, a light emitting device comprises two or more lightguides, two or more light sources and a volumetric light scattering region.

In one embodiment of this invention, a light emitting device comprises at least one light source, an arcuate lightguide and a volumetric light scattering element. In another embodiment of this invention, a light emitting device comprises a light source and an arcuate lightguide with light extraction features on the surface or within the volume of the lightguide. In a further embodiment on this invention, a light emitting device comprises a light source, an arcuate lightguide and at least one selected from the group of light reflecting element, volumetric light scattering element, anisotropic light scattering element, surface relief scattering element, light redirecting element, lenticular lens element, light filtering directional control element, electrical components, light scattering lens, additional lightguides, light transmitting regions, light blocking regions, thermal transfer element, adhesives, mounts, housing, control, sensing or power electronics.

In one embodiment of this invention, more than one light emitting modules are combined to form a light emitting device to provide at least one of increased light output, increased light emitting surface area, increased illuminance in a specific region or angular range, increased illuminance or luminance uniformity, additional illumination levels, additional illumination colors, additional functionality of the light emitting device.

Light Emitting Device Application

In one embodiment of this invention, a light emitting device illuminates an object, area, region, person, place, or volume of space. That is, a light emitting device can be a device which illuminates an area or volume, e.g., a structure, a swimming pool or spa, a room, a warehouse, an indicator, a road, a parking lot, a vehicle, signage, e.g., road signs, a billboard, a ship, a toy, a mirror, a vessel, an electronic device, a boat, an aircraft, a stadium, a computer, a remote audio device, a remote video device, a cell phone, a tree, a window, an LCD display, a cave, a tunnel, a yard, a lamppost, or a device or array of devices that illuminate an enclosure, or a device that is used for edge or back-lighting (e.g., back light poster, static display sign, dynamic display sign, other signage, displays, LCD displays), an organic LED light emitting device, bulb replacements (e.g., for replacing AC incandescent lights, low voltage lights, fluorescent lights, etc.), lights used for outdoor lighting, lights used for security lighting, lights used for exterior residential lighting (wall mounts, post/column mounts), luminaires, wall-washers, ceiling fixtures/wall sconces, soffits, valances, coves, recessed fixture, torchiere, pendants, under cabinet lighting, lamps (floor and/or table and/or desk), landscape lighting, yard lights, path lights, track lighting, task lighting, specialty lighting, ceiling fan lighting, archival/art display lighting, street lamps, night lights, high vibration/impact lighting-work lights, etc., mirrors/vanity lighting, flashlights, torches, direct/indirect illumination devices, a combination of two or more of the aforementioned light emitting devices and other similar and commonly used illumination or light emitting devices. The light emitting device may provide direct lighting, indirect lighting, both direct and indirect lighting, shielded lighting, task lighting, down lighting, spot lighting, flood lighting, off-axis lighting, architectural lighting and may be edge-lit type, back-lit or direct-lit type, front-lit or combination thereof. In one embodiment of this invention, the light emitting device is a replacement for a fluorescent bulb. In one embodiment of this invention, the light emitting device is a replacement for a an incandescent screw-type bulb such as an Edison screw-type socket incandescent light bulb. In one embodiment of this invention, the light emitting device comprises configurations and components used for LED replacement of fluorescent bulbs such as described in U.S. Pat. No. 7,049,761, the contents of which are incorporated by reference herein.

In one embodiment of this invention, the light emitting device is multi-functional and can perform multiple functions. For example, an LED and illumination optic light emitting device in a mobile phone may be used as an illuminating flashlight, an autofocus flash for a built-in camera, and a flash for the digital photograph. In another example, the light emitting device may provide illumination as well as provide information. For example, a dynamic sign (such as a digital sign with LEDs or with an LCD) or static display sign may provide information as well as illumination. The light emitting device can provide functions in addition to illumination by adding additional elements such as fans, CD racks, security alarms, emergency lighting electronics, mirrors, emergency exit signs, entertainment or disco lights. A light emitting device may comprise other elements not specifically described herein that may be understood to those in the field of illumination, optical signal communication, sign and display backlighting industries and lighting industry to facilitate or enhance the illumination or communication function or provide a specific function known to be achievable in combination with illumination.

The light emitting device may further comprise electrical elements to provide power, control or other electrical based functions such as wires, sockets, switches, ballasts, connectors, circuitry, sensors, or power generation elements such as batteries, solar panels, turbines, etc. It can contain optical elements to direct or spread the light such as diffusers, prismatic elements, substrates, lightguides, light redirecting elements, light transmitting materials, reflectors, reflective elements, louvers, flutes, elevating prisms, depressing prisms, female prisms, scattering elements, diffusive housings, support elements and other housing elements which can include assembly components such as screws, clips, connectors, and protective elements and heat sinks.

Light Source

In one embodiment of this invention, the light emitting device comprises at least one light source selected from the group of: fluorescent lamp, cylindrical cold-cathode fluorescent lamp, flat fluorescent lamp, light emitting diode, organic light emitting diode, field emissive lamp, gas discharge lamp, neon lamp, filament lamp, incandescent lamp, electroluminescent lamp, radiofluorescent lamp, halogen lamp, incandescent lamp, mercury vapor lamp, sodium vapor lamp, high pressure sodium lamp, metal halide lamp, tungsten lamp, carbon arc lamp, electroluminescent lamp, laser, photonic bandgap based light source, quantum dot based light source and other solid state light emitters including inorganic and organic light emitters. Examples of types of such light emitters include a wide variety of light emitting diodes (inorganic or organic, including polymer light emitting diodes (PLEDs)), laser diodes, thin film electroluminescent devices, light emitting polymers (LEPs), a variety of each of which are well-known in the art. In one embodiment of this invention, the light source is a transparent OLED such as those produced by Universal Display Corporation. In a further embodiment of this invention, at least one of the light transmitting regions (or material) comprises a phosphor or phosphorescent material and the light source emits light capable of exciting the phosphor. In one embodiment of this invention, the light transmitting region contains at least one phosphor material such that substantially blue or UV light from at least one LED incident on the phosphor will cause the phosphor to emit light which will be substantially collimated or directed by the lenticular lens array or beads. By using a phosphor material in the light transmitting regions which will effectively convert the wavelength and transmit light, the backlight can be made more uniform by light recycling and reflection from the light reflecting regions of a optical composite and the output will direction will be efficiently controlled. In one embodiment of this invention, a light emitting device comprises an organic light emitting diode (OLED) and a optical composite where the angular width of the output of the backlight is less than the angular width of the output of the OLED light source.

Multiple Light Sources

More than one light source may be used in an array, grouping or arrangement where the source types, spectral output, color, angular output, output flux, spatial locations or orientations of the light sources may vary in one or more directions, planes or surfaces in a predetermined, random, quasi-random, regular or irregular manor. In one embodiment of this invention, the light emitting device comprises more than one light source arranged in at least one pattern selected from linear array, co-linear arrays, cylindrical arrays, spherical arrays, circular array, two-dimensional array, three-dimensional array, varying height array, angle of orientation varying array, opposing arrays oriented in substantially opposite directions and arrays oriented along a surface. Arrays of light sources such as LEDs can be configured as disclosed in U.S. Pat. No. 7,322,732, and U.S. patent application Ser. Nos. 12/017,600, 12/154,691, 11/613,692, the contents of each are incorporated by reference herein.

In one embodiment of this invention, a light emitting device comprises an array of light sources disposed on at least one of a circuit board, connecting surface, flexible connecting surface, heat-sink, metal substrate, copper substrate, aluminum substrate, lightguide, or polymer substrate.

In one embodiment of this invention, a light emitting device comprises an LED array on a flexible circuit disposed in a circular or arc shape in proximity to a lightguide. In one embodiment of this invention, a light emitting device comprises a circular array of LED's on flexible circuit such that the light from the LED's is directed inward toward the center of a circular disc-shaped lightguide comprising light extraction elements of at least one type selected from the group of embossed features, laser-ablated features, stamped features, inked surface patterns, injection molded features, etched surface patterns, sand or glass-blasted micro-patterns, uv cured embossing patterns, dispersed phase particle scattering, scattering from region comprising beads, fibers or light scattering or diffracting shapes. In one embodiment of this invention, the light emitting device further comprises a light filtering directional control element. In one embodiment of this invention, the light emitting device can perform as a downlight wherein the fixture has a substantially circular disc-like shape.

Light Source Optics

The light source in accordance with one embodiment of this invention, comprises at least one light source optics of the type: die structure extraction optics such as photonic bandgap structures or structures on the surface of a light emitting region that have a dimension in at least one direction less than 1 micron in size, encapsulation lens, primary optics, secondary optics, reflective cavity surfaces, refractive lens, TIR reflector, diffractive optic, holographic optic, light shaping optic, metallic reflector, integrator, refractive lens; reflective lens; hybrid lens, no light source optics, or other optical direction controlling features. Other optical elements that may be used with light sources include reflective optical elements for semiconductor light emitting devices such as those discussed in U.S. Pat. Nos. 7,118,262, 7,456,499, and 7,280,288 the contents of each are incorporated by reference herein.

Light Source Duty Cycle

In one embodiment of this invention, a light emitting device comprises a light source that is pulsed over a defined period of time. Due to the response and recovery time of the human eye, a pulsed light source can appear to be continuously on. In certain drive schemes, this can enable a light source to appear to provide a comparable luminance or illuminance to the same light source driven continuously while using less electrical power. Drive schemes and light source properties for pulsing may be designed for reduce power as described in U.S. patent application Ser. No. 11/755,162, the contents of which are incorporated by reference herein.

Light Source Polarization

In one embodiment of this invention, at least one light source emits light that is substantially non-polarized. In a further embodiment of this invention, at least one light source emits a first portion of light substantially polarized in one polarization state. The polarization state of all or a portion of the light may be linearly polarized, elliptically polarized, circularly polarized or a combination thereof. In one embodiment of this invention, the orientation of the polarization (or light source) is configured along a first polarization axis. The first polarization axis (or light source) may be aligned parallel, perpendicular, or at an angle $\sigma$, with respect to at least one of the optical axis of the light emitting device, the optical axis of the light source, the normal to the light emitting output surface, the edge or surface of an element (optical element or otherwise such as a mechanical mount) of the light emitting device, or the edge or surface of an object of illumination such as a desk, hallway floor, window, etc. In one embodiment of this invention, a light emitting devices emits polarized light through the use of an absorptive polarizer, reflective polarizer, multi-layer reflective polarizer, wire-grid polarizer, cholesteric liquid crystal layer, or from a light source such as an LED, OLED, or other light source that emits polarized light such as disclosed in U.S. patent application Ser. Nos. 10/942,090, 11/209,905, 10/202,561 and U.S. Pat. Nos. 6,122,103, 6,018,419, 6,297,906, 6,396,631, 5,783,120, 3,069,974, 6,101,032, 6,141,149, 6,947,215, and 5,594,830, the contents of each are incorporated by reference herein.

Light Source Spectral Output

In one embodiment of this invention, a light emitting device comprises light sources wherein the spectral output the light source or group of sources may be narrowband or broadband. The light source color may be a primary color, nonprimary color, white, cool white, warm white or other color in the visible, ultraviolet, or infrared spectrum. Various combinations of light sources of different spectral properties may be used to provide desired spectral output in an angular range or spatial region or for all or a portion of the total light output of the light emitting device. Combinations of different spectral sources in a light emitting device include those discussed in U.S. Pat. Nos. 5,803,579 and 7,213,940, and U.S. patent application Ser. Nos. 11/936,163, 11/951,626, the contents of each are incorporated by reference herein.

In one embodiment of this invention, the light source emits light of a substantially single color (a full wavelength bandwidth at have maximum intensity of less than 40 nanometers for example). In another embodiment of this invention, the light emitting device (or the light source within a light emitting device) includes a light emitting region and a wavelength conversion material such as a luminophor. The luminophor may be a fluorophore, a phosphor, or other chemical compound that manifests luminescence such as transition metal complexes (ruthenium tris-2'2'-bipyridine). In another embodiment of this invention, a light emitting device comprises at least one wavelength conversion material that is a non-linear optical material such that a first portion of incident light undergoes second harmonic generation (SHG), sum frequency generation (SFG), third harmonic generation (THG), difference frequency generation (DFG), parametric amplification, parametric oscillation, parametric generation, spontaneous parametric down conversion (SPDC), optical rectification, or four-wave mixing (FWM). Examples of non-linear optical materials are known in the photonics industry and include potassium niobate, lithium iodate, gallium selenide. Other materials and components useful for converting light of one wavelength range to a second wavelength range such as quantum dots, nanodots, nanoparticles, quantum well devices, and semiconductor materials with confined excitons. The wavelength conversion material may be located in or on one or more surfaces or elements within the light emitting device or within the light source packaging, such as a phosphor material deposited on or in a light scattering lens of a light emitting device or deposited near the die of an LED or within the LED package. Alternatively, the wavelength conversion material may be located remotely or outside the light source packaging, as in the case of some remote phosphors and phosphor films.

Optical Axis of the Light Source

The optical axis of the light source, as used herein, is the direction of the peak intensity of the light emitting from the light source. With commonly used LEDs, for example, this direction is typically normal to a packaging or mounting surface of the package. However, in cases where the light source emits light at an angle from the normal to the typical mount surface, the optical axis is the angle (or angular range) at which the peak intensity output occurs. For example, in side emitting LEDs such as the LXHL-FW3C white side-emitting LED from Philips Lumileds Lighting Company, the light is emitted substantially radially symmetrically at an angle of approximately 82 degrees. In this example, the optical axis of the LED is 82 degrees from the normal to the output surface. In a configuration where the light output profile of the light source is not symmetric, the optical axis, for the purposes of the embodiments and configurations disclosed herein is the direction or angular range of the peak intensity. The direction may include an angular range such as phi or theta of 82 degrees in polar coordinates. The optical axis of the light source does not necessarily align with an edge, mounting surface, or center of the light output surface of the light source. In one embodiment of this invention, at least one light source or optical axis of the light source of the light emitting device is aligned parallel, perpendicular, or at an angle, p, with respect to at least one of the optical axis of the light emitting device, the optical axis of a second light source, the normal to the light emitting surface, the edge or surface of an element (optical element or otherwise such as a mechanical mount) of the light emitting device, or the edge or surface of an object of illumination such as a desk, hallway floor, window, or wall. In one embodiment of this invention, the optical axis of the light source in the light emitting device intersects the light emitting output surface of the light emitting device. The light emitting output surface may be a light scattering lens, a surface of the lightguide, a surface of a volumetric light scattering element, a surface relief region, a light extracting region or other element of the light emitting device. The optical axis of the light source may be parallel, perpendicular, or at an angle to another light source, lightguide, optical component or optical axis of the light emitting device.

Lightguide

In one embodiment of this invention, a light emitting device comprises lightguide. a lightguide is a region bounded by the condition that light rays traveling at an angle that is larger than the critical angle will reflect and remain within the region. Thus, a lightguide region of a material or materials is capable of supporting a significant number of multiple internal reflections of light due to the refractive index difference between the material and the surrounding material. Typically, a lightguide is comprised of a polymer or glass and the surrounding material is air or a cladding material with a lower refractive index. The lightguide may contain materials or regions within the volume that will scatter, reflect, refract, or absorb re-emit a first portion of light into an angular condition such that it escapes the lightguide. In one embodiment of this invention, a lightguide comprises a substantially transparent, non-scattering polymer optically coupled to a light scattering material in one or more regions. The light scattering material can be a volumetric scattering region or film, a surface relief region or film, or a combination thereof. In another embodiment of this invention, the lightguide is a film or sheet comprising a matrix material and light scattering domains dispersed substantially throughout the film or sheet. In another embodiment of this invention, the lightguide comprises a substantially non-scattering region and a volumetric light scattering region, or other combination of regions as discussed in U.S. patent application Ser. Nos. 11/426,198, 11/848,759, 11/957,406, 12/122,661 and U.S. Pat. Nos. 7,431,489, 7,278,785, 6,924,014, 6,379,016, 5,237,641, and 5,594,830, the contents of each are incorporated by reference herein. In one embodiment of this invention, a light emitting device comprises a "hollow lightguide". Examples of "hollow lightguides" are discussed in U.S. Pat. No. 6,481,882, the contents of which are incorporated by reference herein. In another embodiment of this invention, a light emitting device comprises a fluted lightguide. Examples of fluted lightguides are discussed in U.S. Pat. No. 6,481,882, the contents of which are incorporated by reference herein. In another embodiment of this invention, a light emitting device comprises a lightguide with grooves or surface relief structures on at least one surface. Examples of surface relief structures including grooves on lightguides are discussed in U.S. Pat. No. 7,046,905, the contents of which are incorporated by reference herein. Other types of lightguides are known in the backlighting industry and optical fiber industries.

Typically, a lightguide extends longer in a first direction than a second direction orthogonal to the first. In these cases and in the notation used herein, the length, L, is the dimension of the lightguide in the first direction and width, W, is the length of the dimension of the lightguide in the second direction orthogonal to the first. The light may enter the lightguide through any number or combination of surfaces of the lightguide. Light may enter through the edge (edge-surface), larger surface, or through a light coupling element optically coupled to one or more surfaces of the lightguide.

Lightguide Shape

The lightguide of one embodiment of this invention is substantially planar in shape. In another embodiment of this invention is substantially arcuate and curved along at least one direction. A curved or arcuate lightguide includes lightguides wherein one or more surfaces has a surface normal wherein the surface normal changes angle as one moves along the surface. These can include continuously changing surfaces or curves as well as discretely changing (sharp corners) transitions. The lightguide may be curved on two or more opposite faces or only on one face. The curved shape or surface includes those that can be defined by a mathematical relationships such as f(x,y,z). The cross-sectional side view of an arcuate surface (or portion of a surface) of a lightguide may illustrate an arc in two-dimensional form that takes the shape of a full or partial circle, parabolic curve, conic section, rational curve, or elliptic curve.

In one embodiment of this invention, a light emitting device comprises an arcuate lightguide with a curved surface of a genus greater than one selected from zero, one, two, or three. Curved surfaces with of a genus greater than zero include doughnut like surfaces or stretched doughnut like surface wherein a cutting along the closed curve does not result in a disconnected manifold In a further embodiment of this invention, a light emitting device comprises an arcuate lightguide with a quadric surface. In one embodiment of this invention, a light emitting device comprises a lightguide wherein one portion of the surface of the lightguide is quadric and can be substantially represented by the equation (when centered at the origin):

$$\pm\frac{x^2}{a^2}\pm\frac{y^2}{b^2}\pm\frac{z^2}{c^2}=1.$$

Surfaces that also resemble or closely approximate a quadric surface and surfaces with imperfections or sub-regions that cause a surface to deviate from a perfect quadric surface are also deemed to be in the scope of this invention. In one embodiment of this invention, a light emitting device comprises a lightguide wherein at least a portion of a surface of the lightguide is a quadric surface in the form selected from one of a full or partial ellipsoid, spheroid, paraboloid, circular paraboloid, elliptic paraboloid, hyperbolic paraboloid, hyperboloid of one sheet, cone, elliptic cylinder, circular cylinder, or parabolic cylinder. In one embodiment of this invention, a light emitting device comprises a lightguide wherein two substantially opposing surfaces are quadric. The lightguide may be rotationally symmetric about a first axis of symmetry or it may be non-symmetric in shape.

In a further embodiment of this invention, a light emitting device comprises a lightguide with a one or more inflection points on the light emitting output surface or a surface opposite the light emitting output surface. An inflection point is a point on a surface or line wherein the curvature changes sign. A lightguide surface wherein the surface normal is changing directions can cause an inflection point. An inflection point on a surface or interface of a lightguide will reduce the angle of incidence of light traveling in the lightguide on the interface (such as between the lightguide surface an air) and will increase the likelihood of light escaping the lightguide. A lightguide may have more than one inflection point and the points may be located in regions on or off of the light source optical axis or light emitting device optical axis.

Inflection points and tapers in a lightguide increase the amount of light exiting the lightguide further away from the light source (relative to a non-tapered or lightguide without inflection points) by changing the angle of the surfaces relative to the angles of the light traveling within the lightguide.

Figure 12:
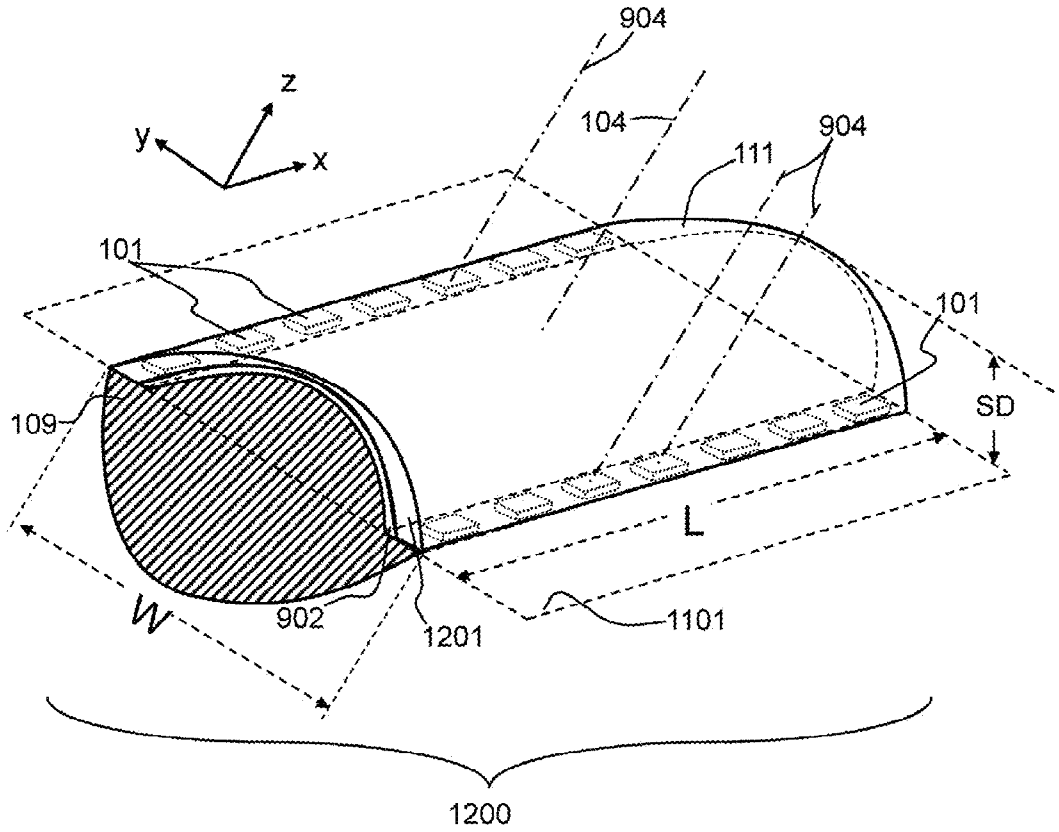
FIG. 12 is a perspective view of a light emitting device of one embodiment of this invention comprising an arcuate tapered lightguide with an array of LEDs disposed along a flat edge of the lightguide.

In a further embodiment of this invention, a light emitting device comprises a lightguide with a sagittal depth (Sag Depth or SD) greater than twice the edge thickness of the lightguide. The sag depth of a lightguide is the distance from a flat plane at a given diameter of the lightguide to the furtherest point on a concave surface of the lightguide. The SD of a lightguide is shown in FIG. 12. For non-round lightguides or polygonal lightguides, the sag depth of the lightguide is the distance from the furtherest point on a concave surface of the lightguide to a flat plane comprising the opposite edges of the longer dimension (or length) of the lightguide. In another embodiment of this invention, a lightguide comprises a ratio of sag depth to edge thickness of greater than one selected from 3, 4, 6, 10, 20 and 30. In another embodiment of this invention, a lightguide has a sag depth greater than one selected from 5, 10, 20, 50, and 100 millimeters.

In another embodiment of this invention, a lightguide comprises an angularly extended surface. An angularly extended surface is one wherein the maximum subtended angle comprising the surface between any point not located on the surface and any two points on the surface all in the same plane is greater than 180 degrees. A planar lightguide or flat wedge lightguide does not comprise an angularly extended surface. A perfectly hemispherical surface is not an angularly extended surface as the maximum subtended angle is exactly 180 degrees (for a point positioned at the center). In one embodiment of this invention, a lightguide comprises an angularly extended surface that comprises more than one half of a closed spherical or ellipsoidal surface. A lightguide with an angularly extended surface may be used to increase the traveling distance of light within the lightguide (such as for improving luminance uniformity or color uniformity) without increasing the volume. An angularly extended surface may curve back upon itself so that the light source edge could be located within the volume or be substantially enclosed by the lightguide. In one embodiment of this invention, a light emitting device comprises an angularly extended lightguide wherein the lightguide curves back in on itself and light from a light source illuminates the lightguide simultaneously traveling in opposite directions.

In one embodiment of this invention, the curvature of the lightguide redirects a portion of the output from a first region of the light emitting region by rotating the angle of the exiting light in the direction which the region of the surface from which it exited was rotated relative to a flat, planar surface. For example, when a planar lightguide is curved (or angled) to form a concave lightguide relative to the nadir, a portion of the light from the LEDs on the left side of the lightguide (light emitting device is directed downwards) which is extracted from the lightguide in the region near the left side of the light extracting region is rotated to larger angles from the nadir than the output from a similar planar lightguide. Similarly, a portion of the light from the LEDs on the right side of the lightguide which is extracted from the lightguide in the region near the right side of the light extracting region is rotated to larger angles from the nadir than the output from a similar planar lightguide.

When a planar lightguide is curved or angled to a convex lightguide relative to the nadir as illustrated in FIG. 1, a portion of the light extracted from the lightguide from the LEDs on the left side of the lightguide in the region near the left side of the light extracting region is rotated to smaller angles from the nadir than the output from a similar planar lightguide. Similarly, a portion of the light extracted from the lightguide from the LEDs on the right side of the lightguide in the region near the right side of the light extracting region is rotated to smaller angles from the nadir than the output from a similar planar lightguide.

Light traveling in a lightguide, from left to right for example, may encounter one or more curved boundary surfaces of the lightguide that increase or decrease the angle of incidence at the lightguide boundary interface relative to a planar lightguide. In one embodiment of this invention, the lightguide is curved or angled in a convex shape relative to the nadir and a portion of the angular light output of the light emitting device relative to that of a similar planar lightguide is directed more toward the nadir in a first plane comprising the curved shape. In a further embodiment of this invention, the lightguide is curved or angled in a concave shape relative to the nadir and a portion of the angular light output of the light emitting device relative to that of a similar planar lightguide is directed more away from the nadir in a first plane comprising the curved shape.

In a further embodiment of this invention, the light blocking region or other element of the light emitting device such as a housing or thermal transfer element or heat sink reflects, absorbs, refracts or scatters a portion of light from a light emitting region of the light emitting device traveling at an angle selected from 40°, 50° 60°, 70° and 80° from the nadir.

In another embodiment of this invention, the light blocking region or other element of the light emitting device such as a housing or thermal transfer element or heat sink reflects, absorbs, refracts or scatters a portion of light from a light emitting region of the light emitting device comprising a curved lightguide such that the luminance in an angular region from 55 degrees to 90 degrees from the nadir is less than the luminance at the same angle from the nadir of a similar light emitting device with a planar, non-curved lightguide.

Lightguide Taper

Figure 29:
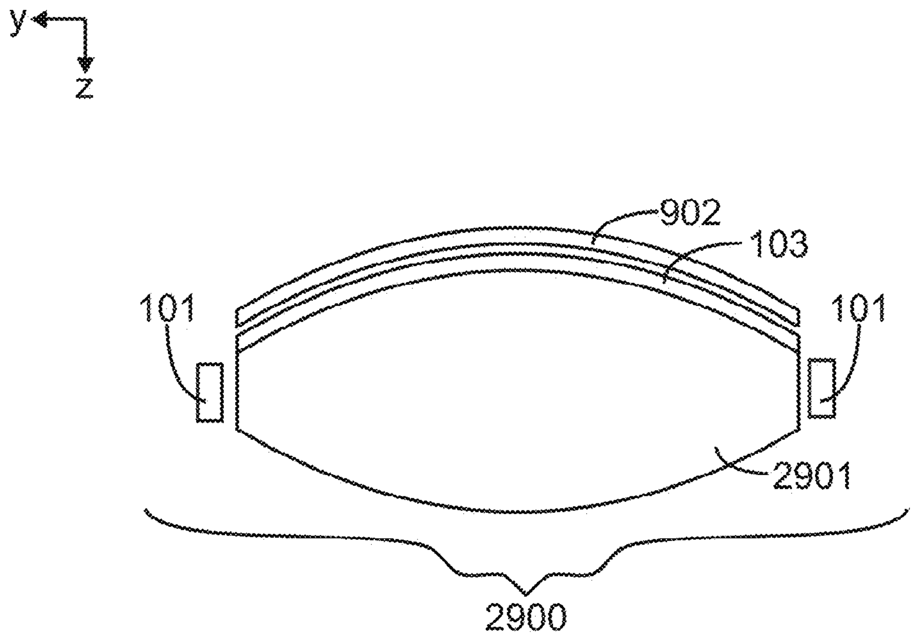
FIG. 29 is a cross-sectional side view of a light emitting device of one embodiment of this invention comprising a lightguide with two opposing quadric surfaces shaped similar to a biconvex lens.
Figure 30:
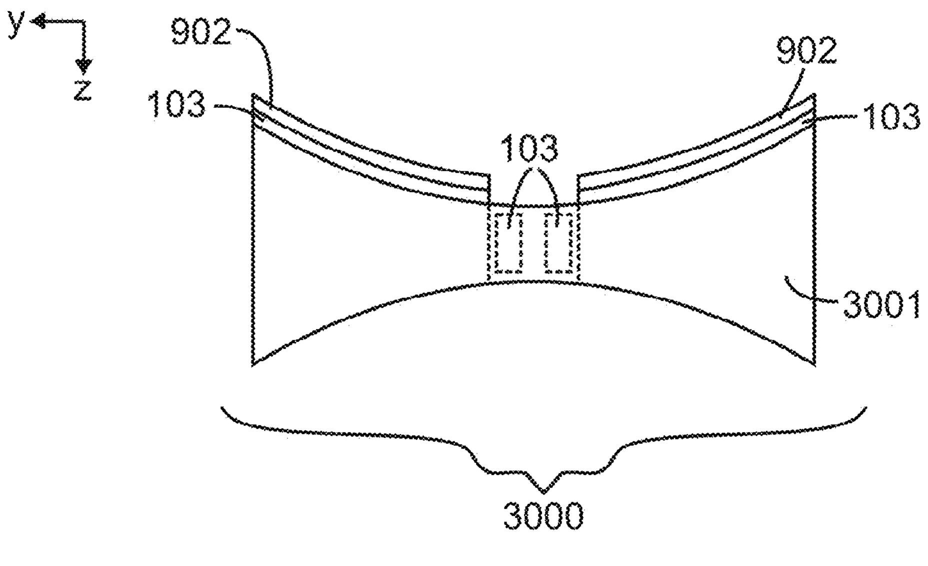
FIG. 30 is a cross-sectional side view of a light emitting device of one embodiment of this invention comprising a lightguide with two opposing quadric surfaces shaped similar to a biconcave lens.

In one embodiment of this invention, a light emitting device comprises a tapered lightguide. In another embodiment of this invention, the lightguide comprises at least two surfaces that are not parallel to each other. A tapered lightguide is one wherein the separation distance between two substantially opposing surfaces decreases in a first direction parallel to one of the surfaces within a region of the lightguide. A tapered lightguide includes lightguides with substantially planar opposing surfaces (wedge-type) and lightguides where one or both surfaces has a cross-sectional curve shape in one or more directions. In one embodiment of this invention, a lightguide may have a substantially planar surface and an arcuate surface such that the lightguide tapers in a first direction parallel to one of the surfaces. A lightguide may be tapered in a first taper direction and tapered in a second direction orthogonal to the first. In a further embodiment of this invention, a light emitting device comprises a lightguide wherein the separation distance between two substantially opposing surfaces increases in a first direction parallel to one of the surfaces within a region of the lightguide. In a further embodiment of this invention, a light emitting device comprises a lightguide that tapers and thickens in a first direction wherein the separation distance between two substantially opposing surfaces increases and decreases in a first direction parallel to one of the surfaces within a region of the lightguide. For example, the lightguide may be shaped similar to a biconvex lens where light is coupled into the outer edge and the lightguide expands and then tapers as light progresses toward the opposite edge as shown in FIG. 29. In other example, the lightguide may be in a shape similar to a biconcave lens as shown in FIG. 30, where light is coupled into the outer edge and the lightguide tapers and then expends as the light progresses toward the opposite edge. Similarly, one or more light sources may be disposed in the central region of a biconvex or biconcave shaped lightguide wherein the lightguide tapers or expands, respectively, as the light travels from the center to the edge of the lightguide. Further examples included cylindrical lenses with a biconcave or biconvex cross-section in a first region.

In a further embodiment of this invention, a light emitting device comprises a lightguide that tapers in a first direction and thickens in a second direction orthogonal to the first direction.

Lightguide Input Edge

In one embodiment of this invention, the surface of the input edge of a lightguide which receives the light from the light source is one of curved, lens-like, convex, concave, non-planar or parametric surface wherein the angular orientation of the surface normal across the surface changes. In one embodiment of this invention, a light emitting device comprises a lightguide with an input surface with a concave region disposed adjacent to a light source. A concave surface disposed to receive light from a light source such that the light from the light source is not refracted toward the optical axis of the light source in the lightguide will spread faster within the lightguide, thus reducing the mixing distance. The curvature may be in the length direction, width direction or both. In one embodiment of this invention, the input edge of a lightguide is concave within a first plane parallel to the optical axis of the light source and convex within a second plane parallel to the optical axis of the light source and perpendicular to the first plane. In one embodiment of this invention, the input surface of the lightguide is illuminated by a plurality of light sources wherein the light from the plurality of light sources cross paths within the lightguide.

Lightguide Output Edge

In one embodiment of this invention, the surface of the output edge of a lightguide which receives the light from within the lightguide is one of curved, lens-like, convex, concave, non-planar or parametric surface wherein the angular orientation of the surface normal across the surface changes. In one embodiment of this invention, a light emitting device comprises a lightguide with an output surface with a beveled edge. A beveled edge can be used to refract the light remaining in the lightguide that has not been coupled out due to a diffuser, light extraction features, taper, etc. By refracting the light from a bevel, the directionality of the light exiting the edge of the lightguide can be controlled. In one embodiment of this invention, the edge is beveled at an angle less than 90 degrees from the first light output surface of the lightguide. In another embodiment of this invention, the output edge has a first curved region. The curvature may be in the length direction, width direction or both. In one embodiment of this invention, the output edge of a lightguide is concave within a first plane parallel to the optical axis of the light emitting device and convex within a second plane parallel to the optical axis of the light emitting device and perpendicular to the first plane. In a further embodiment of this invention, the lightguide output edge comprises a light reflecting element.

In another embodiment of this invention, the lightguide output edge comprises a light redirecting element or a light scattering region or element.

Lightguide Output

In one embodiment of this invention, a light emitting device comprises a lightguide wherein the percentage of light flux exiting the lightguide on the surface closer to the light emitting device optical axis is greater than the light flux exiting the lightguide on the opposite surface further from the light emitting device optical axis. In one embodiment of this invention, the light emitting device comprises a lightguide wherein the percentage of light flux exiting the lightguide from a top output surface and the bottom output surface is selected from a group of 5%-15% and 95%-85%; 15%-30% and 85%-70%; 30%-50% and 70%-50%; 50%-75% and 50%-25%; and 75%-95% and 25%-5%, respectively. In another embodiment of this invention, the percentage of light flux exiting the light emitting device in a first direction from a first output surface and a second direction from a second output surface is selected from a group of 5%-15% and 95%-85%; 15%-30% and 85%-70%; 30%-50% and 70%-50%; 50%-75% and 50%-25%; and 75%-95% and 25%-5%, respectively. The first direction may be the up direction with the first output surface as the top surface and the second direction may be the down direction with the second output surface as the bottom surface.

Lightguide Alignment

Figure 27:
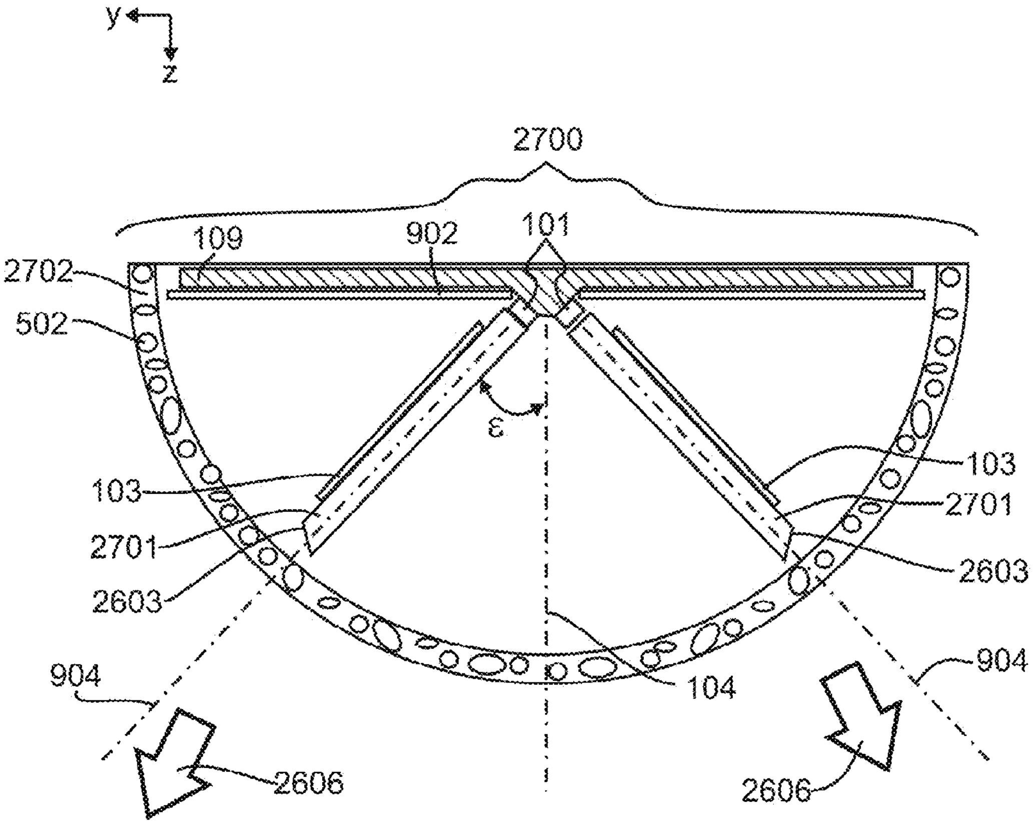
FIG. 27 is a cross-sectional side view of a light emitting device of one embodiment of this invention comprising at two lightguides oriented away from the optical axis of the light emitting device and a light diffusing lens.

In one embodiment of this invention, a light emitting device comprises a lightguide with an output surface oriented at an angle, c, to the optical axis of the light emitting device as shown in FIG. 27. The angle ϵ may be chosen such that the output surface is aligned substantially parallel, perpendicular, or at an angle to at least one of the optical axis of at least one light source, the optical axis of the light emitting device, the light output plane of the light emitting device, and the axis of luminous intensity glare cut-off. In one embodiment of this invention, ϵ is 0 degrees and the output surface of the lightguide is substantially parallel to the optical axis of the light emitting device. In a further embodiment of this invention, ϵ is 90 degrees and the output surface of the lightguide is substantially perpendicular to the optical axis of the light emitting device. In a further embodiment of this invention ϵ is greater than one selected from the group of 10 degrees, 30 degrees, 50 degrees, 60 degrees and 70 degrees. In a further embodiment of this invention ϵ is less than one selected from the group of 10 degrees, 30 degrees, 50 degrees, 60 degrees and 70 degrees. The orientation of the lightguide contributes to the angular optical output radiation of the light emitting device. In one embodiment of this invention, orienting one or more lightguides at a smaller angle ϵ results in more light being directed toward the optical axis of the light emitting output device. In another embodiment of this invention, orienting one or more lightguides at a larger angle ϵ results in more light being directed away from the optical axis of the light emitting output device. This is particularly useful when trying to achieve specific off-axis radiation patterns such as batwing profiles for light fixture designed to have indirect output or for other light directing applications such as wall washing. The orientation of the lightguide or portion of a lightguide, or one lightguide in a device comprising more than one lightguide can also provide blocking of light that would normally exit the light emitting device at a glare angle such as light exiting the light emitting device at more than approximately 45 degrees.

Figure 20A:
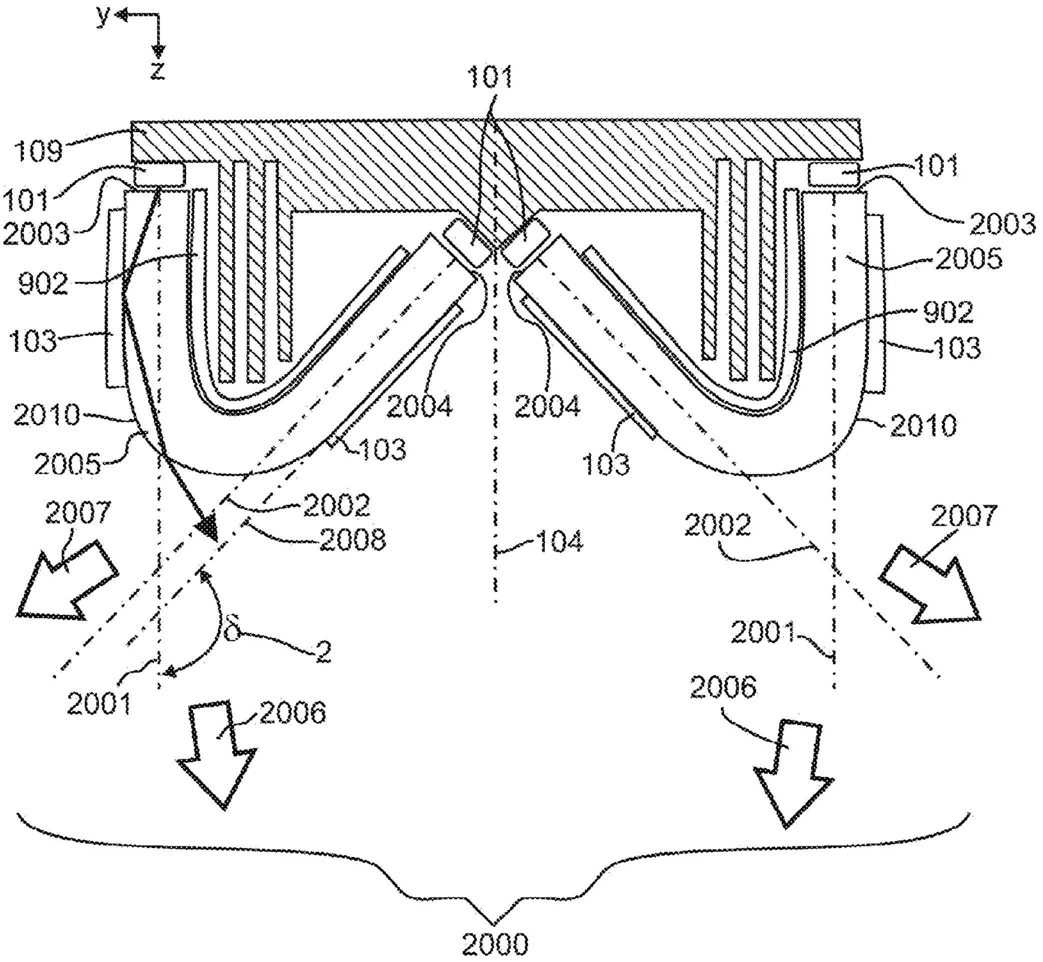
FIG. 20*a* is a cross-sectional side view of a light emitting device of one embodiment of this invention comprising two arcuate lightguides illuminated from both ends of the lightguides.

In one embodiment of this invention, a light emitting device comprises a lightguide aligned such that the plane perpendicular to the normal to a second output region of the light emitting outer surface of the lightguide closer to the second input coupling edge of the lightguide is oriented at an angle, δ, to the optical axis of the light source directed into the first light input coupling edge as shown in FIG. 20*a*. In one embodiment of this invention, δ is greater than one selected from 50 degrees, 80 degrees, 90 degrees and 100 degrees.

Figure 26:
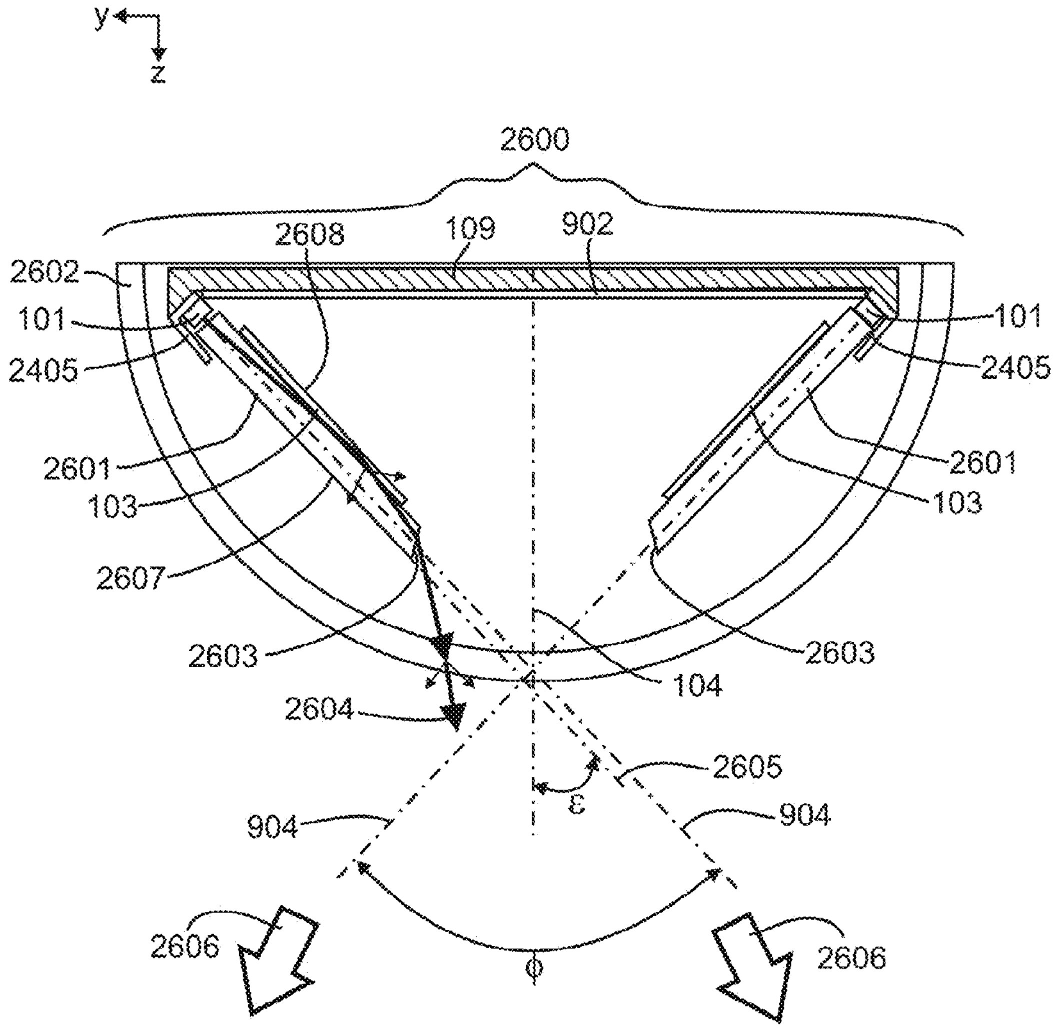
FIG. 26 is a cross-sectional side view of a light emitting device of one embodiment of this invention comprising two substantially planar lightguides oriented at an angle $\phi$ to each other toward the optical axis of the light emitting device and a light diffusing lens.

In one embodiment of this invention, a light emitting device comprises more than one lightguide wherein the lightguides are oriented at an angle, ϕ, with respect to each other as shown in FIG. 26. In one embodiment of this invention, the angle, ϕ, is in a range selected from the group: greater than 10 degrees; greater than 45 degrees; greater than 80 degrees; greater than 90 degrees; greater than 130 degrees; 0 degrees to 5 degrees; 10 degrees to 30 degrees; 30 degrees to 45 degrees; 45 degrees to 60 degrees; 60 degrees to 90 degrees; and 90 degrees to 170 degrees.

In a further embodiment of this invention, a light emitting device comprises an arcuate lightguide with first and second light output regions oriented at an angle ϕ3 with respect to each other on the outer light output surface of the lightguide. In one embodiment of this invention, a light emitting device comprise a lightguide wherein the surface normal of the light output surface of the lightguide varies in a first plane. The surface of the lightguide may be substantially rotationally symmetric and the surface normal may vary around a light emitting device output axis as in FIGS. 24 and 25.

Lightguide Location

In one embodiment of this invention, the lightguide is disposed in an optical path between the light source and at lease one of a an optical film, light scattering element, light redirecting optical element, light filtering directional control element, light scattering lens, protective lens, housing, mounting element, thermal transfer element, volumetric light scattering element, a second lightguide, and a second light source.

Lightguide Composition

The lightguide of one embodiment of this invention is comprised of a light transmitting material selected from thermoplastic polymer, thermoset polymer, plastic, glass, rubber, liquid or other light transmitting material.

Elements of the Lightguide

In one embodiment of this invention, a light emitting device comprises a lightguide which comprises at least one of a volumetric light scattering region, volumetric anisotropic light scattering region, surface relief light scattering region, surface relief light scattering region embedded within the volume, light reflecting element, specularly reflecting light reflecting element, diffusely reflecting element, forward scattering element, backward scattering element, light extraction features, tapered surface, curved surface, quadric surface, embedded light source, embedded LED, diffracting element, holographic element, light redirecting element, or light filtering directional control element. One or more of the aforementioned features or elements may be optically coupled to a light transmitting material in one or more predetermined regions. The region of coupling may be a continuous layer or it may be optically coupled in a predetermined pattern. The pattern may be regular, random, substantially random or regular or in a mathematically definable pattern. In one embodiment of this invention, the lightguide comprises at least one output surface wherein light exits the lightguide. In a further embodiment of this invention, the lightguide comprises a light output surface and a first and second light output region disposed near a first and second light input coupling edge, respectively. The lightguide may comprise more than one volumetric light scattering region and the lightguide may be arcuate in shape such that the first and second light output regions are at an angle to each other.

The lightguides may be composite materials such that they comprise multiple layers with different functions are properties including scattering, reflecting, selective light extraction, diffusing for uniformity, scattering at predetermined angular ranges, mixing for color or uniformity or configuration. Multiple lightguides can be used in a single light emitting device. Examples of lightguides and composites comprising multiple layers and methods of manufacture include those presented in U.S. Pat. Nos. 7,278,775, 7,431,489, and U.S. patent application Ser. Nos. 11/426,198, 12/122,661, 12/198,175, 11/957,406, 11/848,759, the contents of each are incorporated by reference herein.

Light Extraction Features on the Lightguide

In one embodiment of this invention, a light emitting device comprises a lightguide with light extraction features disposed on or within at least one inner or outer light output surface. In one embodiment of this invention, the light extraction features are disposed to receive light from within the lightguide and re-direct a first portion of the incident light to an angle less than the critical angle at an outer surface of the lightguide. Light extraction surface features may include non-planar modifications or additions to a surface. An example of adding light extraction surface features include screenprinting translucent or light scattering ink features on the surface of the lightguide such as titanium dioxide or barium sulfate or beads dispersed in a methacrylate based ink or binder. An example of a subtractive modification to a surface to achieve light extraction features includes laser ablation of a PMMA substrate to achieve pits or ridges in a surface to scatter, reflect or refract incident light from within the lightguide. Other light extraction features included injection molded surface features, embossed features into the surface, optically coupling surface-relief films to the lightguide, optically coupling volumetric light scattering regions or films to the lightguide, insert molding optical elements or diffuser films to the lightguide, extruding or casting or injection molding a lightguide comprising light scattering domains within the volume, mechanically or etching or scribing features into the lightguide, abrading features into the lightguide, sandblasting features, printing features, photopolymerizing or selective polymerizing of features into a layer or coating, and other methods known in the art of backlights for displays for achieving light extraction from a lightguide. In one embodiment of this invention, a lightguide comprises a light extracting features disclosed in one of U.S. patent application Ser. Nos. 11/244,473, 10/744,276, 10/511,983, 09/833,397, 09/669,932, 11/277,865, and U.S. Pat. Nos. 5,594,830, 5,237,341, 6,447,135, 6,347,873, 6,099,135, and 7,192,174, the contents of each are incorporated by reference herein.

Volumetric Light-Scattering Region or Element

In one embodiment of this invention, the light emitting device comprises one or more volumetric light scattering regions, layers or elements comprising dispersed phase domains or voids. Volumetric or surface relief light scattering elements can be composed of light transmitting materials. The matrix or dispersed phase domains may be a gaseous material (hollow lightguide or voided diffuser, respectively, for example) or a light transmitting material. The volumetric or surface relief light scattering regions of one or more embodiments of this invention may scatter light isotropically or anisotropically. In one embodiment of this invention, a lightguide comprises a diffusing film comprising dispersed phase domains within a polymer matrix. Processing and choice of materials can create non-spherical domains which will scatter light anisotropically. Other methods for creating volumetric diffusing elements or diffusers including symmetric and asymmetric shaped domains are described in U.S. Pat. Nos. 5,932,342, 6,346,311, 6,940,643, 6,673,275 6,567,215 and 6,917,396, the contents of each are incorporated by reference herein. Multi-region diffusers may also be used such as those disclosed in U.S. patent application Ser. No. 11/197,246, the contents are incorporated by reference herein.

Haze is one method for measuring the amount of wide angle scattering in an element. In one embodiment of this invention, the haze of the of the volumetric light scattering element, surface relief light scattering element, light scattering lens, or light redirecting element measured according to ASTM D1003 with a BYK Gardner Hazemeter is at least one of 5%, 10%, 20%, 50%, 80%, 90%, or 99%.

Clarity is method for measuring the narrow angle scattering of a light scattering element. In one embodiment of this invention, the clarity of the of the volumetric light scattering element, surface relief light scattering element, light scattering lens, or light redirecting element measured with a BYK Gardner Hazemeter is less than one of 5%, 10%, 20%, 50%, 80%, 90%, or 99%.

The total luminous transmittance in the 0/d geometry of a light scattering element or light transmitting material is one method for measuring the forward scattering efficiency in an element. In one embodiment of this invention, the transmittance of the of the volumetric light scattering element, surface relief light scattering element, light scattering lens, or light redirecting element measured according to ASTM D1003 with a BYK Gardner Hazemeter is at least one of 5%, 10%, 20%, 50%, 80%, 90%, or 99%.

One or more of the diffusing (scattering) regions may have an asymmetric or symmetric diffusion profile in the forward (transmission) or backward (reflection) directions. In one embodiment of this invention, the light emitting device comprises more than one volumetric light scattering region. The scattering regions or layers may be optically coupled or separated by another material or an air gap. In one embodiment of this invention, the volumetric light scattering regions have a separation distance greater than 5 microns and less than 300 mm. In one embodiment of this invention, a rigid, substantially transparent material separates two diffusing regions. In another embodiment of this invention, the asymmetrically diffusive regions are aligned such that the luminance uniformity of a light emitting device is improved. In another embodiment, the spatial luminance profile of a light emitting device using a linear or grid array of light sources is made substantially uniform through the use of one or more asymmetrically diffusing regions.

The use of a volumetric anisotropic light scattering element or region in the light emitting device allows the scattering region to be optically coupled to the light guide such that it will still support waveguide conditions for a first portion of light. An anisotropic surface relief scattering region on the surface of the light guide or a surface of a component optically coupled to the light guide will substantially scatter light in that region out of the light guide, thus not permitting spatially uniform out-coupling in the case of scattering over a significant portion of the light guide surface.

In one embodiment of this invention, a light emitting device comprises a lightguide with an anisotropic light scattering region wherein asymmetrically shaped dispersed phase domains of one polymer within another matrix polymer contribute to the anisotropic light scattering. The anisotropic scattering region may be non-polarization dependent anisotropic light scattering (NPDALS) or polarization dependent anisotropic light scattering (PDALS). Light fixtures with polarized light output can reduce the glare off of surfaces and are discussed in U.S. Pat. No. 6,297,906, the contents of which are incorporated herein by reference.

The amount of diffusion in the x-z and y-z planes for the NPDALS or PDALS regions affects the luminance uniformity and the angular light output profiles of the light emitting device. By increasing the amount of diffusion in one plane preferentially over that in the other plane, the angular light output from the light emitting device is asymmetrically increased. For example, with more diffusion in the x-z plane than the y-z plane, the angular light output (measured in the FWHM of the intensity profile) is increased in the x-z plane. The diffusion asymmetry introduced through one or more of the anisotropic light-scattering regions or the light filtering directional control element can allow for greater control over the viewing angle, color shift, color uniformity, luminance uniformity, and angular intensity profile of the light emitting device and the optical efficiency of the light emitting device. In another embodiment, the amount of diffusion (measured as FWHM of the angular intensity profile) varies in the plane of the diffusing layer. In another embodiment, the amount of diffusion varies in the plane perpendicular to the plane of the layer (z direction). In another embodiment of this invention, the amount of diffusion is higher in the regions in close proximity of one or more of the light sources.

The birefringence of one or more of the substrates, elements or dispersed phase domains may be greater than 0.1 such that a significant amount of polarization selectivity occurs due to the difference in the critical angle for different polarization states when this optically anisotropic material is optically coupled to or forms part of the light guide. An example of this polarization selectivity is found in U.S. Pat. No. 6,795,244, the contents are incorporated herein by reference.

Alignment of Major Diffusing Axis in Anisotropic Light Scattering Region

The alignment of the major axis of diffusion in one or more of the anisotropic light-scattering regions may be aligned parallel, perpendicular or at an angle $\theta_3$ with respect to the optical axis of a light source or edge of the lightguide. In one embodiment, the axis of stronger diffusion is aligned perpendicular to the length of a linear light source in a cold-cathode fluorescent edge-lit light emitting device. In another embodiment of this invention, the axis of stronger diffusion is aligned perpendicular to the length of a linear array of LEDs illuminating the edge of lightguide in an edge-lit light emitting device.

Domain Shape

The domains within one or more light scattering regions may be fibrous, spheroidal, cylindrical, spherical, other non-symmetric shape, or a combination of one or more of these shapes. The shape of the domains may be engineered such that substantially more diffusion occurs in the x-z plane than that in the y-z plane. The shape of the domains or domains may vary spatially along one or more of the x, y, or z directions. The variation may be regular, semi-random, or random.

Domain Alignment

The domains within a diffusing layer may be aligned at an angle normal, parallel, or an angle $\theta_4$ with respect to an edge of the diffusing layer or a linear light source or array of light sources, light source optical axis, light emitting device optical axis, or an edge of the lightguide or light redirecting optical element. In one embodiment, the domains in a diffusing region are substantially aligned along one axis that is parallel to a linear array of light sources. In another embodiment of this invention, the alignment of the dispersed phase domains rotates from a first direction to a second direction within the region. In one embodiment of this invention, the light emitting device comprises a volumetric light scattering region wherein the domains are aligned substantially parallel to one or more of the x direction, y direction, z direction, or an angle relative to the x, y, or z direction. In another embodiment of this invention, the major dimension of the domains are aligned by rotating an element or component of the device to provide adjustable light output profiles.

Domain Location

The domains may be contained within the volume of a continuous-phase material or they may be protruding (or directly beneath a partially conformable protrusion) from the surface of the continuous-phase material.

Domain Concentration

The domains described herein in one or more light-diffusing regions may be in a low or high concentration. When the diffusion layer is thick, a lower concentration of domains is needed for an equivalent amount of diffusion. When the light-diffusing layer is thin, a higher concentration of domains or a greater difference in refractive index is needed for a high amount of scattering. The concentration of the dispersed domains may be from less than 1% by weight to 50% by weight. In certain conditions, a concentration of domains higher than 50% by volume may be achieved by careful selection of materials and manufacturing techniques. A higher concentration permits a thinner diffusive layer and as a result, a thinner light emitting device or light filtering directional control element. The concentration may also vary spatially along one or more of the x, y, or z directions. The variation may be regular, semi-random, or random.

Index of Refraction

The difference in refractive index between the domains and the matrix in one or more of the NPDALS, PDALS or other light scattering regions may be very small or large in one or more of the x, y, or z directions. If the refractive index difference is small, then a higher concentration of domains may be required to achieve sufficient diffusion in one or more directions. If the refractive index difference is large, then fewer domains (lower concentration) are typically required to achieve sufficient diffusion and luminance uniformity. The difference in refractive index between the domains and the matrix may be zero or larger than zero in one or more of the x, y, or z directions. In one embodiment of this invention, the refractive index of the domains is $n_{px}$, $n_{py}$, $n_{pz}$ and in the x, y, and z directions, respectively and the refractive index of the matrix or continuous phase region is $n_{mx}$, $n_{my}$, $n_{mz}$ in the x, y, and z directions, respectively, wherein at least one of $|n_{px}-n_{mx}|>0.001$, $|n_{py}-n_{my}|>0.001$, or $|n_{px}-n_{mx}|>0.001$.

The refractive index of the individual polymeric domains is one factor that contributes to the degree of light scattering by the film. Combinations of low- and high-refractive-index materials result in larger diffusion angles. In cases where birefringent materials are used, the refractive indexes in the x, y, and z directions can each affect the amount of diffusion or reflection in the processed material. In some applications, one may use specific polymers for specific qualities such as thermal, mechanical, or low-cost; however, the refractive index difference between the materials (in the x, y, or z directions, or some combination thereof) may not be suitable to generate the desired amount of diffusion or other optical characteristic such as reflection. In these cases, it is known in the field to use small domains, typically less than 100 nm in size to increase or decrease the average bulk refractive index. Preferably, light does not directly scatter from these added domains, and the addition of these domains does not substantially increase the absorption or backscatter.

During production of the light filtering directional control element or one of its regions, the refractive index of the domains or the matrix or both may change along one or more axes due to crystallization, stress- or strain-induced birefringence or other molecular or polymer-chain alignment technique.

Additive materials can increase or decrease the average refractive index based on the amount of the materials and the refractive index of the polymer to which they are added, and the effective refractive index of the material. Such additives can include: aerogels, sol-gel materials, silica, kaolin, alumina, fine domains of MgF2 (its index of refraction is 1.38), SiO2 (its index of refraction is 1.46), AlF3 (its index of refraction is 1.33-1.39), CaF2 (its index of refraction is 1.44), LiF (its index of refraction is 1.36-1.37), NaF (its index of refraction is 1.32-1.34) and ThF4 (its index of refraction is 1.45-1.5) or the like can be considered, as discussed in U.S. Pat. No. 6,773,801, the contents incorporated herein by reference. Alternatively, fine domains having a high index of refraction, may be used such as fine particles of titania (TiO2) or zirconia (ZrO2) or other metal oxides.

Other modifications and methods of manufacturing anisotropic light scattering regions, and light emitting devices and configurations incorporating anisotropic light scattering elements are disclosed in U.S. Pat. No. 7,278,775, the contents of which are incorporated by reference herein. The modifications and configurations disclosed therein may be employed in an embodiment of this invention to create a visually uniform (greater than 70% luminance uniformity) light output surface, a desired angular luminous intensity profile, or an efficient (optical efficiency greater than 70%) light emitting device comprising a light filtering directional control element.

Scattering Element or Region Location

The light emitting device of an embodiment of this invention comprises one or more isotropic, anisotropic, volumetric or surface relief light scattering elements or regions. On or more of the regions or elements may be located with the lenticular lens structure, within the lenticular lens substrate, within the light absorbing region, within the light reflecting region, within the light transmitting region, within or adhered to the lightguide, between the light filtering directional control element and the light emitting device light output surface, between the light filtering directional control element and the lightguide or between the lightguide and one or more light emitting sources such as LED's. The light scattering region may be optically coupled to one or more elements of the light filtering directional control element or one or more elements of the light emitting device. In one embodiment of this invention, the light scattering element is optically coupled to one or more components of the light filtering directional control element or the light emitting device using a low refractive index adhesive. In a further embodiment of this invention, a light filtering directional control element comprises a light scattering film optically coupled using a pressure sensitive adhesive to the apex region of the lenticules such that the anisotropic light scattering film provides a substantially planar output surface that is more resistant to scratches. In one embodiment, the loss of the refractive power at the apex of the lenticules where the pressure sensitive adhesive effectively index matches out the interface increases the FWHM angular intensity output in a plane perpendicular to the lenticules by less than one selected from the group of 2 degrees, 5 degrees, 10 degrees, or 20 degrees relative to the light scattering film separated from the lenticular lens array by an air gap. In a further embodiment of this invention, the light scattering element, such as the volumetric light scattering region, is located in at least one of within the lightguide, within a substrate, within a multi-region diffuser, between the reflective element and the lightguide, within a coating on a lightguide, within a film optically coupled to the lightguide, within an adhesive between two elements of a light emitting device.

In one embodiment of this invention, the light scattering element is patterned or graded in diffusion. Examples of patterned or graded diffusers and their patterns are disclosed in U.S. patent application Ser. Nos. 11/949,222, 10/984,407, 10/984,390 and U.S. Pat. No. 6,867,927, the contents of each are incorporated by reference herein.

Light Reflecting Element and Region

In one embodiment of this invention, a light emitting device comprises a light reflecting element. In one embodiment of this invention, a light reflecting element comprises a light reflecting region. The light reflecting region may be specularly reflecting, diffusely reflecting or some combination in-between. The light reflecting region may comprise a reflective ink, beads or other additives that substantially reflect light of one or more wavelength ranges. The light reflecting region may transmit a portion of incident light. In one embodiment of this invention, the light reflecting region is a low light transmitting region and has luminous transmittance measured according to ASTM D1003 less than one selected from the group of 5%, 10%, 15%, 20%, 30%, and 50%. In another embodiment of this invention, the low light transmitting region is a light reflecting region and has a diffuse reflectance measured in the d/8 geometry with the specular component included of greater than one selected from the group of 60%, 70%, 80%, 90%, and 95%.

The reflective additive used in an ink or polymer system may include BaSO4, TiO2, organic clays, fluoropolymers, glass beads, silicone beads, cross-linked acrylic or polystyrene beads, alumina, or other materials known in the diffusion screen or film industry for backlights or projection screens such that the refractive index difference between them and a supporting polymer matrix or binder is sufficiently high to reflect light a significant portion of incident light (such as greater than 80% diffuse reflectance). The light reflecting region may also be a light reflecting material such as PTFE, or it may comprise a blend of thermoplastic polymers such as described in U.S. patent application Ser. No. 11/426,198, or U.S. Pat. Nos. 5,932,342, 5,825,543, and 5,268,225, the text of each is incorporated by reference herein where the refractive index between the two polymers is chosen to be very high such that the light reflects from the film. In another embodiment of this invention, the light reflecting region is a voided film such those described in U.S. Pat. Nos. 7,273,640, 5,843,578, 5,275,854, 5,672,409, 6,228,313, 6,004,664, 5,141,685, and 6,130,278, and U.S. patent application Ser. No. 10/020,404, the contents of each are incorporated by reference herein.

The light reflecting region may comprise nanoparticle dispersions such as nanodispersions of aluminum or silver or other metals that can create a specularly reflecting ink. In one embodiment of this invention, a light emitting device comprises a specular light reflecting region which recycles the incident light from within the light emitting device to provide uniformity and the light output from the device is substantially collimated from a light redirecting element.

In one embodiment of this invention, the light reflecting region is a multilayer dielectric coating or a multilayer polymeric reflector film such as described in U.S. Pat. Nos. 7,038,745, 6,117,530, 6,829,071, 5,825,543, and 5,867,316, the contents of each are incorporated by reference herein, or DBEF film produced by 3M. A multilayer polymeric reflective film can have a reflectance in the visible spectrum greater than 94% and thus can be more efficient in an optical system. The multi-layer polymeric reflector film may be specularly reflective, diffusely reflective, diffusely transmissive, anisotropically forward scattering or anisotropically backward scattering for one or more polarization states. In a light emitting device where the light reflecting regions are a multi-layer polymeric reflector, the low light loss enables more reflections before the light is absorbed and thus a cavity within the light emitting device can be made thinner and/or the light transmitting apertures can be smaller, thus providing higher uniformity and more light filtering in a thinner form factor.

In one embodiment of this invention, the light reflecting element is a symmetrically diffusely reflecting white reflecting film such voided PET films with our without additives such as titanium dioxide or barium sulfate. A specularly reflecting film may also be used such as metallized aluminized PET film or ESR multilayer reflective film from 3M Company or DBEF reflective polarizer film from 3M Company. Light reflecting elements can be composed of light transmitting materials. In another embodiment of this invention, light emitting device comprises a volumetric asymmetrically reflecting element. The asymmetrically reflecting element may be an anisotropically backscattering volumetric diffuser, a volumetric forward asymmetrically scattering diffuser optically coupled to a specular reflector or other volumetric or surface relief elements that reflect light anisotropically. In another embodiment of this invention, the reflector may be a metal such as aluminum or a metallic compound. The light reflecting element may be a sheet or other component or portion of the housing that is comprised of a light reflecting component or a metal or metallic layer or other reflecting component such as a polished aluminum housing. The light reflecting region may also be a brushed (or otherwise imparted with substantially linear features) aluminium or a brushed, embossed coating such that the element reflects anisotropically. In one embodiment of this invention, a light emitting device comprises a light reflecting element with a d/8 diffuse reflectance greater than one selected from 70%, 80%, 90%, or 95%. In a further embodiment of this invention, a light emitting device comprises an anisotropic light reflecting element with a d/8 diffuse reflectance greater than one selected from 70%, 80%, 90%, or 95%. In one embodiment of this invention, a light emitting device comprises a light reflecting film disclosed in at least one of U.S. Pat. Nos. 4,377,616, 4,767,675, 5,188,777, 6,497,946, 6,177,153, and U.S. patent application Ser. No. 10/020,404, the contents of each are incorporated by reference herein.

Reflector

In one embodiment of this invention, a light emitting device comprises a reflector disposed to receive direct and indirect light from a light source which does not satisfy the total internal reflection condition. The reflector is a light reflecting element which reflects or reflects and absorbs substantially all of the incident light from a light source. An example of a reflector used in a light emitting device can include a bezel or frame on a lightguide. The light source may be disposed substantially within the reflector and the reflector may extend out over a portion of one or both faces or surfaces of a lightguide. The reflector may be a metal such as aluminum or aluminum composite and may be thermally coupled to the thermal transfer element. In one embodiment of this invention, the reflector is at least one thermal transfer element in the light emitting device system. Reflectors can also be composed of light transmitting materials.

Optical Axis of the Light Emitting Device

For light emitting devices with luminous intensity output profiles that are substantially symmetric about a first angular direction, the optical axis of the light emitting device is the first angular direction. In the case of light emitting devices with luminous intensity output profiles that not are not substantially symmetric about a first angular direction, the optical axis of the light emitting device is the angle or angular range of peak luminous intensity. Similarly, for light emitting devices in applications where the emitted light is designed to comprise light in the non-visible portion of the electromagnetic spectrum, the optical axis of the light emitting device is the first angular direction of symmetry of the radiant intensity or angle or angular range of peak radiant intensity for symmetric and asymmetric light output profiles, respectively.

In cases where the luminescent intensity output profile is symmetric in a first output plane and asymmetric in a second plane orthogonal to the first, the optical axis of the light emitting device is the central angle of symmetry in the first plane and the angle of peak luminous intensity in the second plane. For downlights, troffers, pendants, backlights and many other light fixture light emitting devices, the optical axis is typically normal to the output surface or mounting element and in a vertical direction. For wall-washing applications, however, the optical axis of the light emitting device may be at an angle relative to the housing, mounting or other component such as lightguide. In one embodiment of this invention, the optical axis of the light emitting device is aligned parallel, perpendicular, or at an angle, θ1, with respect to at least one of the optical axis of at least one light source, the normal to the light output surface or first or second light output region, the output plane, the edge or surface of an element (optical element or otherwise such as a mechanical mount or housing surface) of the light emitting device, or the edge or surface of an object of illumination such as a desk, hallway floor, wall, or window. In one embodiment of this invention, the angle θ1 is in a range selected from the group: greater than 10 degrees; greater than 45 degrees; greater than 80 degrees; greater than 90 degrees; greater than 130 degrees; 0 degrees to 5 degrees; 10 degrees to 30 degrees; 30 degrees to 45 degrees; 45 degrees to 60 degrees; 60 degrees to 90 degrees; and 90 degrees to 170 degrees.

Thermal Transfer Element

Figure 22:
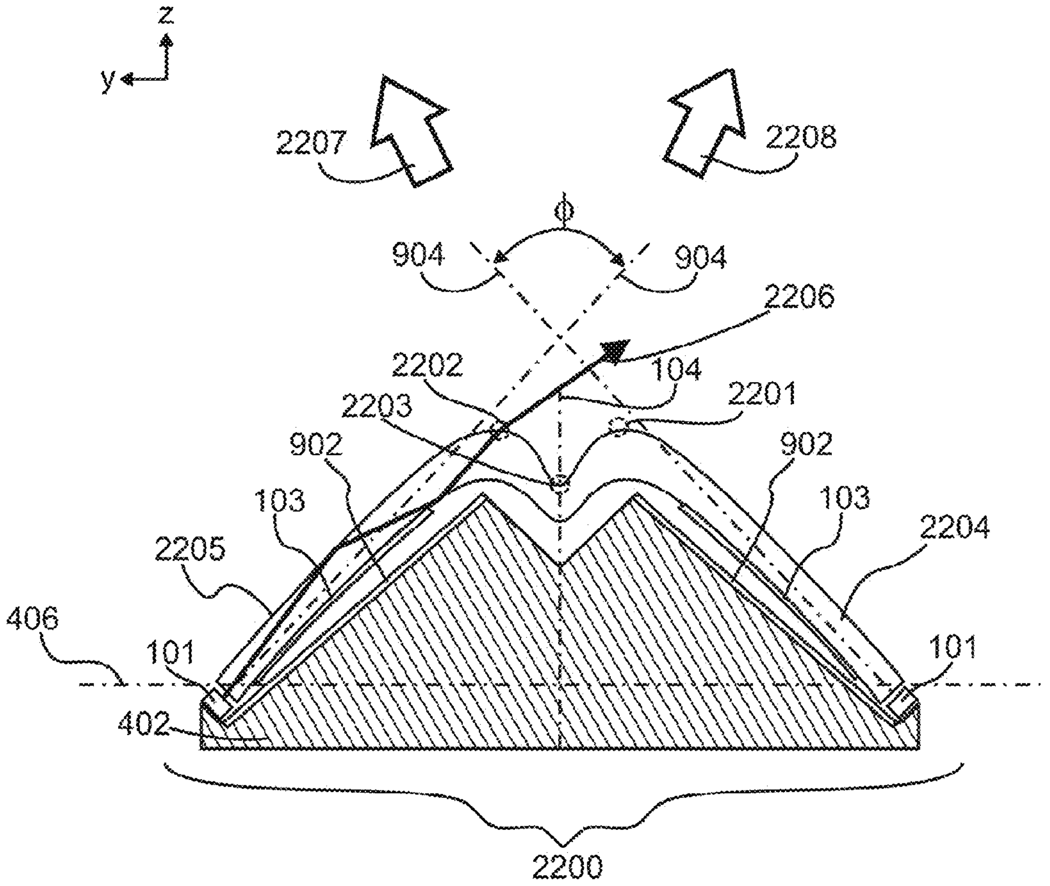
FIG. 22 is a cross-sectional side view of a light emitting device of one embodiment of this invention comprising an arcuate lightguide with three inflection regions.

In one embodiment of this invention, a light emitting device comprises a thermal transfer element selected from the group heat sink, heat pipe, forced air based cooling system, liquid based cooling system, active cooling systems, passive cooling systems, forced air systems, thermoelectric cooler, phase change cooler, and synthetic jet system such as sold by Nuventix. In another embodiment of this invention, the thermal transfer element extends farther in a first direction which is in a first plane than a largest dimension of the upper housing of the light emitting device in any plane which is parallel to the first plane. In another embodiment of this invention, the thermal transfer element extends farther than a portion of the light emitting surface of the lightguide or light emitting surface of the light emitting device in the same direction as the optical axis of the light emitting device. Other thermal transfer elements or cooling systems may be used such as those used for light fixtures or light emitting devices such as disclosed in U.S. patent application Ser. Nos. 12/116,348 and 12/154,691, and U.S. Pat. No. 7,095,110, the contents of each are incorporated by reference herein. In one embodiment of this invention, the thermal transfer element comprises a solid metal block mounting substrate such as disclosed in U.S. Pat. No. 7,183,587, the contents of which are incorporated by reference herein. In one embodiment of this invention, the thermal transfer element has a dimension extending past the light output plane in the direction of the optical axis of the light emitting device as shown in FIG. 22. The thermal transfer element may extend pass the light output plane and may also extend into a region disposed between two lightguides, between two points on the inner surface of a light transmitting material, lightguide, or light scattering lens, or between a first and second light output regions on a light output surface of a lightguide as shown in FIG. 20*a*. In another embodiment, the thermal transfer element extends into a region between the lightguide and a light scattering lens. The thermal transfer element may be an electrical component. In one embodiment of this invention, the thermal transfer element comprises one selected from the group aluminum, aluminum alloy, steel, carbon, ceramic, a metal, and an alloy. In a further embodiment of this invention, the thermal transfer element has a thermal conductivity greater than one selected from the group of 0.6 W/(m·K), 1 W/(m·K), 10 W/(m·K), 100 W/(m·K), and 200 W/(m·K). The thermal transfer element may be opaque and non-optical. A non-optical component is a component which does not perform an optical function essential to the desired operation of the device such that if any optical functionality of the component were removed, the device would function in substantially the same manner optically. In one embodiment of this invention, the luminous transmittance of the thermal transfer element is less than one selected from the group of 10%, 5%, 1%, and 0.5%.

Mounting Element

In one embodiment of this invention, the light emitting devices comprises a housing. The housing can be of any desired shape, and can be made of any desired material, a wide variety of both of which are well-known to persons skilled in the art. Representative examples of a material out of which the light engine housing can be made include, among a wide variety of other materials, extruded aluminum, die cast aluminum, liquid crystal polymer, polyphenylene sulfide (PPS), thermoset bulk molded compound or other composite material, any of which would provide excellent heat transfer properties, which would assist in dissipating heat generated by the light emitting device. In some embodiments, the light engine housing has a plurality of fin elements which increase the surface area of the light engine housing, thereby increasing the heat dissipation characteristics of the light emitting device. In one embodiment of this invention, the mounting element comprises a first mounting surface such that the mounting surface is substantially parallel to the surface to which the light emitting device is mounted or designed to be mounted on. In another embodiment of this invention, the mounting surface is substantially parallel to the circuit board comprising at least one light source. In a further embodiment of this invention, the first mounting surface of the light emitting device is substantially planar and at an angle, $\psi$, to the optical axis of the light emitting device. In one embodiment of this invention, the angle $\psi$ is in a range selected from the group: greater than 10 degrees; greater than 45 degrees; greater than 80 degrees; greater than 90 degrees; greater than 130 degrees; 0 degrees to 5 degrees; 10 degrees to 30 degrees; 30 degrees to 45 degrees; 45 degrees to 60 degrees; 60 degrees to 90 degrees; and 90 degrees to 170 degrees. In a further embodiment of this invention, the mounting element includes the thermal transfer element.

Driver and Other Electronics

In one embodiment of this invention, the light emitting device comprises driving electronics for the light source. In one embodiment of this invention, the driving electronics includes at least one of an electrical ballast, LED driver, AC-DC transformer, DC-AC transformer, DC-DC transformer, switching electronics, pulsing or modulating electronics, color control electronics, safety electronics, fuses, breakers, surge-protection electronics, optical sensing electronics, color based feedback electronics, sensors (optical, electrical, mechanical, thermal, pressure, motion, etc.), electrical connectors, plugs, power cords, switches, displays, liquid crystal panels and drivers, and other electrical components known in the lighting and display industry to be suitable for use in a light fixture or light emitting device. In one embodiment of this invention, a light emitting device comprises an electrical component selected from U.S. Pat. Nos. 6,016,038, 6,016,038, 6,528,954, 6,211,626, 7,441,934, and 7,407,307, the contents of each are incorporated by reference herein. In one embodiment of this invention, the thermal transfer element comprises at least of the aforementioned electrical components. The electrical component may be opaque and non-optical. In one embodiment of this invention, the luminous transmittance of the electrical component is less than one selected from the group of 10%, 5%, 1%, and 0.5%.

In another embodiment of this invention, a light emitting device comprises an electrical device for controlling the color (such as individually adjusting the output from a red, green, amber, yellow, purple, or blue LED), angular light output profile (such as by moving a lens), direction of the light output profile, intensity of the light output, and mode of operation (such as switching between mirror mode or light mode).

Light Scattering Lens

In one embodiment of this invention, a light emitting device comprises a light scattering lens. A light scattering lens can be composed of light transmitting materials. In one embodiment of this invention, the light scattering lens is disposed to receive light from one or more lightguides or lightguide output regions and further scatter the light and increase luminance uniformity of the output surface. In one embodiment of this invention, the luminance uniformity of the light output surface on a light scattering lens of a light emitting device is greater than one of 70%, 80% and 90%. The light scattering lens may also serve to protect the lightguides which can be sensitive to scratching depending on the material. The shape of the light scattering lens may be planar, curved, quadric, hemispherical, partially spherical, spherical, polyhedral or other multifaceted, curved, or combination faceted and curved surface. More than one light scattering lens may be used to provide uniformity and the lenses may be co-axial or have an axial separation distance of greater than 2 millimeters. In one embodiment, the lenses are placed with their axes separated by greater than 2 mm and the inner lens modifies the light distribution reaching the outer lens to improve one of angular directionality, uniformity in on or more directions, or a designed luminance from a specific viewing angle.

The light scattering lens may be surface relief, volumetric, combination surface relief and volumetric, absorption and re-emission scattering type or other light scattering type. Surface relief type diffusers and lenses may comprise surfaces with features with spatially varying surface normals such that the angular FWHM intensity of collimated light transmitted through surface is greater than 1 degree in a first output plane. The pattern may be regular, random, substantially random, mathematically generated, optically generated (such as holographic diffusers) etc. For purposes used herein, all surface relief patterns may be used in an embodiment of this invention regardless of the specifics of the individual undulations and variances of the surface normal. A surface relief pattern, as used herein, is considered to be independent of how it was made and such relief surfaces include those referred to as holographic diffusers, light shaping diffusers, diffractive diffusers, elliptical diffusers, embossed diffusers, microlens arrays, diffractive optical elements, holographic optical elements, prismatic arrays, pyramid arrays, arrays of cones, sandblasted diffusers, etched diffusers, collimation films and other patterns which direct light into more than one direction such that the angular FWHM of the intensity of the output light profile is larger than the angular FWHM of the intensity of the input light profile in a first plane or second plane orthogonal to the first.

In one embodiment of this invention, a light emitting device comprises a volumetric light scattering lens that comprises a volumetric light scattering region that anisotropically or isotropically scatters light.

In one embodiment of this invention, the light scattering lens comprises a wavelength conversion material that converts a first portion of light of a first wavelength into a second wavelength different than the first. The wavelength conversion material may be a phosphor material, down-conversion material, up-conversion material, frequency doubling materials, quantum dot material, nanodispersed material such as nanodispersions of gold, or other materials known to convert light of one wavelength into another. Phosphors or other light conversion materials are known in the field of light emitting sources, CRT phosphor materials, LED phosphor materials, laser photonics and other optical fields. Lenses comprising light conversion materials include those disclosed in U.S. patent application Ser. Nos. 11/398,214, 10/659,240 and 11/614,180, and U.S. Pat. No. 7,355,284, the contents of each are incorporated by reference herein.

In another embodiment of this invention, a light scattering lens comprises a wavelength conversion region and a non-absorbing light scattering region. In a further embodiment, the lens comprises wavelength conversion materials dispersed in a region comprising non-absorbing light scattering domains.

In one embodiment of this invention, a light emitting device comprises a light scattering lens wherein at least a portion of the inner or outer surface of the light scattering lens is a quadric surface in the form selected from one of a full or partial ellipsoid, spheroid, paraboloid, circular paraboloid, elliptic paraboloid, hyperbolic paraboloid, hyperboloid of one sheet, cone, elliptic cylinder, circular cylinder, or parabolic cylinder.

Light Redirecting Elements (LRE)

In one embodiment of this invention, a light emitting device comprises a light source, a lightguide and a light redirecting element. Light redirecting optical elements are optical elements that direct a first portion of incident light from a first angular direction into a second angular direction different from the first. Light redirecting elements can be composed of light transmitting materials. Light redirecting elements include diffusive or scattering elements, refracting elements, reflecting elements, re-emitting elements, diffractive elements, holographic elements, or a combination of two or more of the aforementioned elements. The elements may be grouped into regions spatially or the features may be hybrid components such as a refractive-TIR fresnel lens hybrid structure. Other light redirecting elements include collimating films such as BEF film from 3M Company and beaded bottom diffusers such as BS-700 light diffusing film from Keiwa and embossed light diffusing film UTE-22 from Wellstech Optical Company Ltd, off-axis directing films such as IDF film from 3M company, lenticular lens arrays, microlens arrays, volumetric diffusers, surface relief diffusers, light filtering directional control elements, voided diffusers, voided reflective films or materials, multi-layer reflective films such as ESR from 3M, polarization reflective films such as DBEF from 3M, reflective polarizers, scattering polarizers and NPDALS or PDALS, lightguides, diffractive or holographic surface relief diffusers or elements, holographic volumetric diffusers or elements, microlenses, lenses, and other optical elements known in the optical industry to redirect light or a combination of two or more of the aforementioned elements or regions of elements.

The light redirecting element may be optically coupled to one or more element, optical elements, lightguide, or light source of the light emitting device. In one embodiment of this invention, the light redirecting optical element is separated by an air gap in a first region from a second optical element or lightguide of the light emitting device. The light redirecting optical element may be optically coupled to a support substrate to position or hold in a predetermined location within the light emitting device. In another embodiment of this invention, the light redirecting element is separated from another optical element or lightguide within the device by standoff regions. In one embodiment, the longest dimension of the standoffs in a plane perpendicular to the light emitting device optical axis is less than one selected from 1 mm, 0.5 mm, 0.2 mm and 0.1 mm. In one embodiment of this invention, the standoffs are small beads or particles disposed in region between the LRE and the lightguide. By using beads or particles that are sufficiently small, mechanically coupling between the LRE and lightguide can occur without visible sight of the light extracting from the beaded region. In one embodiment of this invention, the beads or domains have an average dimensional size less than one selected from the group of 200 μm, 100 μm, 75 μm, 25 μm and 10 μm. In a further embodiment of this invention, the small beads or particles are dispersed between the lightguide and LRE such that the light extracted from the lightguide due to the coupling from the beads creates a defined or random pattern of higher luminance regions at angles further from the light output surface normal. In a further embodiment of this invention, a light emitting device comprises a lightguide and a light redirecting optical element optically coupled to the lightguide in predetermined regions on the surface of the lightguide. In a further embodiment, a first portion of light in the lightguide is coupled out of the lightguide in the regions where the light redirecting element is optically coupled to the lightguide. The optically coupling in regions can be achieve through patterned adhesive deposition (such as ink jet type deposition systems, screenprinting systems and other systems suitable for depositing adhesives in a pattern) onto the lightguide and or the light redirecting element and laminating them or pressing them together and curing if necessary. Other methods for optical coupling include laser welding in specific regions, ultrasonic welding in specific regions, localized thermal bonding and other techniques known in the glass and plastic bonding field to bond light transmitting materials.

LRE—Collimation Properties

One or more surfaces or region of a surface of the light transmitting material, lightguide light redirecting element, light scattering element, or surface relief scattering element may include surface profiles that provide collimation properties. The collimation properties direct light rays incident from large angles into angles closer to the normal (smaller angles) of at least one region of the light output surface of the light emitting device. The features may be in the form of a linear array of prisms, an array of pyramids, an array of cones, an array of hemispheres or other feature that is known to direct more light into the direction normal to the surface of the backlight. The array of features may be regular, irregular, random, ordered, semi-random or other arrangement where light can be collimated through refraction, reflection, total internal reflection, diffraction, or scattering.

LRE Surface—Relief Structure

One or more surfaces of the light redirecting element, lightguide, light source, or optical composite may contain a non-planar surface. The surface profile may contain protrusions or pits that may range from 1 nm to 10 mm in the x, y, or z directions. The profile or individual features may have periodic, random, semi-random, or other uniform or non-uniform structure. The surface features may be designed to provide functions to the light redirecting element, such as collimation, anti-blocking, refraction, lightguide output coupling or extraction, symmetric diffusion, asymmetric diffusion or diffraction. In some embodiments, the surface features are a linear array of prismatic structures that provide collimation properties. In another embodiment, the surface includes hemispherical protrusions that prevent wet-out or provide anti-blocking properties or light-collimating properties.

LRE—Lenticular Lens

In one embodiment of this invention, the light redirecting element is a lenticular lens array surface relief structure comprise a substantially linear array of convex refractive elements which redirect light from a first angular range into a second angular range. In another embodiment of this invention, the light redirecting element is a light filtering directional control element comprising a lenticular element. As used herein, a lenticular elements or structures include, but are not limited to elements with cross-sectional surface relief profiles where the cross-section structure is hemispherical, aspherical, conical, triangular, rectangular, polygonal, or in the form of an arc or other parametrically defined curve or polygon or combination thereof. Lenticular structures may be linear arrays, two-dimension arrays such as a microlens array, close-packed hexagonal or other two-dimensional array. The features may employ refraction along with total internal reflection such that the output angular range is less than the input angular range within one or more light output planes. Lenticular structures may also be used to redirect light to an angle substantially off-axis from the optical axis of the element. As used herein, lenticular may refer to any shape of element which refracts or reflects light through total internal reflection and includes elements referred to as "non-lenticular" in U.S. Pat. No. 6,317,263, the contents of which are incorporated by reference herein. The lenticular structure may be disposed on a supporting substrate. In one embodiment, the focal point of the structures is substantially near the opposite surface of the supporting substrate. The lenticular element may have a first focal point in the near field and a group of lenticular elements may collectively have a far-field focal point defined as a region where the spatial cross-sectional area normal to the optical axis of the light emitting device of the incident light flux is at a minimum. The material, methods of making and structures of lenticular lens arrays, microlens arrays, prismatic films, etc. are known in the art of light fixtures, backlights, projection screens and lenticular and 3D imaging.

In one embodiment of this invention, the light emitting device comprises more than one lenticular structure disposed on the same or opposite side of a substrate. In one embodiment of this invention, a light emitting device comprises a light filtering directional control element wherein a lenticular element disposed on the input surface can focus more light through the light transmitting regions and change the direction or FWHM angular width of the light output profile from the light filtering directional control element. The structures can be convex or concave and similar to those used in double-lenticular rear projections screens such as those described in U.S. Pat. Nos. 5,611,611, 5,675,434, 5,687,024, 6,034,817, 6,940,644, and 5,196,960, the contents of each are incorporated herein by reference. The design of the lenticular shape on one or more surfaces is not limited to these features and includes other designs known in the rear-projection screen and lenticular imaging industry and the design may include lens, refractive, or reflective elements referenced in other patents referred to in other sections of this application and incorporated by reference herein.

Substantially clear lens substrates are known in the art and are used in the production of lenticular screens for rear-projection screens. In one embodiment of this invention, a volumetric diffuser is used as the supporting substrate for a light redirecting element. In this embodiment, the number of films may be reduced or the thickness reduces by alleviating or reducing the need for a substrate which is not optically active and replacing it with a diffuser which improves the uniformity. By using an anisotropic volumetric diffuser (which scatters light into higher angles in a first output plane parallel to the lenticules, and has very little or on effect on the scattering of light along the plane perpendicular to the lenticules), the focusing or collimating power of the lenticular lens array in the second light output plane perpendicular to the lenticules can be maintained while the spatial luminance uniformity of the light emitting device is improved. In one embodiment of this invention, the angular FWHM of the diffusion profile of the anisotropic diffuser used as the lenticular lens array substrate in the plane parallel to the lenticules is greater than one selected from the group of 5, 10, 20, 30 and 50 and the angular FWHM of the diffusion profile of the anisotropic diffuser used as the lenticular lens array substrate in the plane perpendicular to the lenticules is less than one selected from the group of 10, 5, 4, 2, and 1. In a further embodiment, the asymmetry ratio of the anisotropic light scattering diffuser disposed as a substrate to the lenticular lens array in a light filtering directional control element is greater than one selected from the group 5, 10, 20, 40, 50, and 60. Additionally, the FWHM of the total scattering angles in the first and second output planes of a light emitting device comprising the light filtering directional control element of one embodiment of this invention can be independently controlled by use of an anisotropic diffuser. In a further embodiment of this invention, a light filtering directional control element within the light emitting device comprises a lenticular lens array wherein the lenticular lenses have a conformal low refractive index region disposed on the curved surface of the lenticule such that the output surface is substantially planarized. In a further embodiment of this invention, the output surface of a planarized light filtering directional control element is the output surface, or a substantially co-planar surface coupled to a protective lens output surface of a light fixture.

In another embodiment of this invention, a light redirecting element comprises a layer of beads, at least one of a light transmitting region or light reflecting region disposed to refract incident light from a light transmitting region disposed between or substantially within in at least one of the light transmitting or light reflecting regions. Analogous to the lenticular lens array, an array comprising a randomized assortment of beads may be used to collimate or substantially reduce the angular extent of light exiting from a light transmitting region and filter the light. The primary differences include the fact that the bead type light filtering directional control element will reduce the angular extent of the output light in all planes of the output light normal to the exiting surface. However, the ability to achieve very high levels of collimation is limited and the fill-factor, and ultimate transmission is limited due to the cross-sectional area limitations of close-packing an array of spheres (or hemispheres or spheroidal lens-like structures). In another embodiment of this invention, a light filtering directional control element comprises lenticular or bead based elements and light transmitting regions and light absorbing regions in common with rear projection screens such as those described elsewhere herein and those described in U.S. Pat. No. 6,466,368, except that when used with projection screens, the input light is typically collimated or of a reduced angular extent and is incident first upon the lenticular or bead elements and the output light is of a larger angular extent and exits through the light transmitting apertures. In one embodiment of the present invention, the incident light within a light emitting device on the light filtering directional control element has an angular FWHM greater than 30 degrees in a first plane and is incident first on the light transmitting regions and the output light from the light filtering directional control element has a FWHM less than 30 degrees in the first plane and exits through the lenticular or bead based refractive elements.

Common materials such as those used to manufacture lenticular screens such as vinyl, APET, PETG, or other materials described in patents referenced elsewhere herein may be used in the present invention for a light filtering directional control element. Light filtering directional control elements may comprise light transmitting materials. In a further embodiment, a material capable of surviving temperature exposures higher than 85 degrees Celsius may used as the lenticular lens or substrate to the lenticular lens or bead based element such as biaxially oriented PET or polycarbonate. By using a material capable of withstanding high temperature exposure, manufacturing processes such as heating during a pressure application stage or heating during an exposure stage may be used to decrease the production time.

In one embodiment of this invention a light emitting device comprises a lenticular light redirecting element that collimates light such as a 90 degree apex angle prismatic film. By pre-conditioning the light incident on the light filtering directional control element, more light is transmitted and the FWHM angular output angles of the light emitting device along one or more output planes is reduced relative to a light emitting device comprising just the light filtering directional control element. In one embodiment of this invention, a light emitting device comprises two crossed 90 degree prismatic collimating films and a light filtering directional control element such that the angular width of the FWHM intensity profile within one light emitting device output plane is less that 15 degrees. In a additional embodiment of this invention, a light emitting device comprises two crossed 90 degree prismatic collimating films and a light filtering directional control element such that the angular width of the FWHM intensity profile within one light emitting device output plane is less that 10 degrees. In another embodiment of this invention, a light emitting device comprises two crossed 90 degree prismatic collimating films and a light filtering directional control element such that the FWHM along one light emitting device output plane is less than 8 degrees. In another embodiment of this invention, a light emitting device comprises a light filtering directional control element, a first 90 degree prismatic collimating film and a second 90 degree prismatic film providing brightness enhancement with anisotropic light scattering phase domains dispersed within the substrate as describe in U.S. patent application Ser. No. 11/679,628, the contents of which is incorporated herein by reference. In the previous embodiment, the angular width of the FWHM intensity profile within one light emitting device output plane is less than one selected from the group of 8 degrees, 10 degrees, 15 degrees or 20 degrees. In another embodiment of this invention, a light emitting device comprises a 90 degree prismatic collimating film disposed above a light filtering directional control element wherein the prisms are oriented substantially orthogonal to the lenticules and further comprises a second 90 degree prismatic film disposed on the opposite side of the light filtering collimating film providing brightness and uniformity enhancement with anisotropic light scattering phase domains dispersed within the substrate and a lightguide and at least one light emitting diode. In one embodiment of this invention, the use of at least one brightness enhancing or collimating film along with a light filtering directional control element which comprises a light absorbing region permits more light to pass through the light filtering directional control element due to the more highly collimated incident light profile upon the light filtering directional control element. In one embodiment of this invention, a light emitting device comprises a light redirecting element that is a collimating film selected from the group of BEF, BEF II, BEF III, TBEF, BEF-RP, BEFII 90/24, BEF II 90/50, DBEF-MF1-650, DBEF-MF2-470, BEFRP2-RC, TBEF2 T 62i 90/24, TBEF2 M 65i 90/24, NBEF, NBEF M, Thick RBEF, WBEF-520, WBEF-818, OLF-KR-1, and 3637T OLF Transport sold by 3M, PORTGRAM V7 sold by Dai Nippon Printing Co., Ltd., LUMTHRU that sold by Sumitomo Chemical Co., Ltd., ESTINAWAVE W518 and W425 DI sold by Sekisui Chemical Co., Ltd, and RCF90 collimating film sold by Reflexite Inc.

The light emitting device may also comprise a light redirecting element that re-directs a substantially portion of the light into an off-axis orientation. In one embodiment of this invention, a light emitting device comprises a non-symmetrical prismatic film such as a Image Directing Film (IDF or IDFII) or Transmissive Right Angle Film (TRAF or TRAFII) sold by 3M. In one embodiment of this invention, a wall washing light fixture comprises a non-symmetrical prismatic film. In one embodiment of this invention, a light emitting device comprises a symmetrical prismatic film to re-distribute the light symmetrically about an axis such as a prismatic film with a 60 degree apex angle with the prisms oriented toward the output surface. In other embodiment of this invention, a light emitting device comprises a lenticular lens array, a light reflecting region, light transmitting regions, and a linear prism film with an apex angle between 45 degrees and 75 degrees where the substrate of the linear prism film is coupled directly or through another layer to the light reflecting regions with the prisms oriented away from the lenticules. In another embodiment of this invention, the linear prism film or light redirecting element is a “reverse prism film” such as sold by Mitsubishi Rayon Co., Ltd. under the trade names of DIA ART H150, H210, P150 and P210, or is a prismatic film of a similar type as disclosed in the embodiments within U.S. Pat. Nos. 6,545,827, 6,151,169, 6,746,130, and 5,126,882, the contents of each are incorporated by reference herein.

LRE—Pitch

The pitch of the light redirecting element or lenticular lens structure will have an effect on the focusing power, the thickness of the lenticular lens array and substrate and other optical properties such as moiré. In one embodiment of this invention, the lenticular lens array structure is in the form of concentric lenticular lenses. In this embodiment, the lenses are parallel, but are arranged in an arc or circle. The pitch of the lenses and other properties may vary similarly to linear lenticular lenses. A light emitting device comprising a light filtering directional control element comprising concentric lenticular lenses can provide a spatial filtering along radial directions as opposed to linear directions. In one embodiment of this invention, a light emitting device comprising a substantially centrally located light source and a light filtering directional control element comprising a concentric lenticular lens has a spatial luminance uniformity greater than one selected from 60%, 70%, 80% and 90%. The concentric lenticular lens may be manufactured using injection molding, stamping, embossing or other similar techniques known in the optical industry suitable for making Fresnel lenses. In one embodiment of this invention, a light filtering directional control element, or light emitting device comprising the same, comprises a concentric lenticular lens array and at least one of a light reflecting, light absorbing, or light transmitting region wherein the regions are substantially ring or arc-shaped corresponding to the concentric lenticular lens.

Light Redirecting Element (LRE) Alignment

In an additional embodiment of this invention, the alignment of the light redirecting element is rotated with respect to an exit aperture of the light emitting device. In one embodiment, the light redirecting element is aligned at an angle $\phi 1$ to the longer dimension of the light exiting aperture of the light emitting device. In an additional embodiment, $\phi 1$ is one selected from the group consisting of 0 degrees, 45 degrees, and 90 degrees. In another embodiment of this invention, a light emitting device comprises a light filtering directional control element wherein the lenticular lens array is aligned at an angle $\phi 2$ relative to a 90 degree apex angle prismatic collimating film wherein 90 degrees>$\phi 2$>0 degrees and the contrast of the spatial luminance moiré pattern of the light fixture is less than one selected from the group consisting of 0.8, 0.5, 0.2, 0.1 and 0.05.

Light Output Surface

In one embodiment of this invention, a light emitting device comprises a lightguide and at least one light output surface. The light output surface comprises the last optical elements from which the light leaves the light emitting device. In one embodiment of this invention, the light output surface comprises at least one selected from a light scattering lens, lightguide, light reflecting element, reflector, housing, volumetric light scattering element, diffuser surface relief diffuser, optical film, substrate, substantially transparent lens or protective or holding cover material, and glass lens. The light output surface may be planer, curved, domed, arcuate, quadric, radially symmetric, more than half of a sphere, or other surface shape. The light output surface may comprise more than one lightguide in a light emitting device and may include a reflector or transparent, non-scattering lens.

Light Filtering Directional Control Element (LFDCE)

In one embodiment of this invention, a light emitting devices comprises a light redirecting element that is a Light Filtering Directional Control Element (LFDCE). In one embodiment of this invention, a LFDCE comprises a light transmitting layer disposed between lenticular elements and a first input surface. In another embodiment of this invention, a LFDCE comprises a light transmitting layer disposed between microlens array elements and a first input surface. In one embodiment of this invention, a light emitting device comprises a light filtering directional control element (LFDCE) with a first input surface disposed to receive light and an first output surface disposed to output light wherein the light filtering directional control element collimates the light within a first plane and the light emitting device further comprises an anisotropic light scattering element disposed in the optical path after the first light output surface and has a higher angular FWHM diffusion profile in the first plane than in a second plane orthogonal to the first. In this embodiment, the light filtering directional control element, filters out the unwanted non-uniformities of the incident light in a very thin profile and substantially collimates the incident light (such as providing an output light with an angular FWHM of less than 10 degrees FWHM in the first output plane). The anisotropic diffuser can be provided with a range of angles to provide a customizable light output profile. In one embodiment of this invention, a light emitting device with an angular FWHM of less than 10 degrees in at least one output plane and an anisotropic light scattering film is provided as a kit wherein the combination of the two provides a pre-determined light output profile.

In another embodiment of this invention, the portion of incident light on the light reflecting region side of the light filtering directional control element which is not reflected is substantially absorbed by the light absorbing region. In a further embodiment of this invention, the light reflecting region reflectively scatters light anisotropically into a larger angular FWHM in the plane perpendicular to the lenticules than parallel to the lenticules due to scattering from the asymmetrically shaped disperse phased domains oriented with their larger axis substantially parallel to the lenticules. By reflectively scattering the light more in the plane perpendicular to the lenticules, the light will more likely reach a neighboring light transmitting region through fewer bounces and reflections from the light reflecting region. Since the light reflecting region is less than 100% reflective and some light is either absorbed in the light reflecting region or passes through (into undesirable angles or into a light absorbing region where it can be absorbed), it is desirable for the light to travel through the lightguide such that it will reach a neighboring aperture through a minimal number of reflections from the light reflecting region.

In one embodiment of this invention, a light filtering directional control element comprises a lenticular lens array and a light reflecting region comprising asymmetrically shaped disperse phase domains that reflectively scatter anisotropically such that the angular FWHM of the light scattering in the plane perpendicular to the lenticules is greater than the angular FWHM of the light parallel to the lenticules, and light transmitting regions disposed near the focus of the lenticules such that light transmitted through the light transmitting apertures has a smaller angular FWHM than the light incident on the light filtering directional control element. In a further embodiment, a light emitting device comprises the light filtering directional control element of the previously described embodiment.

In one embodiment of this invention, a light emitting device comprises a linear array of LED's illuminating a lightguide from a least two opposing sides of a lightguide through the edges. In another embodiment of this invention a light filtering directional control element comprises a lenticular lens array disposed on a substrate, light reflecting regions disposed on the other side of the substrate than the lenticules, light transmitting regions disposed to filter and transmit a portion of light incident to the lenticular lens array from the light reflection region side and a lightguide wherein the light reflecting region is adhered to the lightguide and the lightguide comprises at least one selected from the group of light extraction features, an anisotropic light scattering region, and a spatially modified reflective region (departure in one or more regions from a regular linear array of clear apertures to an array of dots for example) to provide increased uniformity and light extraction from the lightguide. In one embodiment of this invention, a light emitting device comprises a light filtering directional control element comprising a reflective region that defines light transmitting apertures that vary in length and width in the directions parallel and perpendicular to the lenticules and are disposed substantially near the optical axes of the lenticules such that the light exits the lightguide through the apertures and exits the light emitting device within an angular FWHM of less that 70 degrees in at least one output plane.

In another embodiment of this invention, the first light transmitting layer has a diffuse reflectance measured in the d/8 geometry with the specular component included of greater than 70%. In another embodiment of this invention, the light blocking region is a light reflection region and the diffuse reflectance of the light reflecting region, DR, is greater than 70% as calculated by $$DR = \frac{DRT}{(1 - ART)}$$

where DRT is the total diffuse reflectance of the light transmitting layer measured in the d/8 geometry with the specular component included and ART is the percentage area ratio of the total of the light blocking and light transmitting regions that is occupied by the light transmitting region.

In another embodiment of this invention, the first light blocking regions absorb light and the diffuse reflectance of the light transmitting layer measured in the d/8 geometry with the specular component included is less than 20%. In one embodiment of this invention, the first light blocking regions are light absorbing regions and the light transmitting layer further comprises light reflecting regions disposed substantially in-between the light absorbing regions and the input surface. In one embodiment of this invention, the light reflecting regions comprise a volumetric anisotropic light scattering element.

In a further embodiment of this invention, the pitch of the first group of lenticular elements is equal to the pitch of the second group of lenticular elements and the width of the first light transmitting regions is not equal to the width of the second light transmitting regions in a first direction orthogonal to the first optical axes.

In a further embodiment of this invention, a fixture comprises a light filtering directional control element comprising the light output surface of the light emitting device, an optical lightguide, and a white diffusely reflecting film opposite the light output side of the lightguide.

In one embodiment of this invention the light filtering directional control element comprises: an input surface; an output surface; first light transmitting regions; first light blocking regions; lenticular elements formed in a first light transmitting material; a first group of lenticular elements with first lenticular apexes and first optical axes; a light transmitting layer disposed in an optical path between the input surface and the first group of lenticular elements comprising the first light blocking regions disposed in-between the first light transmitting regions; a first angle gamma, defined as the angle between the line formed between the apexes of the first group of lenticular elements and the center of the light transmitting regions and the optical axes of the first group of lenticular elements; a lightguide comprising light extraction features disposed to receive light from the input surface and transmit light to the first light transmitting layer; wherein the first group of light blocking regions are disposed to intersect the optical axes of the first group of lenticular elements and gamma is greater than 5 degrees. In a further embodiment of this invention, a light emitting device comprises the light filtering directional control element of the previous embodiment with a peak angle of illuminance greater than 0 degrees from the light output surface.

In a further embodiment of this invention, a light emitting device comprises a light filtering directional control element and a luminaire device disclosed in an embodiment of U.S. Pat. No. 5,594,830, the contents of which are incorporated by reference herein.

LFDCE—Light Transmitting Layer

In one embodiment of this invention, a LFDCE comprises a light transmitting layer disposed between lenticular elements and a first input surface. The light transmitting region may comprise light blocking regions and light transmitting regions. The light blocking regions may be light absorbing, light reflecting, partially light absorbing, partially light reflecting or a combination thereof. The light transmitting layer may comprise a light blocking region comprising a light absorbing region disposed between a light reflecting region and the lenticular elements. The light reflecting regions may be diffusely reflective or specularly reflective and the light transmitting regions may be specularly transmitting or diffusely transmitting. A light absorbing region or light blocking region, as used herein, may include a region that absorbs a first portion of light and transmits or reflects a second portion of light. A light reflecting or light blocking region, as used herein, may include a region that reflects a first portion of light and transmits or absorbs a second portion of light.

LFDCE—Light Transmitting Regions

The light transmitting regions permit light from a specific spatial region to be transmitted through to the lenticular lens array. In order to provide a light filtering directional control element with high light throughput efficiency, a sufficient amount of light must be able to be transmitted through the light transmissive regions. In one embodiment of this invention, the total luminous transmittance of the clear light transmitting regions measured according to ASTM D1003 before the application of the light blocking regions is at least one of 50%, 70%, 80%, 85%, 90%, 95% when measured with the incident light passing through the lenticular lens before the transmissive aperture region. In one embodiment of this invention, the aperture region is diffusely transmissive such that the light is diffused as it passes through the aperture region. In one embodiment of this invention, the haze of the of the clear aperture regions measured according to ASTM D1003 with a BYK Gardner Hazemeter before the application of the light blocking regions is at least one of 5%, 10%, 20%, 50%, 80%, 90%, or 99% when measured with the incident light passing through the lenticular lens before the transmissive aperture region. In another embodiment of this invention, the aperture region comprises an anisotropic light scattering region. The anisotropic light scattering region transmits and scatters light anisotropically to provide improved uniformity and a predetermined angular light distribution performance. In a further embodiment of this invention, the asymmetry ratio of the FWHM diffusion profiles of the anisotropic light scattering region is greater than one selected from the group consisting of 2, 5, 10, 30, 50, and 60.

The width of the light transmitting region is selected to provide a predetermined light output angular profile while maintaining a sufficient level light filtering and light transmission through the light filtering collimating lens. The fill factor is defined as the ratio of the light transmitting region width to the width of the light absorbing or reflecting region between the apertures along a first axis parallel to the array of lenticules. In order for the light filtering collimating lens to provide a high degree of collimation, the Collimation Factor, CF, should be sufficiently high assuming a constant focal point, lens shape and refractive index. The Collimation Factor is a relational metric used to compare the ability of a lenticular lens array to collimate light from a specific light transmitting region assuming a constant lenticule curvature and focal distance. The Collimation Factor is defined as the ratio of the pitch of the lenticular lens P1, to the aperture width, A1, or P1/A1. In one embodiment of this invention, the pitch of the lenticular lens is approximately 187 μm, the aperture width of the light transmitting region is 25 μm and the linewidth of the light absorbing (or reflecting) region is 162 μm and the CF is 6.5. In one embodiment of this invention, the CF is greater than one element selected from the group consisting of 1.5, 3, 5, 6, 8 and 10.

The location of the aperture in relation to the lenticular lens elements or arrays determines the directionality of the output light. In one embodiment of this invention, the aperture is centered along the optical axis of the lenticules in an optical element. In another embodiment of this invention, the light output distribution is off-axis and is defined by an angle, y1, defined from the apex of the lenticule to the center of the apertures and measured from the normal of the substantially planar optical element. In one embodiment of this invention, the angle γ1 is greater than one angle selected from the group comprising 5°, 10°, 15°, 20° 30° and 40°. In one embodiment of this invention, a light emitting device comprises a light filtering directional control element wherein γ1 is greater than 5 degrees and the angle of peak intensity of light output from the light emitting device is at an angle θ1 measured from a normal to the light output surface of the light emitting device where θ1 is greater than 0 degrees. In another embodiment of this invention, θ1 is greater than 5 degrees and the light emitting device is a wall-washing type light fixture wherein less light is directed into the room directly and more light is directed onto the wall than is the case when θ1=0 degrees. In one embodiment of this invention, the light filtering directional control element (or light emitting device comprising the same) has a positive far-field focus greater than a first linear dimension of the light output surface. In one embodiment of this invention, the light filtering directional control (or light emitting device comprising the same) has a positive far-field focus less than a first linear dimension of the light output surface. As used herein, far-field refers to the distance from the light emitting device light output surface that is greater than at least 10 times the separation of the smallest separation between the lenticular elements. In a further embodiment of this invention, the aperture is located substantially near the midpoint between the lenticules. In this embodiment, upon wide angle input illumination, the light filtering directional control element produces a twin-lobe output with two maximums intensities. In a further embodiment of this invention, the angular intensity profile resembles that of a batwing light distribution such as commonly desired for in a light fixture to provide a uniform illuminance distribution.

In one embodiment of this invention, the angular light output profile of the light filtering directional control element or light emitting device is controlled by spatially varying at least one of the size, shape, pitch, and transmittance of the light transmitting apertures. By having regions, with wider apertures, for example, the light output from that region will have a lower degree of collimation and higher flux output through less recycling. This technique may be used to spatially adjust the uniformity of light emitting device. In one embodiment, an edge-illuminated light emitting device comprises a light filtering directional control element wherein the aperture width increases in the region the further the distance from light source lightguide entrance edge. In this embodiment, the method used to create the linewidths of at least one of the light blocking, light reflecting, light absorbing, or light transmitting regions can be used to improve the spatial luminance uniformity of the light emitting device. Additionally, the angular output in different regions may be controlled more easily by increasing the aperture width in some regions and reducing the aperture width along at least one axis in order to provide a light emitting device with a precisely tailored output profile. In one embodiment of this invention, the angular output in different spatial regions is varied by adjusting the locations of the apertures or light transmitting regions in a first direction in a first plane relative to the optical axes of the corresponding lenticular elements where the first plane is perpendicular to the optical axes.

In one embodiment, the angular output from a light emitting device or optical element is modified in one or more regions by converting it to a spatial adjustment in the printing, transfer, exposure, etc. method used to create the size or location of lines, patterns circular holes, etc. and thus apertures. In another embodiment of this invention, at least one of the linewidth and location relative to the optical axis of its respective lenticule of the light transmitting region varies along a direction parallel to the lenticular array to provide a focusing or concentrating affect to the light output profile. As discussed herein, by shifting the light transmitting region to one side of the axis of a lenticule, light can be directed off-axis. By shifting the light transmitting regions spatially in two opposite regions in away from each other in different areas of a light emitting device, the light exiting the lenticules from those corresponding regions can be directed toward a specific location off-axis at an angle theta, thus essentially creating a positive focal point for the light output. In the case where the light transmitting regions move closer towards each other, the light output from the corresponding lenticular lens array regions diverges relative to each other, thus creating a type of negative, or virtual focus.

In one embodiment of this invention a light filtering directional control element comprises an input surface, an output surface, first light transmitting regions, first light blocking regions, a first group of lenticular elements formed in a first light transmitting material with first lenticular apexes and first optical axes, a light transmitting layer disposed in an optical path between the input surface and the first group of lenticular elements comprising the first light blocking regions disposed in-between the first light transmitting regions, a first angle γ, defined as the angle between the line formed between the apexes of the first group of lenticular elements and the center of the light transmitting regions and the optical axes of the first group of lenticular elements wherein the first group of light blocking regions are disposed to intersect the optical axes of the first group of lenticular elements and γ is greater than 5 degrees, a second group of lenticular elements formed in the first transmitting material with second lenticular apexes and second optical axes, and further comprises: a second light blocking regions disposed in the first light transmitting layer, second light transmitting regions disposed in the first light transmitting layer and in-between the second light blocking regions, a second angle δ1, defined as the angle between the line formed between the apexes of the second group of lenticular elements and the center of the second light transmitting regions and the second optical axes of the second group of lenticular elements, wherein γ is not equal to δ1. In one embodiment of this invention, the optical element comprises a lenticular element with different groups of light transmitting regions that vary in their location with respect to the corresponding optical axes of the lenticular elements. By varying the relative locations of the light transmitting apertures, the far-field angular light output can be controlled to provide a far-field focal point and off-axis directionality.

In one embodiment of this invention, a substantially planar light emitting device comprises a light filtering direction control element with a positive focal distance. In one embodiment of this invention, a substantially planar light emitting device comprises a light filtering direction control element with a negative focal distance. A positive or negative focal distance can be used in a light emitting device to provide increased control over the light output and can be used to concentrate or further spread out light within one or more output planes.

In one embodiment of this invention, the angular light output profile of the light filtering directional control element or light emitting device comprising the same is controlled by spatially varying at least one of the size, shape, pitch, and transmittance of the lenticular elements and/or the light transmitting regions.

LFDCE—Light Reflective Region

In one embodiment of this invention, light reflecting regions are disposed substantially in-between the light transmitting aperture regions in a light filtering directional control element. The reflective regions may be diffusely reflective or specularly reflective and the diffusely reflective profile may be symmetric or anisotropic. Typically in light fixtures, the light reaching the optical elements arrives from a wide range of angles and therefore, the diffuse luminance reflectance measured in a d/8 geometry (shortened here to diffuse reflectance) is a more representative measurement of the reflectance from the component in a light fixture application than 1 minus the specular transmittance such as defined and sometimes measured according to the ASTM D1003 standard. The diffuse reflectance of an element, region, or combination of regions can be measured placing the element or region(s) over an aperture of a "dark box" wherein the interior is filled with light absorbing material such as a black felt and measuring the diffuse reflectance (specular component included) of the element using a Minolta CM-508d diffuse reflectance meter.

A diffusely reflecting region as defined herein is one wherein 532 nm laser light with a divergence less than 10 milliradians incident upon the region reflects with a larger angular intensity diffusion profile such that the FWHM of the diffuse reflecting intensity profile is greater than 2 degrees within at least one plane of reflection. In one embodiment of this invention, the diffusely reflecting region anisotropically reflects light such that the angular FWHM of the reflected intensity profile is higher in a first reflectance output plane than a second reflectance output plane orthogonal to the first. In one embodiment of this invention, a light filtering directional control element comprises light reflecting regions of an anisotropically reflecting diffuser with a FWHM diffusion profile of at least 5 degrees within a first reflecting plane and an asymmetry ratio of greater than 1. In this embodiment, the light transmitting apertures are disposed between the anisotropic light scattering regions. In another embodiment of this invention, a light filtering collimating lens comprises light reflecting regions of an anisotropically reflecting diffuser with a FWHM diffusion intensity profile of at least 5 degrees within a first reflecting output plane and an asymmetry ratio of greater than 1 wherein the diffusely reflecting output plane with the larger FWHM angular intensity diffusion profile is oriented perpendicular to the lenticules in the lenticular lens array. In this embodiment, the light reflected from the anisotropically reflecting regions is more efficiently directed angularly toward the clear apertures wherein more light may pass through the light transmitting apertures than in the case of a symmetrically diffusing light reflecting region wherein light is additionally diffused in a direction parallel to the lenticules and parallel to the diffusely reflecting region. In the case of the symmetrically diffusing light reflecting region, light scattering parallel to the reflecting regions will require significantly more reflections in order to exit through the light transmitting apertures. These multiple reflections cause more of the light to be absorbed within the materials.

In one embodiment of this invention, a light filtering directional control element comprises a substantially diffusely reflecting region. In a further embodiment of this invention, a light emitting device comprises a light filtering directional control element with substantially transparent regions disposed between light reflecting regions wherein the diffuse reflectance of the light filtering directional control element is greater than one selected from the group consisting of 40%, 50%, 60%, 70%, 80%, 90%, and 95% when measured with diffusely incident light on the side of the lenticular lens array comprising the light reflecting region.

The light transmitting regions can reflect a portion of the incident light in a specular, symmetrically diffuse, or anisotropic scattering reflecting profile. In light filtering directional control elements comprising light reflecting regions and light transmitting regions which are partially transmitting and partially reflecting, the reflectance from the combination will increase the luminance and color uniformity when used in a light emitting device. In one embodiment of this invention, a light emitting device comprises a light filtering directional control element with partially transparent regions disposed between diffusely reflecting regions wherein the diffuse reflectance of the combination of the light reflecting region and the light transmitting region is greater than one selected from the group consisting of 40%, 50%, 60%, 70%, 80%, 90%, and 95%. In one embodiment of this invention, a light emitting device comprises a light filtering directional control element with light transmitting regions disposed between light reflecting regions wherein the light transmitting regions have a diffuse reflectance greater than 10% and the diffuse reflectance of the combination of the light reflecting region and the light transmitting apertures is greater than 80%. In this embodiment, more light is recycled than in the case of substantially transparent or low reflectance light transmitting regions and therefore the luminance and color uniformity of a light emitting device incorporating the element is improved while still providing a sufficient amount of light to pass through the apertures and exit the light emitting device. In a further embodiment of this invention, a light emitting device comprises a light filtering directional control element with a lenticular lens array and light reflecting regions disposed in-between light transmitting regions wherein the light transmitting regions contain asymmetric particles and the reflected light from the light transmitting region is reflected anisotropically and the diffuse reflectance of the light transmitting region is greater than 10% and less than 80%.

In another embodiment of this invention, a light emitting device comprises a light filtering directional control element comprising a lenticular lens array and light transmitting regions disposed between light reflecting regions wherein the diffuse reflectance of the light reflecting region and the light transmitting region is greater than one selected from the group consisting of 40%, 50%, 60%, 70%, 80%, 90%, and 95%.

In light filtering directional control elements which have light transmitting regions made of substantially transparent material where the total luminous transmittance is greater than approximately 92% (including Fresnel reflections), the diffuse reflectance of the light reflecting regions disposed between the light transmitting regions can be calculated. The diffuse reflectance of the light reflecting region $DR_{LR}$ can be calculated by dividing the diffuse reflectance of the total of both regions ($DR_T$) by the area ratio of the light reflecting region, $1\text{-}AR_T$ where $AR_T$ is the percentage of area of the total region occupied by the light transmitting region and thus the diffuse reflectance of the light reflecting region, $DR_{LR}=DR_T/(1-AR_T)$. In another embodiment of this invention, a light emitting device comprises a light filtering directional control element which comprises a lenticular lens array and light transmitting regions disposed between light reflecting regions wherein the diffuse reflectance of the light reflecting regions is greater than one selected from the group consisting of 80%, 90%, and 95% as measured by the aforementioned method.

In one embodiment of this invention, the diffuse reflectance of the diffusely reflecting regions is less than 95% such that more than 5% of the light is transmitted through the diffusely reflecting regions. By increasing the light transmittance (lowering the diffuse reflectance), light is transmitted at the higher angles from the normal in addition to the light passing through the clear apertures which is more collimated. The light transmitting through the diffuse regions will lower the moiré contrast between the light filtering directional control element and another optical element in the system. In one embodiment of this invention, the light output profile of a light emitting device comprising a light filtering directional control element has a softer angular cut-off due to the diffusely reflecting regions having a light transmittance greater than 5%. In a further embodiment of this invention, the light output profile of a light emitting device comprising a light filtering directional control element comprising reflecting regions having a light transmittance greater than 5% has an angular output region with a slope of less than one selected from the group of 10% per degree, 5% per degree, 2% per degree, and 1% per degree where the % drop refers to the percentage of the intensity relative to the peak intensity in the angular region between the peak intensity and the angular points at 10% intensity within at least one output plane.

LFDCE—Mirror Mode

In a further embodiment of this invention, a light emitting device comprises a light filtering direction control element comprising a specularly reflecting region wherein the light emitting device has specularly reflective properties similar to a mirror in at least one of a spatial region, angular region, and period of time (switchable to a mirror mode). In one embodiment of this invention, the specularly reflecting region allows the light emitting device to serve as a mirror when the light emitting device is off and the light filtering directional control element serves to recycle and provided increased uniformity in a small form factor (reduced total thickness of the light emitting device) as well as reducing the angular output of light such that the output light is more collimated. In a further embodiment of this invention, a light emitting device comprises a light filtering directional control element with a specularly reflective region wherein the fill factor of the specularly reflective region is greater than 50% area such that the display can be used as a mirror as well as a light emitting device simultaneously. This can allow the elimination of shadows on a mirror viewer's face and can reduce the form factor by not needing an additional, separate light source near one or more of the edges, and can also assist portability. In a further embodiment of this invention, a lighted mirror comprises a light filtering directional control element comprising a lenticular lens array, a specularly reflecting region and light transmitting regions between the linear arrays of the light reflecting regions such that the fill factor of the specularly reflecting regions is greater than 75%. In a further embodiment, the width of the light transmitting apertures is less than 100 microns such that the individual bright lines are not readily discernable when emitting light.

In a further embodiment, the light emitting device with a mirror mode further comprises red, green, and blue LED's such that the color of the light output can be adjusted to match a desired illumination color (such as fluorescent office lights, halogen lights, or daylight or a cloudy day). This is useful for a user to discern their appearance (makeup, clothes, etc.) in the expected illuminant color for the day. The intensity may also be adjusted such that the brightness is at a pleasing level. By being able to illuminate the viewer at an angle closer to or at the normal to the mirror, fewer or no shadows are visible in contrast to light disposed along the edges of a mirror. In a further embodiment, the regions corresponding to the viewers eyes has reduced light transmission by at least one of increasing the width of the light reflecting lines and reducing the transmission of the light transmitting apertures. In a further embodiment of this light emitting device with a mirror mode, the light output is collimated to an angular width of less than 15 degree FWHM in at least two orthogonal planes such that less of the light output in the regions distant from the viewers eyes will not reach their eyes and result in glare when viewing in the mirror mode.

LFDCE—Light Blocking and Light Transmitting Region

In one embodiment of this invention, the light filtering directional control element comprises light absorbing and light transmitting regions disposed in a light transmitting layer substantially in-between light transmitting apertures or regions. Some methods of manufacturing limit the diffuse reflectance of a light reflecting regions (such as in the case of a mostly reflecting, partially transmitting light reflecting region) to less than 90%. The light transmitted through the reflective regions is less collimated in some configurations and as a result the angular spread of light may be larger than desired. In one embodiment of this invention, a light absorbing region is disposed between the lenticules and the light reflecting region, and substantially over the light reflecting regions. In this embodiment, the light absorbing regions will absorb a substantial amount of residual light transmitted through the light reflecting regions. In another embodiment of this invention, the light reflecting layers reflect a portion of incident light such that the uniformity of the incident light pattern is increased without absorbing a significant amount of light that would prohibit recycling and increase light output.

In a further embodiment of this invention, a light emitting device comprising a light filtering directional control element with a light absorbing region disposed between the lenticules and a light reflecting region has a diffuse reflectance measured from the light exiting surface of the light emitting device of less than one selected from the group of 80%, 60%, 40% 30%, 20%, 10% and 5%. In a further embodiment of this invention, a light emitting device comprising a light filtering collimating lens has a diffuse reflectance of less than 20% and appears substantially black when viewed in a first angular range in the off-state and the on-state. In some applications, it is desirable to minimize ambient light reflections (in the on, off or both states) from the light fixture such as in movie theaters, airplane cockpits, etc. By employing a light absorbing region along with a light reflecting region, the recycling due to the light reflecting region and the light transmitting apertures provides the increased efficiency, uniformity and angular control, while the light absorbing regions provide reduced ambient light reflections and lower transmittance above the light reflecting regions which can reduce light levels in the predetermined angular range.

Light emitting devices with high efficiencies may often appear non-white such as silver or gray. This can occur because optical elements such as diffusers with high forward light transmission for efficiently directing light from inside the fixture to the appropriate angles and uniformity profiles outside of the fixture do not reflect ambient light. By not reflecting ambient light, the fixtures, when not turned on, often have a gray or silver appearance depending on the remaining optical elements within the fixture. In one embodiment of this invention, a light emitting device has a sufficient diffuse luminous reflectance of ambient light while maintaining a high luminous transmittance of light from the light filtering collimating lens. The diffuse reflectance of the light emitting device can be measured in a (d/8 geometry) using a Minolta CM-508d with the specular component included and measuring the reflectance from the light exiting surface on the light exiting side. The forward luminous transmittance of the light filtering directional control element used in a light emitting device can be measured by according to ASTM D1003 measured with the light incident on the diffuse reflecting side of the light filtering directional control element. In one embodiment of this invention, a light filtering directional control element has a diffuse reflectance measured on the light exiting surface of greater than 30% and a forward luminous transmittance of greater than 50%. In another embodiment of this invention, a light filtering directional control element has a diffuse reflectance measured on the light exiting surface of greater than 20% and a forward luminous transmittance of greater than 40%. In another embodiment of this invention, the optical system efficiency of a light emitting device incorporating a light filtering directional control element is greater than 60% as measured comparing the light source flux output and the flux output of a light emitting device incorporating the same light source in a sufficiently large integrating sphere according to IES LM-79-80 standard.

In another embodiment of this invention, the reflected color of the light emitting device output surface sufficiently matches that of the housing. In some environments, it is desirable to match the color of the light emitting device housing to the light emitting surface. Normally, this is difficult to achieve without introducing a light absorbing filter into the path which significantly reduces the output luminous flux of the fixture. In one embodiment of this invention, a light emitting device comprises a light filtering collimating lens with a light absorbing region disposed between a lenticular lens array and a light reflecting region wherein the light absorbing region has a color difference from a region of the light emitting device housing of Δu'v' of less than 0.1 on the 1976 u', v' Uniform Chromaticity Scale as described in VESA Flat Panel Display Measurements Standard version 2.0, Jun. 1, 2001 (Appendix 201, page 249) and measured with a Minolta CM-508d spectrometer under d/8 conditions, specular component included. In another embodiment of this invention, a light emitting device comprising a light filtering directional control element has a color difference Δu'v' of less than 0.04 between at least one region of the light emitting surface and at least one region of the housing. In another embodiment of this invention, a light emitting device comprises a light filtering directional control element wherein the difference between the diffuse reflectance of at least one region of the light emitting surface and at least one region of the housing is less than 20%. In a further embodiment of this invention, a light emitting device comprises a light filtering directional control element wherein the difference between the diffuse reflectance of at least one region of the light emitting surface and at least one region of the housing is less than 10%. In a further embodiment of this invention, a light emitting device comprises a light filtering directional control element wherein the difference between the diffuse reflectance of at least one region of the light emitting output surface and at least one region of the housing is less than 20% and the color difference Δu'v' is less than 0.2. In one embodiment of this invention, the difference (Δu'v') between the integrated light output color of a light emitting device and the average color of the output surface when viewed at an angle greater than 10 degrees from the peak output angle is greater than 0.01 when emitting light. In a further embodiment of this invention, the difference (Δu'v') between the integrated light output color of a light emitting device when emitting light and the average color of the output surface when the light emitting device is not emitting light and is illuminated by a standard illuminant A when viewed at a first angle is greater than 0.01. In one embodiment of this invention, the light emitting device is a sign, display, information device, or mirror which emits light of a first color when turned on and the output surface has a second color (or mirrored look or information content) when turned off or viewed from a second angle where the color difference (Δu'v') between the first and second colors is greater than 0.01.

In a further embodiment of this invention, the view of the surface of the light emitting device comprising a light filtering directional control element has information bearing content such as graphics, text, icons, indicia, etc. In one embodiment, the information is visible outside of the illumination angles. In one embodiment, the light absorbing regions vary in absorption such that at least one of the ambient reflected light or transmitted light exiting the light emitting device carries information in the form of text, graphics, icons or other indicia. In one embodiment of this invention, the light emitting device also functions as a sign. In one embodiment of this invention, the light emitting device is an exit sign wherein the sign can efficiently be read when the light source is off due to diffuse reflectance from the light reflecting region. In one embodiment of this invention, a light emitting device comprises a lenticular lens array with a striped, printed, light reflecting region and striped light transmitting clear region such that the light exiting the light transmitting region is refracted into a smaller angular range and the ambient light reflected displays information content through reflection from the light reflecting regions. In a further embodiment of this invention, a light emitting device, light fixture, or light emitting sign comprises a light absorbing information region between a lenticular lens array and a light reflecting region.

In one embodiment of this invention, a light filtering directional control element comprises a light absorbing region disposed between a lenticular lens array and a light reflecting region such that the separation between the light reflecting region and the light absorbing region is greater than the thickness of the thinner of the two regions. By spatially separating the two regions, the angular output of the light exiting the light filtering directional control element will have a reduced angular width. By separating the light reflecting and light absorbing regions they form a parallax barrier which can be used to limit the angular output without requiring a reduction in aperture width.

In a further embodiment of this invention, the focal point of the lenticules is substantially near at least one of the light absorbing region or the light reflecting region. In a further embodiment, the focal point is substantially in-between the light absorbing region and the light reflecting region. By designing the substrate thickness, curvature and surface profile of the lenticules such that the focal point is located at the midpoint between the light reflecting and light absorbing regions, the light throughput is optimized due to the angular spread from the focal point to the light absorbing region being equal to the angular spread from the focal point to the light reflecting region.

In a further embodiment of this invention, the light reflecting regions and the light absorbing regions are in contact with each other such as white ink printed on a cured black ink or a black toner transferred onto a white toner or a co-extruded polyester film with a black light absorbing layer and a white light reflecting layer.

LFDCE—Area Ratios

In one embodiment of this invention, the light filtering directional control element comprises at least one of light absorbing region with light transmitting regions and a light reflecting region with light transmitting regions. The light transmitting aperture ratio, ART, is the ratio of the surface area of the light transmitting region to the total area of either the light absorbing region or the light reflecting region plus the area of the light transmitting region. This area ratio affects the total optical efficiency, angular output, the spatial color and luminance uniformity, and the angular color and illuminance uniformity of the light filtering directional control element or a light emitting device employing the same. For an element comprising a light reflecting region, the light transmitting aperture ratio, ART is defined by the equation:

$$AR_T = \frac{A_T}{A_R + A_T}$$

where AT is the area of the light transmitting region and AR is the area of the light reflecting region. Similarly, for an element comprising a light absorbing region, the ratio of the surface areas is $$AR_T = \frac{A_T}{A_A + A_T}$$

where AT is the area of the light transmitting region and AA is the area of the light absorbing region.

For linear lenticular lens arrays and linear light transmitting apertures, the ratio of the areas can also be determined by the ratio of the width of the light transmitting aperture to the pitch where the pitch is the width of the light transmitting region plus either the width of the light absorbing region or the light reflecting region.

Light filtering directional control elements having small light transmitting aperture ratios will output more collimated light (light with a smaller angular FWHM cross-section of the intensity) within the plane perpendicular to the output surface and parallel to the array the lenticular lenses (parallel to the plane comprising the refraction due to the refractive lenses). Also, light filtering directional control elements with small light transmitting aperture ratios may filter out more spatial light intensity irregularities (non-uniformities such as blemishes) and when the element comprises a light reflecting region, the recycling will improve the spatial color and luminance uniformity and enable more thinner optical designs of light emitting devices.

In edge-lit light emitting devices, the light extracted near the incident edge is often much brighter than that at the far edge. In edge-lit LED light fixtures, the same can be true and the regions of the lightguide corresponding to the regions between the LED's may less bright than the regions closer to the LED's. The type, size, shape, and spatial arrangement of the light extraction features in edge-lit designs is typically adjusted to result in more uniform output from the light emitting device. Recycling films such as 90 degree prism films, diffusers, light scattering films, and white reflective films aid the uniformity through recycling and scattering, however, for a given size light entrance edge, the fewer the LED's, the more difficult it is to create a spatially uniform light extraction profile.

A term that can be used to measure the distance required to mix and extract the light from the lightguide is the Luminance Mixing Distance (LMD). For light emitting devices, it is desirable to have a luminance uniformity of at least 70%, or more preferably 80%. The uniformity (100%*[1-(Lmax-Lmin)/(Lmax+Lmin)]) is measured in the direction parallel to the entrance edge (typically parallel to the LED array) or in the direction perpendicular to the entrance edge. The LMD|| is the distance measured from the entrance edge of the lightguide to the point where the linear spatial luminance cross-section on the output surface of the light emitting device along direction parallel to the entrance edge has a luminance uniformity of at least 80%. Secondary optics on the LED's or optical components such as reflectors, lenticular lens arrays and anisotropic diffusers may be used on the entrance edge to reduce the LMD||. The length in the plane parallel to the entrance edge of the incident light profile which is incident on the edge of a substantially planar lightguide is termed Entrance Source Length (ESL). The Entrance Source Length is defined as the maximum spatial length on the entrance edge surface of a lightguide along a direction parallel to the edge of the lightguide enclosed by the angular FWHM of the intensity profile of the light incident on the edge. For light emitting devices with a constant LED pitch and constant intensity profile incident on the edge, the ESL can be measured from the LED pitch, the angular intensity profile from the LED (or LED plus secondary optics) and the distance from the LED (or LED plus secondary optics) to the edge of the lightguide. A larger ESL will have a higher luminance uniformity near the edge of the lightguide and thus the LMD|| is reduced. In the case of a multiple-LED edge-lit light emitting device, the larger the spacing or pitch (PL) between the LED's along one edge of a light emitting device, the larger the LMD|| will be for a fixed optical system (same lightguide and optical components). As a result, one metric for describing the incident light profile on the edge of a lightguide in relationship to its effect on the uniformity is the Input Light Ratio, ILR, defined as $$ILR = \frac{ESL}{P_L}.$$

Light emitting devices with a small Input Light Ratio will require more light recycling to achieve a fixed LMD|| than a those with a high ILR. In cases where the LED's are spaced from the edge and the input profiles overlap, the ILR ratio can be greater than 1. In the special case where a single LED is used, the ILR is the ESL divided by the length of the dimension of the output surface substantially parallel to the entrance edge. In one embodiment of this invention, a light emitting device has an ILR less than one selected from the group of 1, 0.7, 0.5, 0.3, 0.2 and 0.1. In another embodiment of this invention, a light filtering directional control element comprises a lenticular lens array, a light reflecting region, and a light transmitting region wherein the ILR is less than one selected from the group of 1, 0.7, 0.5, 0.3, 0.2 and 0.1. A metric for evaluating the effectiveness of a light emitting device to mix the light is the Source Adjusted Luminance Mixing Distance (LMD||SA) which adjusts the LMD|| by the Input Light Ratio and is defined as $$LMD_{\|SA} = LMD_{\|} \times ILR.$$

A light emitting device with a high level of "fast mixing" (mixing the light well over a short distance from the edge) has a very low $LMD_{\|SA}$ and has a higher performance value. These high performance "fast mixing" light emitting devices have a small $LMD_{\|}$ and a small ILR value and thus a very small $LMD_{\|SA}$. A light emitting device that has a large $LMD_{\|}$ and a small ILR or a small $LMD_{\|}$ and a large ILR has an average performance and medium $LMD_{\|SA}$ value. Light emitting devices with a large $LMD_{\|}$ and a large ILR high have a very large $LMD_{\|SA}$ and poor mixing performance. In one embodiment of this invention, a light emitting device has a $LMD_{\|SA}$ less than one selected from the group of 5 mm, 3 mm, 2 mm, and 1 mm. In another embodiment of this invention, a light filtering directional control element comprises a lenticular lens array, a light reflecting region, and a light transmitting region wherein the $LMD_{\|SA}$ is less than one selected from the group of 5 mm, 3 mm, 2 mm, and 1 mm.

The luminance of the light emitting device in the direction perpendicular to the input edge will typically be very high near the edge and fall-off the further the distance from the edge. The luminance mixing distance of a light emitting device in the direction perpendicular to the input edge, LMD⊥ is the distance measured along a line on the light emitting surface perpendicular to the entrance edge (passing through the midpoint of the light emitting surface in the direction parallel to the edge) from the entrance edge of the lightguide to the closest point at which the luminance at any further point along the line is within 80% of the average of the remaining points along the line. In one example, if the LED array is on the left side of a light emitting device, then the LMD⊥ is the distance from the edge of the lightguide to the first point along the middle of the light emitting device where all other points to the right are within 80% of the average of the remaining points to the right. Secondary optics on the LED's or optical components such as reflectors, lenticular lens arrays and anisotropic diffusers may be used on the entrance edge to reduce the LMD⊥. The length in the plane parallel to the entrance edge of the incident light profile which is incident on the edge of a substantially planar lightguide is termed Entrance Source Length (ESL). The Entrance Source Length is defined as the maximum spatial length on the entrance edge along a direction parallel to the edge of the lightguide enclosed by the angular FWHM of the intensity profile of the light incident on the edge. For light emitting devices with a constant LED pitch and constant intensity profile incident on the edge, this can be measured from the LED pitch, the angular intensity profile from the LED (or LED plus secondary optics) and the distance from the LED (or LED plus secondary optics) to the edge of the lightguide. The location, size, spacing, shape, type, etc. of the light extraction features will have a significant affect on the LMD⊥.

A light emitting device with a high level of "fast mixing" along a direction perpendicular to the LED array (mixing the light uniformly across the light emitting device) has a very high LMD⊥.

In one embodiment of this invention, a light emitting device has an LMD⊥ less than one selected from the group of 5 mm, 3 mm, 2 mm, and 1 mm. In another embodiment of this invention, a light filtering directional control element comprises a lenticular lens array, a light reflecting region, and a light transmitting region wherein the LMD⊥ is less than one selected from the group of 5 mm, 3 mm, 2 mm, and 1 mm.

As disclosed above in relation to luminance uniformity, one can also measure the performance in terms of color uniformity. For color uniformity, the Δu'v' value is measured between all points in the direction parallel to the entrance edge (typically parallel to the LED array) or in the direction perpendicular to the entrance edge. The Color Mixing Distance, $CMD_{\|}$ is the distance measured from the entrance edge of the lightguide to the point where the color uniformity Δu'v' is less than 0.04 along a cross-section on the output surface of the light emitting device along direction parallel to the entrance edge. Similarly, the Color Mixing Distance (Source Adjusted) is defined as $$CMD_{\|SA}=CMD_{\|}\times ILR.$$

In one embodiment of this invention, a light emitting device has a $CMD_{\|SA}$ is less than one selected from the group of 5 mm, 3 mm, 2 mm, and 1 mm.

In another embodiment of this invention, a light emitting device comprises a light filtering directional control element comprising a lenticular lens array, a light reflecting region, and a light transmitting region wherein the $CMD_{\|SA}$ is less than one selected from the group of 5 mm, 3 mm, 2 mm, and 1 mm.

In the direction perpendicular to the entrance edge, the Color Mixing Distance, CMD⊥, is the distance measured along a line on the light emitting surface perpendicular to the entrance edge (passing through the midpoint of the light emitting surface in the direction parallel to the edge) from the entrance edge of the lightguide to the closest point at which the color uniformity Δu'v' at any point further point along the line is less than 0.1 from the remaining points along the line. In one embodiment of this invention, a light emitting device has a CMD⊥ less than one selected from the group of 5 mm, 3 mm, 2 mm, and 1 mm. In another embodiment of this invention, a light filtering directional control element comprises a lenticular lens array, a light reflecting region, and a light transmitting region wherein the CMD⊥ is less than one selected from the group of 5 mm, 3 mm, 2 mm, and 1 mm.

LFDCE—Protective Layer

In one embodiment of this invention, a light filtering directional control element further comprises a protective layer to protect at least one of the light reflecting or light absorbing region from being scratched during assembly or operation. The protective layer may be a laminated PET layer adhered using a pressure sensitive adhesive, a protective hardcoating such as those used in the projection screen and polarizer industry or other protective layers or coatings known to increase scratch resistance. In one embodiment of this invention, the protective layer also provides the spacing between the lenticular lens array and a light collimating element.

LFDCE—Alignment

In one embodiment of this invention, a light emitting device comprises two light filtering directional control elements wherein the lenticules are arranged substantially orthogonal to each other. When a light emitting device comprises a first light filtering directional control element on the output side of the light emitting device from a second light filtering directional control element wherein the lenticules are arranged substantially orthogonal to each other and the first light filtering directional control element comprises symmetrically diffuse reflecting region, the reflected light will reflectively scatter in a plane parallel to the lenticules, which increases the angular FWHM output profile in that plane. In applications where highly collimated light emitting device output profiles in two orthogonal planes are desired, this increase in the FWHM in a plane relative to the output from the second light filtering directional control element is undesirable. In one embodiment of this invention, a light emitting device comprises a first light filtering directional control element on the output side of the light emitting device from a second light filtering directional control element wherein the lenticules are arranged substantially orthogonal to each other and the first light filtering directional control element comprises an anisotropically reflecting region where the major axis of diffusion is oriented in a plane perpendicular to the lenticules of the first light filtering directional control element and the reflected light will reflectively scatter in a plane perpendicular to the lenticules and maintain the collimation in the plane parallel to the lenticules.

Light Emitting Device Thickness

In one embodiment of this invention, the light emitting device is a direct-lit type. In another embodiment of this invention, the light emitting device is an edge-lit type. Edge-lit light emitting devices can generally be made thinner than a direct-lit type or in some cases occupy less volume when a tapered lightguide is used. In one embodiment of this invention, the light filtering directional control element increases the uniformity, reduces the thickness and provides increased collimation. In one embodiment of this invention, the light recycling and uniformity derived from the light reflecting region and the spatial filtering from the light transmitting region and lenticular lens array reduces the thickness of an edge-lit light emitting device. In one embodiment of this invention, a light emitting device comprises at least one LED light source, a lightguide, and a light filtering directional control element and the distance between an outer surface of the lightguide and light output surface of the light emitting device is less than one selected from the group of 1.5 millimeters, 1 millimeter and 0.5 millimeters.

In one embodiment of this invention, a light emitting device comprises a light filtering directional control element and the thickness of the device, t, is less than 20 millimeters thick. In a further embodiments, the thickness is less than 10 millimeters, 8 millimeters or 5 millimeters. In one embodiment of this invention, the light emitting device is a wall washing light fixture comprises a first side disposed to be coupled to a wall. In a further embodiment, the distance, L, along a line parallel to the first side from the light emitting device output surface to the point of peak luminance is greater than 20 centimeters. In one embodiment, the thickness of the light emitting device is less than 10 millimeters and the distance along the line parallel to the first side from the output surface to the point of peak illuminance is greater than 20 centimeters. In a further embodiment, d is equal to L.

The light filtering directional control element used in one embodiment of this invention enables the light to be directionally controlled toward a specific off-axis positive far-field focal point and have a point of peak illuminance relative to the output surface that results in a more uniform illuminance distribution upon a surface such as a wall at an angle to the output surface of the light emitting device. In one embodiments of this invention, the light filtering directional control element permits the thickness of the light emitting device relative to the width of the device to be reduced. In another embodiment of this invention, the thickness of the light emitting device comprising a light filtering directional control element can be reduced relative to the distance, L. In a further embodiment of this invention, the light emitting device has a width, w, such that $$\frac{w}{t} > 5 \text{ or } \frac{w}{t} > 10 \text{ or } \frac{w}{t} > 20.$$

In a further embodiment of this invention $$\frac{L}{t} > 5 \text{ or } \frac{L}{t} > 10 \text{ or } \frac{L}{t} > 20 \text{ or } \frac{L}{t} > 50.$$

Other Films and Components

In one embodiment of this invention, a light emitting device comprises a light filtering directional control element which comprises a lenticular lens array, at least one of a light absorbing or light reflecting region, and a lightguide designed to direct light along a direction such that the light can effectively be outcoupled from the lightguide spatially such that the uniformity of the light exiting the element is improved when illuminated from the edge. In one embodiment of this invention, a light filtering directional control element comprises a lenticular lens array optically coupled to at least one of a light reflecting region with light transmitting apertures or a light absorbing region with light transmitting apertures, where one region is optically coupled to a lightguide.

One or more elements or films within the light emitting device or light filtering directional control element may be combined by using adhesives (such as pressure sensitive adhesives), thermally bonding, co-extrusion, insert molding, and other techniques known to combine two polymeric films or elements. In one embodiment of this invention, a light filtering directional control element, lenticular lens, or light redirecting element comprises an element with surface relief structures of a first material with a first refractive index ns that is at least one of a lenticular lens array and light collimating element wherein the element is physically coupled to second optical element by using second material with a second refractive index nc such that ns−nc>0.01. In this embodiment, the lenticular lens or light redirecting element can be physically coupled to another element while still retaining a level of refraction or reflection. In another embodiment, the value ns−nc is greater than one selected from the group of 0.05, 0.1, 0.2, 0.4 or 0.5. In one embodiment of this invention, at least one of the lightguide, the light filtering directional control element, the lenticular lens array, light redirecting element, or volumetric light scattering element comprises a high refractive index UV curable material such as known in the optical film industry and described in U.S. Pat. Nos. 6,107,364, 6,355,754, 6,359,170, 6,533,959, 6,541,591, 6,953,623 and international patent application number PCT/GB2004/000667, the contents of each are incorporated by reference herein.

In one embodiment of this invention, a light emitting device comprises a light source, a lightguide and further comprises at least one additional coating or film selected from anti-reflection coating, anti-glare coating, capping layers, capping layers designed to protect metal metallic layers from oxidization or from other compounds such as adhesives, adhesives, glues, reflective films, tinted films, protective films, graphic films, patterned films, tinted films, colored or tinted coating, light scattering coating or film, hard coating or film comprising a hardcoating, housing element, decorative films, support lenses, metallic support baskets, glass components, light transmitting components, housing or element to hold more than one component together, element to enable rotation or translation of one or more elements relative to the other and other components known to be usable within a light fixture in the lighting industry and a backlight in the display industry or known to be usable in other light emitting devices.

In another embodiment of this invention a light emitting device comprises a lightguide and at least one additional collimating element such as a 90 degree apex angle prismatic film. In one embodiment of this invention, pre-conditioning the light incident on the light filtering collimating element, transmits more light and the FWHM angular output angles of the light emitting device along one or more output planes is reduced relative to a light emitting device comprising just the light recycling directional control element. In one embodiment of this invention, a light emitting device comprises two crossed 90 degree prismatic collimating films and a optical composite such that the angular width of the FWHM intensity profile within one output plane is less that 15 degrees. In a additional embodiment of this invention, a light emitting device comprises two crossed 90 degree prismatic collimating films and a optical composite such that the angular width of the FWHM intensity profile within one output plane is less that 10 degrees. In another embodiment of this invention, a light emitting device comprises two crossed 90 degree prismatic collimating films and a optical composite such that the FWHM along one output plane is less than 8 degrees. In another embodiment of this invention, a light emitting device comprises a light filtering collimating element, a first 90 degree prismatic collimating film and a second 90 degree prismatic film providing brightness enhancement with anisotropic light scattering phase domains dispersed within the substrate as describe in U.S. patent application Ser. No. 11/679,628, the contents of which is incorporated herein by reference. In this embodiment, the angular width of the FWHM intensity profile within one output plane is less than one selected from the group of 8 degrees, 10 degrees, 15 degrees or 20 degrees. In another embodiment of this invention, a light emitting device comprises a 90 degree prismatic collimating film disposed above an optical composite wherein the prisms are oriented substantially orthogonal to the lenticules and further comprises a second 90 degree prismatic film disposed on the opposite side of the optical composite providing brightness and uniformity enhancement with anisotropic light scattering phase domains dispersed within the substrate and a lightguide and at least one light emitting diode. In one embodiment of this invention, the use of at least one brightness enhancing or collimating film along with a optical composite which comprises a light absorbing region permits more light to pass through the optical composite due to the more highly collimated incident light profile upon the light recycling directional control element. In one embodiment of this invention, a light emitting device comprises at least one collimating film selected from the group of BEF, BEF II, BEF III, TBEF, BEF-RP, BEFII 90/24, BEF II 90/50, DBEF-MF1-650, DBEF-MF2-470, BEFRP2-RC, TBEF2 T 62i 90/24, TBEF2 M 65i 90/24, NBEF, NBEF M, Thick RBEF, WBEF-520, WBEF-818, OLF-KR-1, and 3637T OLF Transport sold by 3M, PORTGRAM V7 sold by Dai Nippon Printing Co., Ltd., LUMTHRU that sold by Sumitomo Chemical Co., Ltd. and ESTINAWAVE W518 and W425 DI sold by Sekisui Chemical Co., Ltd.

The light emitting device may also comprise an optical composite and a light re-directing component that re-directs a substantially portion of the light into an off-axis orientation. In one embodiment of this invention, a light emitting device comprises a optical composite and a non-symmetrical prismatic film such as a Image Directing Film (IDF or IDFII) or Transmissive Right Angle Film (TRAF or TRAFII) sold by 3M. In one embodiment of this invention, a light emitting device comprises a optical composite and a non-symmetrical prismatic film. In one embodiment of this invention, a light emitting device comprises an optical composite and a symmetrical prismatic film to re-distribute the light symmetrically about an axis such as a prismatic film with a 60 degree apex angle with the prisms oriented toward the output surface. In other embodiment of this invention, a light emitting device comprises a lenticular lens array, a light reflecting region, light transmitting regions, and a linear prism film with an apex angle between 45 degrees and 75 degrees where the substrate of the linear prism film is coupled directly or through another layer to the light reflecting regions with the prisms oriented away from the lenticules. In another embodiment of this invention, the linear prism film is a "reverse prism film" such as sold by Mitsubishi Rayon Co., Ltd. under the trade names of DIA ART H150, H210, P150 and P210, or is a prismatic film of a similar type as disclosed in the embodiments within U.S. Pat. Nos. 6,545,827, 6,151,169, 6,746,130, and 5,126, 882, the contents of which are incorporated by reference herein.

In one embodiment of this invention, a light emitting device comprises an LED array on a flexible circuit disposed in a circular or arc shape in proximity to a lightguide within an optical composite or as a separate component from the light recycling directional control element. In one embodiment of this invention, a light emitting device comprises a circular array of LED's on flexible circuit such that the light from the LED's is directed inward toward the center of a circular disc-shaped lightguide comprising light extraction elements of at least one type selected from the group of embossed features, laser-ablated features, stamped features, inked surface patterns, injection molded features, etched surface patterns, sand or glass-blasted micro-patterns, uv cured embossing patterns, dispersed phase particle scattering, scattering from region comprising beads, fibers or light scattering or diffracting shapes or other surface relief pattern. In one embodiment of this invention, the light emitting device in the previous embodiment further comprises a light recycling directional control element. In this embodiment, the light emitting device illuminates a circular display.

One or more elements or films within the light emitting device or optical composite may be combined by using adhesives (such as pressure sensitive adhesives), thermally bonding, co-extrusion, insert molding, and other techniques known to combine two polymeric films or elements. In one embodiment of this invention, a optical composite comprises an element with surface relief structures of a first material with a first refractive index $n_s$ that is at least one of a lenticular lens array and light collimating element wherein the element is physically coupled to second optical element by using second material with a second refractive index $n_c$ such that $n_s - n_c > 0.01$. In this embodiment, the lenticular lens array or collimating element can be physically coupled to another element while still retaining a level of refraction or reflection. In another embodiment, the value $n_s$-$n_c$ is greater than one selected from the group of 0.05, 0.1, 0.2, 0.4 or 0.5. In one embodiment, the lenticular lens array or collimating element is made of a high refractive index UV curable material (such as known in the optical film industry and described in U.S. Pat. Nos. 6,107,364, 6,355,754, 6,359,170, 6,533,959, 6,541, 591, 6,953,623 and international patent application PCT/GB2004/000667, the contents of each are incorporated by reference herein.

Light Transmitting Material Composition

In an embodiment of this invention, at least one of the lightguide, optical film or element, light scattering element, light redirecting optical element, light filtering directional control element, light scattering lens, protective lens, housing, mounting element, thermal transfer element, volumetric light scattering element comprises a light transmitting material.

In one embodiment of this invention, the light transmitting material is a polymer or a polymer blend or alloy material comprising multiple polymers, glass, rubbers, or other materials. Each material may be a single phase or multiple phase material.

Such polymers include, but are not limited to acrylics, styrenics, olefins, polycarbonates, polyesters, cellulosics, and the like. Specific examples include poly(methyl methacrylate) and copolymers thereof, polystyrene and copolymers thereof, poly(styrene-co-acrylonitrile), polyethylene and copolymers thereof, polypropylene and copolymers thereof, poly(ethylene-propylene) copolymers, poly(vinyl acetate) and copolymers thereof, poly(vinyl alcohol) and copolymers thereof, bisphenol-A polycarbonate and copolymers thereof, poly(ethylene terephthalate) and copolymers thereof; poly (ethylene 2,6-naphthalenedicarboxylate) and copolymers thereof, polyarylates, polyamide copolymers, poly(vinyl chloride), cellulose acetate, cellulose acetate butyrate, cellulose acetate propionate, polyetherimide and copolymers thereof, polyethersulfone and copolymers thereof, polysulfone and copolymers thereof, and polysiloxanes.

Numerous methacrylate and acrylate resins are suitable for one or more phases of the present invention. The methacrylates include but are not limited to polymethacrylates such as poly(methyl methacrylate), poly(ethyl methacrylate), poly (propyl methacrylate), poly(butyl methacrylate), poly(isobutyl methacrylate), methyl methacrylate-methacrylic acid copolymer, methyl methacrylate-acrylate copolymers, and methyl methacrylate-styrene copolymers (e.g., MS resins). Suitable methacrylic resins include poly(alkyl methacrylate)s and copolymers thereof. In particular embodiments, methacrylic resins include poly(methyl methacrylate) and copolymers thereof. The acrylates include but are not limited to poly(methyl acrylate), poly(ethyl acrylate), and poly(butyl acrylate), and copolymers thereof.

A variety of styrenic resins are suitable for polymeric phases of the present invention. Such resins include vinyl aromatic polymers, such as syndiotactic polystyrene. Syndiotactic vinyl aromatic polymers useful in the present invention include poly(styrene), poly(alkyl styrene)s, poly (aryl styrene)s, poly(styrene halide)s, poly(alkoxy styrene)s, poly(vinyl ester benzoate), poly(vinyl naphthalene), poly(vinylstyrene), and poly(acenaphthalene), as well as the hydrogenated polymers and mixtures or copolymers containing these structural units. Examples of poly(alkyl styrene)s include the isomers of the following: poly(methyl styrene), poly(ethyl styrene), poly(propyl styrene), and poly(butyl styrene). Examples of poly(aryl styrene)s include the isomers of poly (phenyl styrene). As for the poly(styrene halide)s, examples include the isomers of the following: poly(chlorostyrene), poly(bromostyrene), and poly(fluorostyrene). Examples of poly(alkoxy styrene)s include the isomers of the following: poly(methoxy styrene) and poly(ethoxy styrene). Among these examples, suitable styrene resin polymers include polystyrene, polyp-methyl styrene), poly(m-methyl styrene), polyp-tertiary butyl styrene), poly(p-chlorostyrene), poly(m-chloro styrene), polyp-fluoro styrene), and copolymers of styrene and p-methyl styrene. In particular embodiments, styrenic resins include polystyrene and copolymers thereof.

Particular polyester and copolyester resins are suitable for phases of the present invention. Such resins include poly (ethylene terephthalate) and copolymers thereof, poly(ethylene 2,6-naphthalenedicarboxylate) and copolymers thereof, poly(1,4-cyclohexandimethylene terephthalate) and copolymers thereof, and copolymers of poly(butylene terephthalate). The acid component of the resin can comprise terephthalic acid, isophthalic acid, 2,6-naphthalenedicarboxylic acid or a mixture of said acids. The polyesters and copolyesters can be modified by minor amounts of other acids or a mixture of acids (or equivalents esters) including, but not limited to, phthalic acid, 4,4'-stilbene dicarboxylic acid, 2,6-naphthalenedicarboxylic acid, oxalic acid, malonic acid, succinic acid, glutaric acid, adipic acid, pimelic acid, suberic acid, azelaic acid, sebacic acid, 1,12-dodecanedioic acid, dimethylmalonic acid, cis-1,4-cyclohexanedicarboxylic acid and trans-1,4-cyclohexanedicarboxylic acid. The glycol component of the resin can comprise ethylene glycol, 1,4-cyclohexanedimethanol, butylene glycol, or a mixture of said glycols. The copolyesters can also be modified by minor amounts of other glycols or a mixture of glycols including, but not limited to, 1,3-trimethylene glycol, 1,4-butanediol, 1,5-pentanediol, 1,6-hexanediol, 1,7-heptanediol, 1,8-octanediol, 1,9-nonanediol, 1,10-decanediol, 1,12-dodecanediol, neopentyl glycol, 2,2,4,4-tetramethyl-1,3-cyclobutanediol, diethylene glycol, bisphenol A and hydroquinone. Suitable polyester resins include copolyesters formed by the reaction of a mixture of terephthalic acid and isophthalic acid or their equivalent esters with a mixture of 1,4-cyclohexanedimethanol and ethylene glycol. In particular embodiments, the polyester resins include copolyesters formed by the reaction of terephthalic acid or its equivalent ester with a mixture of 1,4-cyclohexanedimethanol and ethylene glycol.

Certain polycarbonate and copolycarbonate resins are suitable for phases of the present invention. Polycarbonate resins are typically obtained by reacting a diphenol with a carbonate precursor by solution polymerization or melt polymerization. The diphenol is preferably 2,2-bis(4-hydroxyphenyl)propane (so-called “bisphenol A”), but other diphenols may be used as part or all of the diphenol. Examples of the other diphenol include 1,1-bis(4-hydroxyphenyl)ethane, 1,1-bis(4-hydroxyphenyl)cyclohexane, 2,2-bis(4-hydroxy-3,5-dimethylphenyl-)propane, 2,2-bis(4-hydroxy-3-methylphenyl)propane, bis(4-hydroxyphenyl)sulfideandbis(4-hydroxyphenyl)sulfone. The polycarbonate resin can be a resin which comprises bisphenol A in an amount of 50 mol % or more, particularly 70 mol % or more of the total of all the diphenols. Examples of the carbonate precursor include phosgene, diphenyl carbonate, bischloroformates of the above diphenols, di-p-tolyl carbonate, phenyl-p-tolyl carbonate, di-p-chlorophenyl carbonate and dinaphthyl carbonate. Particularly suitable are phosgene and diphenyl carbonate.

A number of poly(alkylene) polymers are suitable for phases of the present invention. Such polyalkylene polymers include polyethylene, polypropylene, polybutylene, polyisobutylene, poly(4-methyl)pentene), copolymers thereof, chlorinated variations thereof, and fluorinated variations thereof.

Particular cellulosic resins are suitable for phases of the present invention. Such resins include cellulose acetate, cellulose acetate butyrate, cellulose acetate propionate, cellulose propionate, ethyl cellulose, cellulose nitrate. Cellulosic resins including a variety of plasticizers such as diethyl phthalate are also within the scope of the present invention.

Light Transmitting Material Additives

Additives, components, blends, coatings, treatments, layers or regions may be combined on or within the aforementioned regions to provide additional properties to the light transmitting material. These may be inorganic or organic materials. They may be chosen to provide increased rigidity to enable support of additional films or light emitting device components. They may be chosen to provide increased thermal resistance so that the plate or film does not warp. They may be chosen to increase moisture resistance, such that the plate does not warp or degrade other properties when exposed to high levels of humidity. These materials may be designed to provide improved optical performance by reducing wet-out when in contact with other components in the light emitting device. Additives may be used to absorb ultra-violet radiation to increase light resistance of the product. They may be chosen to increase, decrease, or match the scratch resistance of other components in the light fixture, display, backlight, or other light emitting device. They may be chosen to decrease the surface or volumetric resistance of the element such as a lightguide or a region of the element to achieve anti-static properties.

The additives may be components of one or more layers of the optical element or lightguide. The additives may be coatings that are added onto a surface or functional layers that are a combined during the manufacturing process. The additives may be dispersed throughout the volume of a layer or coating or they could be applied to a surface.

Adhesives such as pressure-sensitive or UV-cured adhesives may also be used between one or more layers to achieve optical coupling. Materials known to those in the field of optical films, plates, diffuser plates, films and backlights to provide optical, thermal, mechanical, environmental, electrical and other benefits may be used in the volume or on a surface, coating, or layer of the optical element or one of its regions. The adhesive layer may also contain symmetric, asymmetric, or a combination of symmetric and asymmetric domains in order to achieve desired light-scattering properties within the diffusion layer.

Light Transmitting Material Anti-Static Additives

Anti-static monomers or inert additives may be added to one or more regions or domains of the light transmitting material. Reactive and inert anti-static additives are well known and well enumerated in the literature. High temperature quaternary amines or conductive polymers may be used. As an anti-static agent, stearyl alcohol, behenyl alcohol, and other long-chain alkyl alcohols, glyceryl monostearate, pentaerythritol monostearate, and other fatty acid esters of polyhydric alcohols, etc., may be used. In particular embodiments, stearyl alcohol and behenyl alcohol are used.

Method of Manufacturing the Light Filtering Directional Control Element

In one embodiment of this invention, the light filtering directional control element is manufactured by according to a predetermined design by using traditional manufacturing techniques such as offset lithography, web printing, letterpress, digital printing, and screen printing used for lenticular graphics, prints, images and 3D displays such as known in the art. Methods of manufacturing lenticular prints are disclosed in U.S. Pat. Nos. 7,136,185, 5,573,344, 5,560,799 and Ph.D. thesis by Gary Jacobsen for Dissertation Presented to the Faculty of the School of Engineering of Kennedy-Western University for the Degree of Doctor of Philosophy in Engineering Management titled "FIRST NOVEL INVENTION OF INLINE WEB FED ROLL PRINT MANUFACTURING PRODUCTION OF ANIMATED/THREE DIMENSIONAL IMAGED PRINT PRODUCTS INCORPORATING ADVANCED LENTICULAR TRANSPARENT SUBSTRATE . . . ITS ADVANTAGES AND THE COMPARISON/CONTRAST ORDER ANALYSIS TO PRIOR U.S.P.T.O. PATENTED ART", the contents of each are incorporated by reference herein. Typically lenticular image prints comprise 2 or more images separated into alternating strips disposed near the focal point of the lenticular lenses to generate two or more views in a stereoscopic or "flip" or other viewing mode. Similarly, light absorbing strips are printed, adhered, transferred or otherwise formed on the light input side of lenticular lens arrays in the projection screen and display industry. Methods for producing the light absorbing stripes or light absorbing regions within bead-based or lenticular screens are disclosed in U.S. Pat. Nos. 5,870,224, 6,307,675, 6,781,733, 6,829,086, 5,563,738, 6,631,030, 5,563,738, 6,896,757, 6,912,089, 5,870,224 and 6,519,087, the contents of each are incorporated by reference herein. Other methods of obtaining light reflecting or light absorbing regions on a substrate or substantially planar surface of a lenticular lens array include thermal transfer such as disclosed in U.S. Pat. No. 4,871,609, the contents of which are disclosed herein by reference. The lenticular print manufacturing or the projection screen manufacturing processes may be altered or steps may be added to produce a light filtering directional control element comprised of a lenticular array or array of surface relief lenses such as beads, at least one of a light absorbing or light reflecting region and a light transmitting region. In one embodiment of this invention, the light reflecting region is formed with a similar process to one of the methods in the aforementioned patents wherein light absorbing particles such as carbon black are replaced with light reflecting particles such as $BaSO_4$ or $TiO_2$. In one embodiment of this invention, a method of producing a light filtering directional control element comprises of forming a layer of light reflecting material on a substrate, subsequently forming a layer of light absorbing material on the light reflecting material, thermally or optically transferring the light absorbing and light reflecting material in selected regions from the substrate to a substantially planar surface of a lenticular or surface relief lens array film such that the light absorbing and light reflecting regions are registered at a predetermined location on the substantially planar side of the lens array.

In another embodiment of this invention, a light filtering directional control element is produced by printing a light absorbing region upon a lenticular lens array in a predetermined linear pattern in registration with the lenticules and subsequently printing a light reflecting region in registration and on top of or spaced apart from the light absorbing region. In another embodiment of this invention, a light filtering directional control element is produced by subsequently coating a light absorbing and light reflecting layer on lenticular substrate and subsequently exposing through the lenticular lens array with infra-red illumination such that the light is focused in regions corresponding to the focal point of the lenticular lenses such that at least one of the following occur: the bond between the light absorbing region and the substrate is broken, the light absorbing material is ablated off of the substrate, the light absorbing material and the light reflecting material is ablated off of the substrate. The light reflecting or light absorbing regions may comprise compositions such as infra-red absorbing dies, adhesion modifiers, light sensitive adhesion modifiers etc. such that the ablation occurs or the bond is broken at a sufficiently low laser power without significantly damaging the lenticular lens surface or the opposite, substantially planar surface. The IR exposure may be from a frequency doubled-YAG laser, a $CO_2$ laser, a bank of collimated infra-red heating lamps or other IR light sources that can be collimated through reflective or refractive optics or have a naturally low beam divergence.

In a further embodiment of this invention, a method of producing a light filtering directional control element comprises forming a layer of light reflecting material on a substrate, subsequently disposing a layer of light absorbing material above the light reflecting material, depositing an array of spherical or substantially spherical beads of a diameter that is at least twice as thick as the combined light reflective and light absorbing regions, and applying pressure to the beads and substrate through the use of stamps, presses, rollers or films on rollers such that the beads are pressed into the light absorbing and light reflecting regions, wherein one or more of the beads is in sufficiently close proximity to the substrate to provide a light transmitting aperture. In a further embodiment of this invention, the light transmitting aperture provided by the bead permits at least 20% of the incident light from the bead side to transmit through the light filtering directional control element. In a further embodiment of this invention, the method of manufacturing a light filtering directional control element further comprises and additional step of thermal, optical, evaporative, or radiation curing which substantially increases the bonding or substantially fixes the location of one or more of the beads. In one embodiment of this invention, the exposed bead side of the light filtering directional control element is further coated with a substantially conformal (or low refractive index) protective sealant and cured (thermally, optically, evaporative, radiation, extrusion coated, etc) such that beads are substantially fixed in their location.

In a further embodiment of this invention, the light filtering directional control element is produced by optically coupling in one or more regions a lenticular or bead-based surface refractive element to at least one of a light absorbing and light reflecting region, and further optically coupling the combined element to at least one of a light collimating film, a prismatic refractive or total internal reflection based film such as a "reverse prism" type film described in U.S. Pat. No. 5,126,882, the contents of which are incorporated by reference herein, or IDF or TRAF manufactured by 3M, a symmetrically or anisotropically scattering volumetric or surface relief diffuser, or a lightguide.

In a further embodiment of this invention, a method of producing a light filtering directional control element comprises forming a layer of light reflecting material on a lenticular lens substrate or layer formed thereupon, exposing the light reflecting region with electromagnetic radiation wherein the light reflecting layer is altered to form light transmitting regions in the areas of higher exposure by the process of the voided reflecting materials being heated to a temperature above it's glass transition temperature and the voids collapse, thus increasing the transmission in the region. In a further embodiment, heat is applied to the light reflecting region before or during exposure such that the light exposure required is reduced. Materials suitable to change their transmission due to collapsing voids due to heat or pressure are described in U.S. patent application Ser. No. 10/984,390, the contents of which are incorporated herein by reference. In a further embodiment of this invention the method of manufacturing a light filtering directional control element comprises the step of applying pressure to a lenticular lens element with a light reflecting layer disposed on the opposite side or a layer thereupon of the lenticular lens element than the lenticules such that a sufficient amount of pressure is transferred to the voided light reflecting region to collapse one or more voided regions disposed beneath the apex of the lenticules. In a further embodiment, the resulting light filtering optical element of the previous embodiment has a light transmission greater than 20% in the case of light entering the lenticule side as measured according to ASTM D1003. In a further embodiment, heat is applied to the lenticular lens element during or before the application of the pressure in the aforementioned embodiment.

In a further embodiment of this invention, a method of producing a light filtering directional control element comprises forming or adhering a multi-layer polymeric reflector film on a lenticular lens substrate or layer formed thereupon, exposing the multi-layer polymeric reflector with electromagnetic radiation wherein the light reflecting layer is altered to form light transmitting regions in the areas of higher exposure. In this embodiment, the light reflecting regions may be made more transmissive by the process of annealing (changing the refractive index in one or more directions in one or more layers or regions, ablation (removing one or more layers or regions), swelling or shrinking (expansion or shrinking in the thickness direction of one or more layers or regions such that the wavelengths corresponding to optical interference are shifted closer to the infra-red or UV wavelength spectrum), or deforming (heating the region to a temperature above it's glass transition temperature. Simultaneously applied pressure or heating may be used with one or more of the embodiments described herein for making a light filtering directional control element so as to provide the benefit of at least one of increasing the transmittance in the region, increasing production (or modification) speed, or enable the modification to occur with a lower light intensity such as providing a bias temperature for melting or deforming.

In another embodiment of this invention, a method of manufacturing a light filtering directional control element comprises the steps of coating beads onto voided light reflecting film such as described herein in the aforementioned voided film patents, applying heat and pressure to the resulting film such that the beads penetrate into the light reflecting film and collapse the voids and decrease the distance between the opposite surface to the beads. In a further embodiment, the resulting light filtering optical element of the previous embodiment has a light transmission greater than 20% in the case of light entering the lenticule side as measured according to ASTM D1003. By using glass beads or beads made from cross-linked materials, the deformation temperature can be selected to be sufficiently greater than the voided material such that when pressure or pressure and heat are applied, the beads will displace the matrix material of the voided film and/or collapse the voids in the voided material. In a further embodiment of this invention, the voided film used in the reflective region is one selected from the group of a biaxially oriented PET film, a biaxially oriented polypropylene and a PTFE film.

In a further embodiment of this invention, the method of producing a light filtering directional control element comprises the step of transferring a light reflecting region onto the substantially planar side of a lenticular lens sheet or layer thereupon by registering and laser printing or using another electrostatic imaging process using a white scattering toner such as produced by Automatic Transfer Inc or is described in U.S. Pat. Nos. 4,855,204, 6,114,077, 6,921,617, and 6,797,447, the contents of each are incorporated by reference herein.

In one embodiment of this invention, the process of producing a light filtering directional control element comprises the step of extrusion embossing (or UV cured embossing) onto or into a light scattering film a lenticular or other lens pattern. In this embodiment, the thickness of the light filtering directional control element is reduced since the light scattering film serves as a substrate of the lenticular lens array. In designs where the light scattering region is disposed between the lenticules and at least one of the light absorbing region and light reflecting region, the total thickness of the light filtering directional control element is reduced. In one embodiment of this invention the process of producing a light filtering directional control element comprises extrusion embossing lenticular lens elements onto an anisotropic light scattering diffuser. The features maybe extrusion embossed into the light scattering film during the production of the light scattering film or as a subsequent step where the features are embossed directly into a region of the light scattering film (including capping or outer regions of sufficient thickness) or a coating applied to the surface of the light scattering film. In another embodiment of this invention, the process of producing a light filtering directional control element comprises the step of extrusion embossing (or UV cured embossing) onto or into a light scattering film a lenticular or other lens pattern on one or both sides of a light scattering region or film.

In one embodiment of this invention, the process of producing a light filtering directional control element comprises the step of applying a UV sensitive material (such as Cromalin by DuPont) to the substantially planar side of a lenticular lens or layer thereupon, exposing through the lenticules with substantially collimated UV light incident substantially normal to the array of lenticules, applying light absorbing or reflecting particles or toner to the UV sensitive material whereupon the exposed regions are less tacky and the particles do not adhere to the UV sensitive materials in the region. In a further embodiment of this invention, the process of producing a light filtering directional control element comprises the step of applying a UV sensitive material to the substantially planar side of a lenticular lens or layer thereupon, exposing through the lenticules with substantially collimated UV light incident at an angle $\beta_2$ from a surface normal to the array of lenticules, applying light absorbing or reflecting particles or toner to the UV sensitive material whereupon the exposed regions are less tacky and the particles do not adhere to the UV sensitive materials in the region. In one embodiment of this invention, $\beta_2$ is greater than one selected from the group of 5 degrees, 10 degrees, 20 degrees, 30 degrees, and 45 degree. By exposing through the lenticules at an angle, the resulting spatial locations of the linear light transmitting regions are displaced relative to UV exposure normal to the array of lenticules and the resulting light filtering directional control element has an angular light output profile wherein the peak is at an angle $\beta_3$ from the normal to the output surface where $\beta_3>0$ degrees such that the peak intensity of the output light is off-axis.

In a further embodiment of this invention, the method of producing a light filtering directional control element comprises the step of using a white transfer pigment layer for the light reflecting region on a lenticular lens film such as described in U.S. Pat. No. 5,705,315, the contents of which are incorporated by reference herein. Other printing and transfer methods known in the printing industries may also be used.

Method of Manufacture of Lightguide or Optical Element

In one embodiment of this invention, at least one element or region of a lightguide, light redirecting element, light scattering lens, light scattering element, volumetric light scattering element, surface relief light scattering element, light reflecting element, or reflector is an optical composite comprising two or more regions of material comprising at least one light transmitting material or light reflecting material with predetermined optical properties. In a further embodiment of this invention, a method of manufacturing at least one element or region of a lightguide, light redirecting element, light scattering lens, light scattering element, volumetric light scattering element, surface relief light scattering element, light reflecting element, or reflector comprises at least one of the steps of extrusion, profile extrusion, casting, injection molding, stamping, embossing, thermoforming, laminating, welding, or other known polymer processing technique. Profile extrusion, thermoforming and injection molding are particularly useful methods for creating a curved lightguide or other element of the light emitting device.

Optical Composite & Method of Manufacture

An optical composite comprises two or more regions of material comprising at least one light transmitting material or light reflecting material with predetermined optical properties. The composite may comprise two light transmitting materials wherein the optical properties may be similar or substantially different. The composite may comprise a light transmitting material and a light reflecting metal material such as a volumetric light scattering film optically coupled to an aluminum reflector. The optical composite may also comprise, for example, a non-scattering light transmitting material and a volumetric light scattering material. In one embodiment of this invention, an optical composite comprises two or more regions of material, comprising at least one light transmitting material or light reflecting material with predetermined optical properties, selected from a light transmitting material, non-scattering light transmitting material, light redirecting element, light scattering element, volumetric light scattering element, light reflecting element, metal-based light reflecting element, lenticular lens, light scattering lens, light filtering directional control element, tinted film, colored film, film with indicia, graphics or text, or other film or component or combination presented in an embodiment of this invention or known in the field of lighting, backlighting for displays, or sign and graphics industry.

In one embodiment of this invention, a method of manufacturing an article comprises the steps of providing a mold for injection molding, providing a light source comprising a light emitting diode with a first light emitting source surface, providing a first volumetric anisotropic light scattering diffuser film comprising a first light scattering region comprising asymmetrically shaped domains, placing the light source in a first predetermined location and first angular orientation in the mold, placing the first diffuser film a in a second predetermined location and second angular orientation in the mold, injecting a light transmitting thermoplastic material or light transmitting liquid polymer precursor material into the mold such that the light transmitting material is optically coupled to the anisotropic diffuser film. In one embodiment of this invention, the article is an optical composite. In a further embodiment, the optical composite is a component of an illuminating device light emitting device such as a light fixture or backlight for a liquid crystal display.

In a further embodiment of this invention, the method of manufacturing an article further comprises positioning the light source such that the light transmitting material is optically coupled to the output surface of the light source. In one embodiment of this invention, the mold comprises a patterned surface with light extracting surface features disposed thereon.

In a further embodiment of this invention, the anisotropic light scattering film comprises a surface with light redirecting surface features such as light collimating surface features or light extracting surface features. In one embodiment of this invention, the method of manufacturing an article further comprises orienting the anisotropic light scattering diffuser film containing asymmetric domains such that the asymmetric domains are aligned with their longer dimension substantially parallel to the first optical axis of the first light source.

In a further embodiment, the light source comprises an array of light emitting diodes with a first light source optical axis. In one embodiment of this invention, the anisotropic diffuser film is oriented in the mold with its asymmetric domains substantially aligned parallel to the optical axis of the light source.

A further embodiment of this invention includes aligning the light source such that its optical axis is substantially parallel to the first light output surface and the volumetric anisotropic light scattering film is oriented in the mold with the asymmetric domains aligned with their longer dimension substantially parallel to the first optical axis of the first light source. A further embodiment of this invention includes aligning the asymmetric film with the asymmetric domains aligned with their longer dimension substantially perpendicular to the first light source array axis.

In a further embodiment of this invention, the volumetric anisotropic light scattering diffuser film has an anisotropic ratio, AR, defined by the ratio of the first angular width at half maximum diffusion intensity in a plane perpendicular to the first light source axis of $FWHM_1$ and a second angular width at half maximum diffusion intensity in a plane parallel to the first light source axis of $FWHM_2$ such that AR>2, or preferably AR>5, or more preferably AR>10. In this embodiment, the scattering in the output surface plane is minimized by having a high DAR ratio such that the output coupling can be controlled by the light extraction features.

In a further embodiment of this invention, the volumetric anisotropic light scattering diffuser film has a domain asymmetry ratio, DAR, defined by the ratio of the first average dimensional length in a plane perpendicular to the first light source axis of $L_1$ to a second average dimensional length in a plane parallel to the first light source axis of $L_2$ where DAR>2, DAR>5, or DAR>10. In this embodiment, the scattering in the output surface plane is minimized by having a high DAR ratio such that the output coupling can be controlled by the light extraction features.

In a further embodiment, of this invention the anisotropic light scattering diffuser film is positioned such that it is substantially beneath the light emitting diode output surface relative to the light output surface. In one embodiment, the volumetric anisotropic light scattering film is disposed to receive light directly from a point on the light emitting source surface at an incidence angle in the light transmitting material of less than 20 degrees from a normal to the first light output surface. In a further embodiment, the anisotropic light scattering film is disposed to receive light directly from the light source output surface at an incidence angle in the light transmitting material parallel to the normal to the first output surface.

In one embodiment of this invention, the light source is positioned such that the optical axis passes through a non-scattering region of the volumetric anisotropic light scattering diffuser film. In a further embodiment of this invention, the anisotropic light scattering diffuser film comprises a second light scattering region separated from the first light scattering region by a substantially non-scattering region.

In one embodiment of this invention the method of manufacturing an article further includes the step of placing a second volumetric anisotropic light scattering diffuser film comprising asymmetrically shaped domains in a third predetermined location and third angular orientation in the mold before injecting material into the mold.

In a further embodiment of this invention, the mold further comprises a light collimating feature disposed to reduce the angular extent of the light incident on the light redirecting features within the light transmitting material within a plane perpendicular to the first output surface and parallel to the optical axis.

In one embodiment of this invention, the light transmitting material comprises substantially spherical light scattering domains. In one embodiment, the substantially spherical light scattering domains along with a tapered light transmitting material function together by scattering and reflecting to create a substantially uniform spatial luminance along the first output surface in a direction perpendicular to the light source array axis.

In one embodiment of this invention, the anisotropic light scattering diffuser film comprises a first diffuser surface in optical contact with the light transmitting material wherein the first diffuser surface substantially comprises a first diffuser film material with a melt temperature $T_{m1}$ and the light transmitting material has a second melt temperature $T_{m2}$ such that $T_{m1}-T_{m2}>20$ degrees Celsius. In another embodiment of this invention, $T_{m1}-T_{m2}$ is greater than 40 degrees Celsius. In a further embodiment, $T_{m1}-T_{m2}$ is greater than 60 degrees Celsius.

In one embodiment of this invention, a lightguide is formed from light totally internally reflecting from a surface of one or more of the first light transmitting materials, second light transmitting material, light diffusing film, light redirecting optical film, or other optical component optically coupled to the light transmitting material.

Insert molding and extrusion lamination are two examples of secondary processes that can be used to achieve a thickness of an optical component or composite of greater than 1 mm. One embodiment of this invention is an optical composite comprising an anisotropic light scattering region of less than 1 mm in thickness and a second substantially light transmitting region that is greater than 1 mm in thickness. In a further embodiment, the second light transmitting region is substantially transparent to light in the visible wavelength spectrum. In another embodiment, the second light transmitting region is substantially non-scattering. In a further embodiment, the composite has light redirecting features within the volume or on the surface of the light transmitting region. Light redirecting features include refractive, reflective or scattering features such a lenses, prisms, hemispherical, defined optical shapes with functionality, or arrays or patterns of these features. Examples of light redirecting features, layers configurations, additives, material selections, applications, light sources, optical properties and methods of component manufacturing are described in U.S. patent application Ser. Nos. 11/679,628, 11/223,660, 11/282,551, 11/426,198, and 60/820,241, the entirety of each are incorporated herein by reference. The mold tool or roller may include a light redirecting feature or the film inserted may contain the light redirecting feature.

In one embodiment, the extrusion lamination, injection molding, or other material used in a secondary process contains dispersed domains. These domains may be asymmetrically shaped, symmetrically shaped, oriented along at least one axis. In one embodiment, these domains comprise at least one of an immiscible polymer, cross-linked particles, glass microspheres, hollow glass microspheres, polymer fibers, inorganic fibers, glass fibers, dispersed polymer beads, particles, core-shell particles, and other materials and additives known to be usable in optical components. In one embodiment of this invention, the optical composite comprises polymer photonic crystal fiber (PCF) such as disclosed in U.S. patent application Ser. No. 11/067,848, the entirety of the application is incorporated herein by reference. In another embodiment of this invention, the optical composite includes fibers comprising co-continuous phases such as disclosed in U.S. patent application Ser. No. 11/068,313, the entirety of the application is incorporated herein by reference. In one embodiment of this invention, the optical composite comprises composite polymer fibers such as those disclosed in U.S. patent application Ser. No. 11/068,158, the entirety of the application is incorporated herein by reference. In a further embodiment of this invention, the optical composite comprises inorganic fibers such as those disclosed in U.S. patent application Ser. No. 11/125,581, the entirety of the application is incorporated herein by reference. In a further embodiment of this invention, the optical composite comprises a polymer weave such as described in U.S. patent application Ser. No. 11/068,590, the entirety of the application is incorporated herein by reference.

In one embodiment of this invention, the optical composite may provide one or more of the following optical functions: absorptive polarizer, reflective polarizer, scattering polarizer, substantially symmetrically scattering diffuser, anisotropically scattering diffuser, forward scattering diffuser, backward scattering diffuser, collimating element, light redirecting element, refracting element, spatial light homogenizer, increased axial luminance, increased spatial luminance uniformity along at least one axis, reduced speckle from coherent sources, non-depolarizing transmission, non-depolarizing reflection, increased angular luminance uniformity, increased forward specular transmission.

By substantially matching the refractive index of the optical film continuous phase material with the light transmitting material, the optical efficiency is improved due to the reflection intensity reduction from the interface. In one embodiment, the refractive index of the continuous phase material substantially matches the refractive index of the light transmitting region along at least one axis. In one embodiment, the difference between the refractive index of the optical film continuous phase material and the light transmitting material along a first axis is less than 0.05.

In one embodiment of this invention, the optical composite creates an improved light guide. The optical composite can include more than one light scattering region that is co-extruded or co-laminated or extrusion laminated on one or more sides of the component. In one embodiment an enhanced optical component comprises an anisotropic light scattering component on one side of a thicker, substantially non-scattering region with at least one additional light scattering region optically coupled to the non-scattering region. In a further embodiment, two anisotropic light scattering films are optically coupled to a thicker substantially non-scattering region. This can be achieved by insert molding two films or extrusion laminating on a sheet with two film feeds. In a further embodiment, a light scattering component comprising a polycarbonate continuous phase region is optically coupled to polystyrene region by extrusion laminating to the polystyrene sheet during the extrusion process. An adhesive promoter or adhesive such as a compatibilizer may be used. In this example, the refractive indexes of the polycarbonate and polystyrene are substantially indexed matched along a first axis. In this example, the composite has an increased shatter resistance over the polystyrene due to the polycarbonate matrix film bonded to the polystyrene. In a further embodiment, two anisotropic light scattering films are insert-molded on opposite sides of a PMMA region.

In one embodiment, of this invention, an arcuate lightguide composite comprises a substantially non-scattering light transmitting material (or a material with a Clarity greater than 50%) and dispersed phase domains wherein the composite is manufactured by injection molding the non-scattering light transmitting material into a mold comprising a volumetric light scattering film. In another embodiment, of this invention, an arcuate lightguide composite comprises a substantially non-scattering light transmitting material (or a material with a Clarity greater than 50%) and dispersed phase domains wherein the composite is manufactured by injection molding the non-scattering light transmitting material and a light scattering material comprising dispersed phase domains into a mold using a two-shot process.

In one embodiment, of this invention, an arcuate lightguide composite comprises a substantially non-scattering light transmitting material (or a material with a Clarity greater than 50%) and light extraction features wherein the composite is manufactured by injection molding the non-scattering light transmitting material into a mold comprising a film with light extraction surface features. In another embodiment, of this invention, an arcuate lightguide composite comprises a substantially non-scattering light transmitting material (or a material with a Clarity greater than 50%), dispersed phase domains, and light extraction features wherein the composite is manufactured by injection molding the non-scattering light transmitting material and a light scattering material comprising dispersed phase domains into a mold with inverted light extraction features using a two-shot process.

In one embodiment, the improved light guide comprises an anisotropic light scattering region on opposite sides of a substantially non-scattering region. In a typical light guide, a portion of the light traveling along the light guide is totally internally reflected from the lightguide-air interface. At least one additional lightguide is created when a component has an anisotropic light scattering region on one or both sides of the non-scattering region. A portion of the light incident on the light scattering region will scatter, reflect, or diffract off of one or more disperse phase domain-matrix interfaces and continue to travel along the light guide. A portion of the light that passes through the light scattering region will be scattered out of the light guide and a second portion of the light will totally internally reflect off of the matrix-air interface. In this embodiment, the matrix-air interface forms an outer lightguide and the two substantially parallel light scattering regions form an inner light guide. Each light scattering region also forms a lightguide with each surface. The anisotropic light scattering regions may be oriented orthogonally to each other. The light scattering regions may be polarization dependent, polarization independent, wavelength dependent, or a spatially varying combination thereof and the non-scattering regions may be birefringent, tri-refringent, substantially isotropic, or a spatially varying combination thereof.

In a further embodiment of this invention, two substantially planar light scattering regions are oriented at an angle $\theta 5$ with respect to each other with a substantially non-scattering region optically coupled and disposed in an optical path between the two regions. In one embodiment, substantially planar anisotropic light scattering regions are oriented 90° to each other on the edge and face of a non-scattering light guide. In a further embodiment, the thickness of at least one of the light scattering regions is less than 1 millimeter and the thickness of the substantially non-scattering region is greater than one millimeter. In a further embodiment, the thickness of at least one of the light scattering regions is less than 0.5 millimeter and the thickness of the substantially non-scattering region is greater than 0.5 millimeters. In a further embodiment, the thickness of at least one of the light scattering regions is less than 0.5 millimeter and the thickness of the substantially non-scattering region is greater than 1 millimeter. In a further embodiment the thickness of the non-scattering light region is at least twice the thickness of at least one of the light scattering regions. This allows the light scattering properties which can be better controlled through a film extrusion process to be utilized in an injection molded or thick extrusion process wherein it is difficult to achieve the desired optical properties and orientation of the thicker, extruded material.

The improved optical composite of this invention can be used to provide improved luminance uniformity and angular light distribution when illuminated from the edge. The optical composite of this invention can be used as a light guide for illuminating a spatial light modulating device such as an LCD. In one embodiment, the optical composite illuminates an LCD providing spatial luminance uniformity. The light emitting device or optical composite may comprise one or more light re-directing, brightness enhancement, prismatic films, reflective or absorptive polarizers, non-polarization dependent light homogenizer, polarization-dependent light homogenizer, or other optical films commonly used in backlights for displays may also be used to provide improved light efficiency, re-direction, or recycling. Polarization sensitive light homogenizers such as those discussed in U.S. patent application Ser. No. 11/828,172, the contents of which are incorporated by reference herein, may be used as the anisotropic light scattering film, an additional film within the optical composite or in conjunction with the optical composite to form a light emitting device, backlight or light fixture. One or more of the anisotropic light scattering films or regions disclosed herein may be a high clarity scattering layer such as those described in U.S. patent application Ser. No. 11/958,361, the contents of which are incorporated by reference herein. Multi-functional non-imaging optical components such as those discussed in U.S. patent application Ser. No. 12/030,203, the contents of which are incorporated by reference herein, may be used as the anisotropic light scattering film, an additional film within the optical composite or in conjunction with the optical composite to form a light emitting device, backlight, or light fixture. In addition to the light redirecting films disclosed herein, light redirecting elements such as those discussed in U.S. patent application No. 60/985,649, the contents of which are incorporated by reference herein, may be used as the anisotropic light scattering film, an additional film within the optical composite or in conjunction with the optical composite to form a light emitting device, backlight, or light fixture. The optical composite in accordance with one embodiment of this invention further comprises a light filtering collimating element such as described in an embodiment of U.S. patent application No. 61/028,905, the contents of which are incorporated by reference herein. The optical composite in accordance with another embodiment of this invention further comprises a optical composite such as described in an embodiment of U.S. patent application No. 61/036,062, the contents of which are incorporated by reference herein.

In a further embodiment of this invention polarization sensitive optical films are insert-molded one on or more sides of a light guide to provide increased optical efficiency through polarization recycling. These films may be specularly reflecting or provide anisotropic scattering that is polarization sensitive. In a further embodiment of this invention, the optical composite comprises at least one polarization sensitive light homogenizer to provide improved spatial luminance uniformity, light recycling efficiency for a pre-determined polarization state or improved angular redirection of light.

The optical composite of this invention may be used to increase the luminance uniformity or angular light distribution of a light emitting device such as a light fixture, information display, or illuminator.

In a further embodiment of this invention, the composite comprises an anisotropic light scattering region and a surface relief structure formed within the volume of the substantially non-scattering region. The surface relief structure can provide additional light redirection, collimation, extraction, diffusion, recycling or other desired optical functionality such as those commonly used with backlights for LCD's. The surface relief structure may be located on more than one surface of the composite. In one embodiment, the surface relief profile is machined into the tool of the mold used in the insert molding process. In a further embodiment a casting roll is milled to provide the desired surface structure on one side of the composite with an optical film extrusion laminated to the opposite side.

In a further embodiment of this invention, an enhanced optical composite comprises an anisotropic light scattering region, a substantially non-scattering region and an optically coupled light emitting source such as an LED. In one embodiment of this invention, one or more LED's or arrays of LED's are insert molded along with an anisotropic light scattering region to form a light emitting optical composite. In one embodiment, the anisotropic light scattering region forms a secondary light guide to provide increased luminance uniformity. Other methods for combining light sources to a light guide are described in U.S. patent application Ser. No. 11/494,349 the entirety of which is incorporated herein by reference.

In one embodiment of this invention, a linear array of LED's is optically coupled along with a light scattering film in an extrusion lamination process to a substantially non-scattering region that is thicker than the light scattering region. In a further embodiment, the linear array of LED's are formed with high temperature materials such that the melting temperature of the LED materials is higher than that of the molten extrusion material. In a further embodiment, the LED array is cooled below ambient temperature in the extrusion process such that the heat from the molten polymer is dissipated through the LED materials before causing damage.

In one embodiment of this invention, a light emitting device comprises an optical composite and a light emitting source where in the optical composite comprises a substantially non-scattering region of a first thickness, d1, and at least one anisotropic light scattering region of a second thickness, d2, optically coupled to the non-scattering region wherein a portion of the light from the light emitting source is anisotropically scattered from the anisotropic light scattering region, passes through the non-scattering region and totally internally reflects from the air-non-scattering region interface such that upon scattering from the light scattering region upon the second pass it is scattered to an angle that is less than the critical angle of the air-non-scattering region interface, escapes the composite and the spatial luminance uniformity is greater than 70%. In a further embodiment, d1 is greater than d2 or $d1>2*d2$ or $d1>4*d2$ or $d1>6*d2$. In a further embodiment, at least 5% percent of the light incident normal to the surface of the composite passes through the anisotropic light scattering region at least twice. In a further embodiment, at least 20% percent of the light incident normal to the surface of the composite passes through the anisotropic light scattering region at least twice. In a further embodiment, at least 50% percent of the light incident normal to the surface of the composite passes through the anisotropic light scattering region at least twice.

In a further embodiment, the anisotropic light scattering region contains asymmetrically shaped domains oriented substantially parallel to a linear array of LEDs or an array of linear fluorescent bulbs. By transferring the total internal reflection interface to an interface located at a distance further from the light source, the light guide created by the scattering region and the TIR surface will improve the spatial luminance uniformity.

Method of Manufacture—Injection Molding Process

In one embodiment, of this invention, an arcuate lightguide comprises a substantially non-scattering light transmitting material (or a material with a Clarity greater than 80%) and light extraction features wherein the composite is manufactured by injection molding the non-scattering light transmitting material into a mold comprising inverted light extraction surface features. Methods, techniques, and materials suitable for injection molding of optical components and optical films are known in the art and include those referenced in U.S. Pat. No. 7,270,465 by Keh et al, U.S. Pat. No. 6,490,093 by Guest, and U.S. patent application Ser. No. 11/273,863, the entire contents of each are incorporated herein by reference. In one embodiment of this invention, the method of manufacturing the lightguide, light redirecting element, scattering element or optical composite is a 2-shot injection molding process. In one embodiment, a first light transmitting material of a melt temperature $T_{m3}$ is injection molded into a mold comprising the light source. In a second step, a surface of the mold is removed and a second light transmitting material of a melt temperature $T_{m4}$ is injected into the mold such that the first light transmitting material is optically coupled to the second light transmitting material and $T_{m3}-T_{m4}$ is greater than 20 degrees Celsius. In a further embodiment of this invention, $T_{m3}-T_{m4}$ is greater than 40 degrees Celsius. In another embodiment, $T_{m3}-T_{m4}$ is greater than 60 degrees Celsius. In one embodiment of this invention, the light transmitting material comprising the at least one of the light redirection features or light diffusing film is protected from thermal damage during operation of the light emitting device by a thermal buffer material of a second light transmitting material with a higher melt temperature that is optically coupled and bonded to the first light transmitting material. In one embodiment, a high temperature material such as a polycarbonate or fluoropolymer can be injection molded and optically coupled to the LED light emitting surface and material with a lower injection molding temperature such as PMMA can be used to generate the light redirecting features or optically couple to the light diffusing film such that the film does not melt nor need to be made of a high temperature material. By being able to optically couple a first light transmitting material to the light source emitting surface less light more light is transmitted since there isn't a material-air interface upon which light will reflect.

Light Output Profile of Light Emitting Device

In one embodiment of this invention, a light emitting device has a peak angle of illuminance greater than 0 degrees from the normal to the light output surface. In a further embodiment of this invention, a light emitting device has a light output profile resembling a batwing profile with peak angles greater than 50 degrees from the normal to the light output surface. In another embodiment of this invention, a light emitting device has more than one peak luminescent intensity profile. In another embodiment of this invention, the light output profile of the light emitting device has an angular luminescent peak intensity wherein the peak is at an angle $\beta_3$ from the normal to the light output surface where $\beta_3>0$ degrees such that the peak intensity of the output light is off-axis.

In a further embodiment of this invention, a light emitting device has a luminescent intensity output profile that is symmetric in a first output plane and asymmetric in a second plane orthogonal to the first, wherein the optical axis of the light emitting device is the central angle of symmetry in the first plane and the angle of peak luminous intensity in the second plane.

In a further embodiment of this invention, the angular luminescent intensity output of the light emitting device varies in different surface regions of the light emitting output surface. The angular light output profile may vary spatially by increasing the aperture width in some regions and reducing the aperture width along at least one axis in order to provide a light emitting device with a precisely tailored output profile. In one embodiment of this invention, the angular output in different spatial regions is varied by adjusting the locations of the apertures or light transmitting regions in a first direction in a first plane relative to the optical axes of the corresponding lenticular elements where the first plane is perpendicular to the optical axes.

In another embodiment of this invention, the light emitting device has a focusing or concentrating light output profile. By adjusting the different properties of one or more regions spatially, the light from the corresponding regions can be directed toward a specific location off-axis at an angle theta, thus essentially creating a positive focal point for the light output from the light emitting device. In another embodiment of this invention, the light output from one or more regions from the light output surface regions diverge relative to each other, thus creating a type of negative (or virtual focus) for the light emitting device.

Adjustable Light Output Profile

In one embodiment of this invention, at least one of the peak direction or the FWHM of the angular light output profile in one or more output planes of a light emitting device is manually or electronically adjustable by rotating around a first axis or translating in a first direction one or more of the lightguide, light redirecting element, light scattering lens, volumetric light scattering element, light filtering directional control element, prismatic collimating film, position or orientation of a light source such as an LED, or non-symmetric prismatic light redirecting film such as Image Directing Film or Transmissive Right Angle Film, both produced by 3M. In another embodiment of this invention, the peak direction or the FWHM of the angular light output profile of a light emitting device is adjustable electronically without any moving parts by using an electronically reconfigurable diffusing element such as a Polymer Dispersed Liquid Crystal (PDLC) element. A PDLC can be switched from a substantially diffuse state to a substantially clear state by the application of an electric voltage in the regions corresponding to at least one of the light reflecting regions, light absorbing regions, light transmitting regions, or region above the lenticular lens array of a light filtering directional control element. In one embodiment, the light emitting device can be electronically controlled to switch from a light output profile of less than 10 degrees FWHM to one that is greater than 40 degrees within at least one light output plane.

A-Type LED Lamp

In a further embodiment, an A-type LED lamp is constructed to achieve an omnidirectional light output. This provides an A-type lamp with much greater luminous efficacy than an incandescent A-type lamp and a light distribution closer to an ideal omnidirectional pattern than achieved in typical LED A-type lamps.

According to one preferred embodiment of the present invention, the plane circuit board is envisioned as consisting of a ring of LEDs along the edge of the bulb. The plane circuit board and a LED driver circuit are mounted in the lamp base and/or within the outcoupling optic.

The LED members may be of any color, size, and shape, as permitted for the base configuration and arranged in any such manner as recognized by those of skill in the art.

According to further preferred embodiment of the present invention, the outcoupling optic is mounted on said LED lamp base adjacent to or physically coupled to said plurality of LED members and light from the LEDs are input into the outcoupling optic. The outcoupling optic transfers light from the LEDs and projects the light in a distribution pattern similar to a standard incandescent A19 lamp.

The outcoupling optic is made of a high light permeable material and may be designed in such a way that it has recesses to increase light input efficiency from LED members and perform additional optical affects such as redirection towards the intended optical path. The outcoupling optic is also envisioned as including a system of reflective elements to reflect a large percentage of the visible light emanating from the LEDs that may otherwise be dissipated through the lens. In a preferred embodiment a light outcoupling layer is used on or within the light outcoupling optic. The light outcoupling layer scatters light to allow a portion of incident light to scatter and subsequently exceed the critical angle of total internal reflection and thus emit from the outcoupling optic. The outcoupling layer may consist of any configuration which scatters light such as a volumetric diffusing film, a pattern of surface features, or a coating of light scattering particles.

Alternatively, outcoupling of light may be achieved through the use of either a solid or hollow light guide configuration.

These and other features, advantages, and objects of the present invention will be further understood and appreciated by those skilled in the art by reference to the following specification and appended drawings.

FIG. 1 is a cross-sectional side view of a screw-socket light bulb light emitting device 100 of one embodiment of this invention comprising a tapered arcuate lightguide 102. Light from the LED's 101 is directed into a tapered arcuate lightguide 102 with a volumetric light scattering element 103 disposed adjacent to an inner surface of the arcuate lightguide 102. The light 106 scatters from the volumetric light scattering element 103 and is directed at an angle such that it escapes the tapered arcuate lightguide 102. Light 107 totally internally reflects within the tapered arcuate lightguide 102 and escapes the tapered arcuate lightguide 102 due to the taper through the light output surface 111 of the light emitting device 100. In one embodiment of this invention, the light output surface of the lightguide is the light output surface of the light emitting device. The light emitted from the light emitting device 100 has a light emitting device optical axis 104 and an optical angle of inclusion, α, from the light emitting device optical axis 104 for a first percentage of output light 105. The light emitting device 100 further comprises a thermal transfer element 109 which is thermally coupled to the LED's 101 and has a dimension that extends in-between two surfaces of the tapered arcuate lightguide 102 and past the LED's 101 in the direction of the light emitting device optical axis 104. The thermal transfer element 109 is physically coupled to a mounting element 110. The mounting element may include a housing or connector such as a screw-type connector.

In one embodiment of this invention, the optical angle of inclusion, α, is greater than one selected from the group of 5 degrees, 10 degrees, 20 degrees, 30 degrees, 45 degrees, 60 degrees and 90 degrees. In another embodiment of this invention, the first portion of light emitted from the light emitting device is greater than or equal to one selected from the group of 50%, 60%, 70%, 80%, 90% and 100%.

Figure 2:
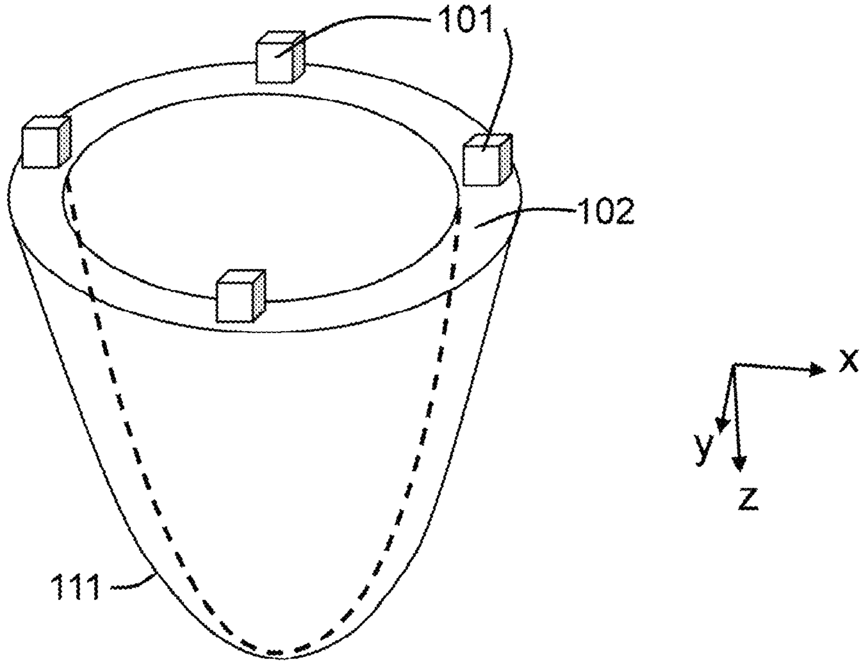
FIG. 2 is a perspective view of the arcuate lightguide of FIG. 1.

FIG. 2 is a perspective view of the tapered arcuate lightguide 102 of FIG. 1 illustrating the LED's 101 disposed to couple light into the tapered arcuate lightguide 102 along a first input edge. In one embodiment of this invention, the lightguide may be substantially rotationally symmetric about an axis, such as the optical axis of the light emitting device.

Figure 3:
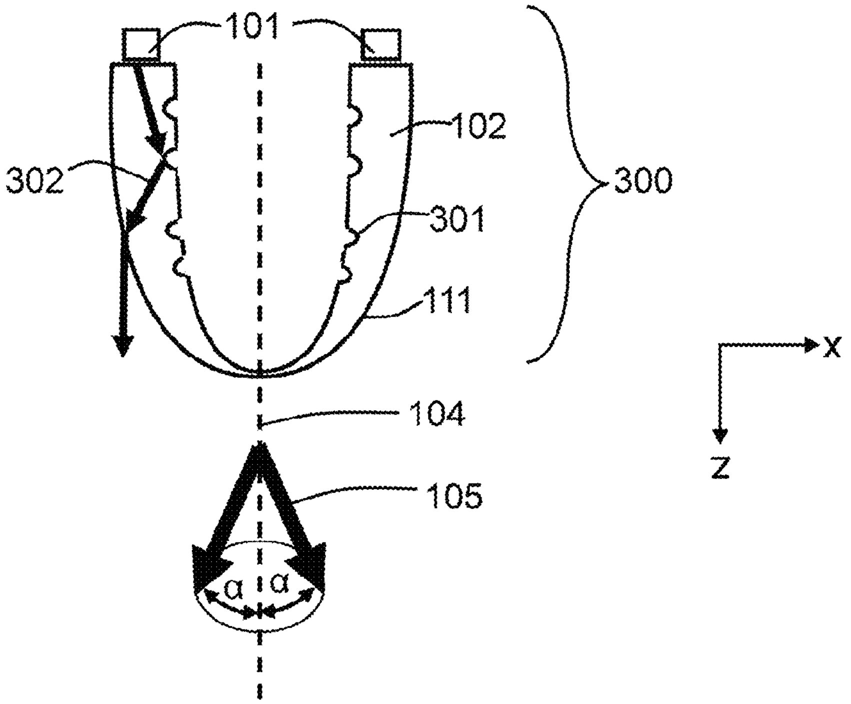
FIG. 3 is a cross-sectional side view of a light emitting device of one embodiment of this invention comprising an arcuate lightguide with light extracting surface features.

FIG. 3 is a cross-sectional side view of a light emitting device 300 comprising a tapered arcuate lightguide 102 with light extracting surface features 301. Light 302 from the LED's 101 is directed into the tapered arcuate lightguide 102 and is redirected by the light extracting surface features 301 such that it exits the tapered arcuate lightguide 102.

Figure 4:
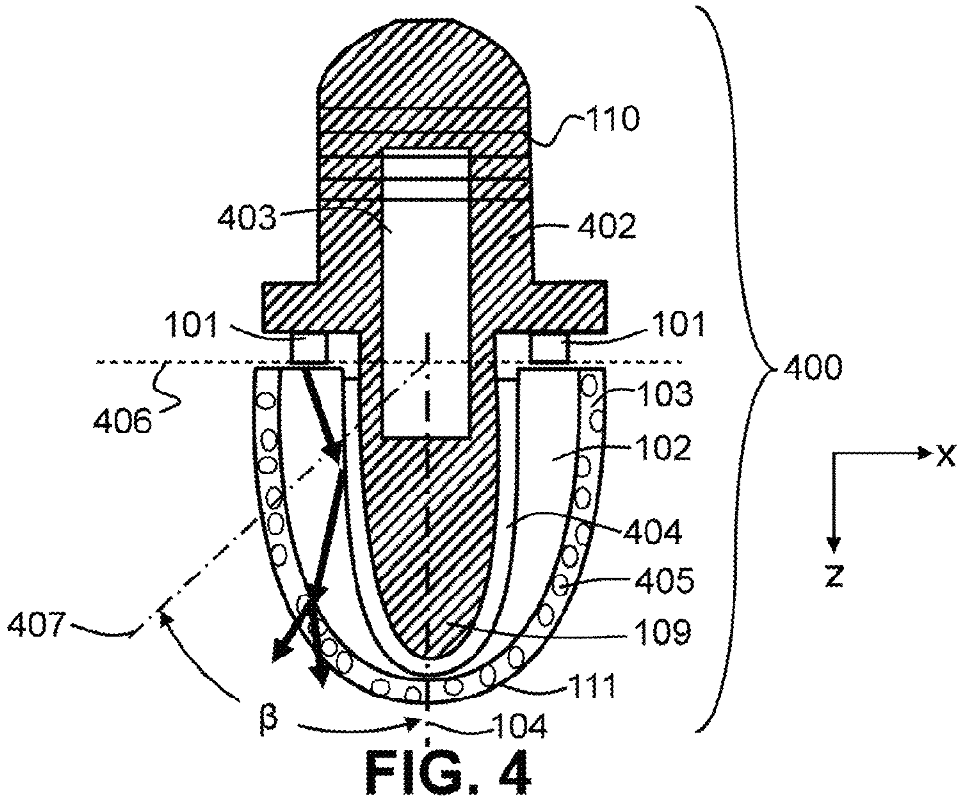
FIG. 4 is a cross-sectional side view of a light emitting device of one embodiment of this invention comprising a thermal transfer element and arcuate lightguide.

FIG. 4 is a cross-sectional side view of a light emitting device 400 with a thermal transfer element 402 with a dimension extending past the light output plane 406 at the LED's 101. The light emitting device 400 further comprises driver electronics 403 for the LED's 101 which have a dimension extending past the light output plane 406 at the LED's 101. The light emitting device 400 further comprises a specularly reflective film 404 disposed between the tapered arcuate lightguide 102 and the thermal transfer element 402. The volumetric light scattering element 103 is optically coupled to the tapered arcuate lightguide 102 and comprises light scattering domains 405 disposed to scattered a first portion of light from the LED's 101. The volumetric light scattering region or element may be disposed on the inner or outer surface of the lightguide. The light emitting device 400 further comprises a light output plane 406 orthogonal to light emitting device optical axis 104 at the output surface of the LEDs 101. The light emitting device 400 further comprises an angular luminous intensity glare cut-off axis 407. The angular luminous intensity glare cut-off axis 407 is the axis at which the angular luminous intensity falls below a glare intensity threshold. In one embodiment of this invention, the glare intensity threshold is a glare threshold intensity selected from the group of 300 candelas, 220 candelas, and 135 candelas. In one embodiment of this invention, the luminous intensity output of the light emitting device is less than at least one selected from the group of 300 candelas at 55 degrees, 220 candelas at 65 degrees, 135 candelas at 75 degrees, and 45 candelas at 85 degrees from the vertical. In another embodiment of this invention, the glare intensity threshold is a percentage of the peak luminous intensity of the light emitting device. The percentage of the peak luminous intensity of the light emitting device for the glare intensity threshold is one selected from the group of 50%, 40%, 30%, 20%, and 10%. The angle, β, is the angle between the light emitting device optical axis 104 and angular luminous intensity glare cut-off axis 407. In one embodiment of this invention, the angle, β, is one selected from the group of 40 degrees, 45 degrees, 50 degrees, 55 degrees, 60 degrees and 70 degrees.

Figure 5:
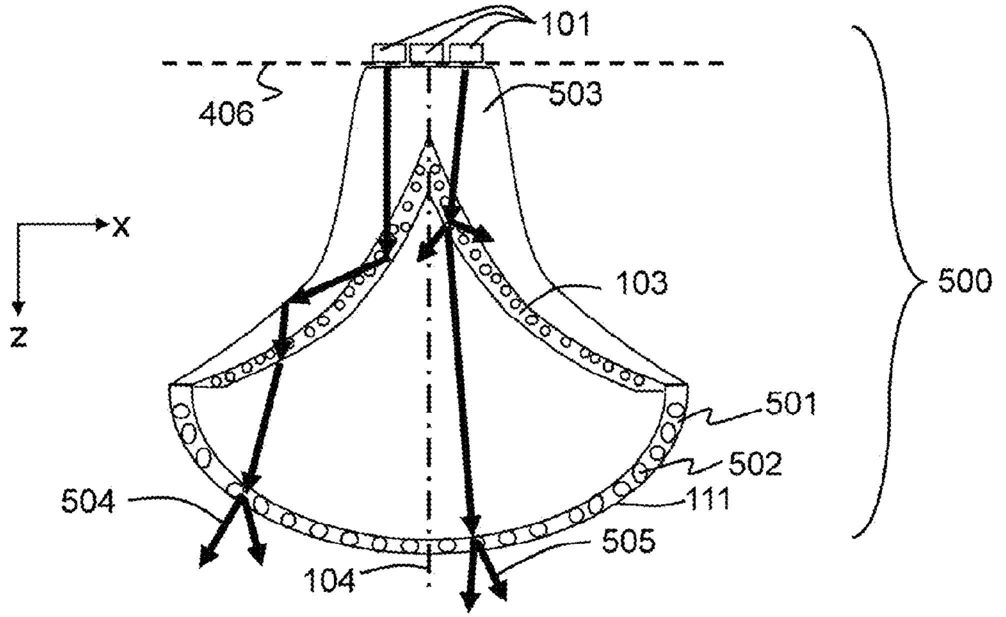
FIG. 5 is a cross-sectional side view of a light emitting device of one embodiment of this invention comprising a rotationally symmetric tapered lightguide.

FIG. 5 is a cross-sectional side view of a light emitting device 500 comprising a rotationally symmetric tapered lightguide 503 with a volumetric light scattering element 103 optically coupled to an inner surface of the rotationally symmetric tapered lightguide 503. The light emitting device further comprises a light scattering lens 501 comprising light scattering domains 502. Light 504 escapes the rotationally symmetric tapered lightguide 503 due to the taper and scatters from the light scattering domains 502 in the light scattering lens 501 and exits the light output surface 111 of the light emitting device 500. Light 505 escapes the rotationally symmetric tapered lightguide 503 due to the scattering from the volumetric light scattering element 103 and scatters from the light scattering domains 502 in the light scattering lens 501 and exits the light output surface 111 of the light emitting device 500.

Figure 6:
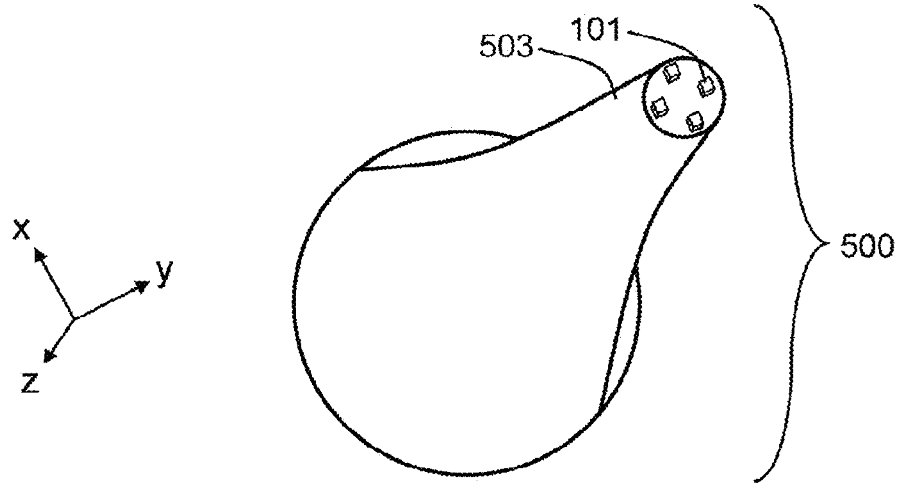
FIG. 6 is a perspective view of the light emitting device of FIG. 5.

FIG. 6 is a perspective view of the light emitting device 500 of FIG. 5 illustrating the LED's 101 and the rotationally symmetric tapered lightguide 503.

Figure 7:
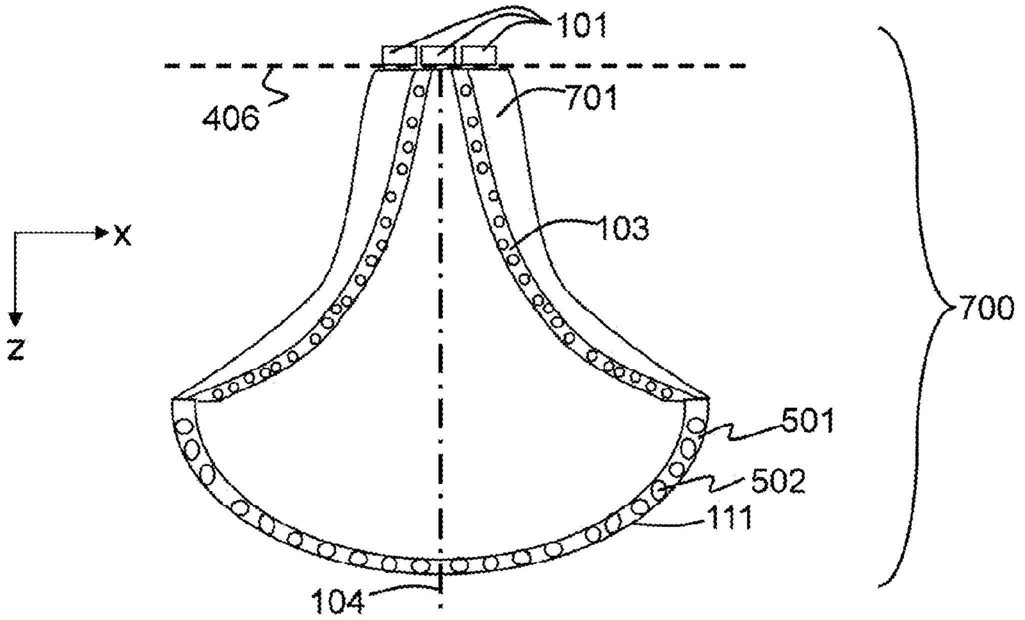
FIG. 7 is a cross-sectional side view of a light emitting device of one embodiment of this invention comprising rotationally symmetric hollow tapered lightguide.

FIG. 7 is a cross-sectional side view of a light emitting device 700 comprising a rotationally symmetric hollow tapered lightguide 701 with a volumetric light scattering element 103 optically coupled to an inner surface of the rotationally symmetric hollow tapered lightguide 701. The light emitting device further comprises a light scattering lens 501 comprising light scattering domains 502.

Figure 8:
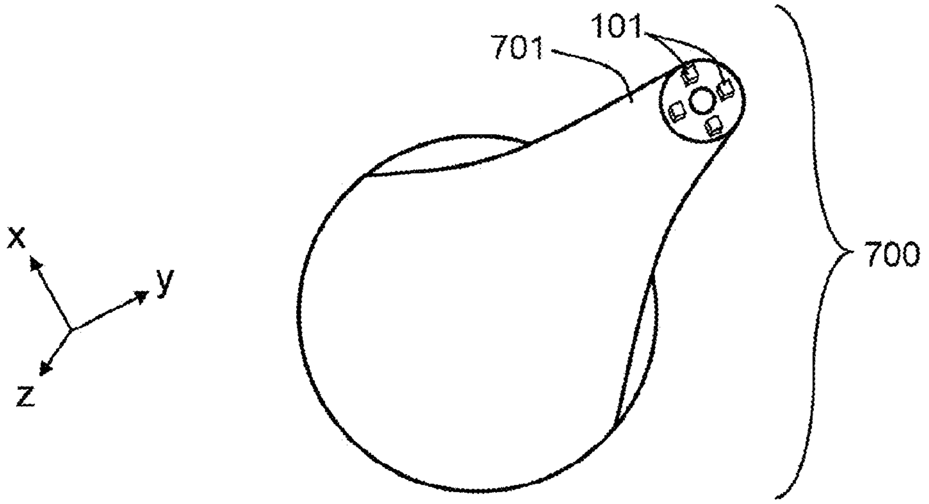
FIG. 8 is a perspective view of the light emitting device of FIG. 7.

FIG. 8 is a perspective view of the light emitting device 700 of FIG. 7 illustrating the LED's 101 and the rotationally symmetric hollow tapered lightguide 701.

Figure 9:
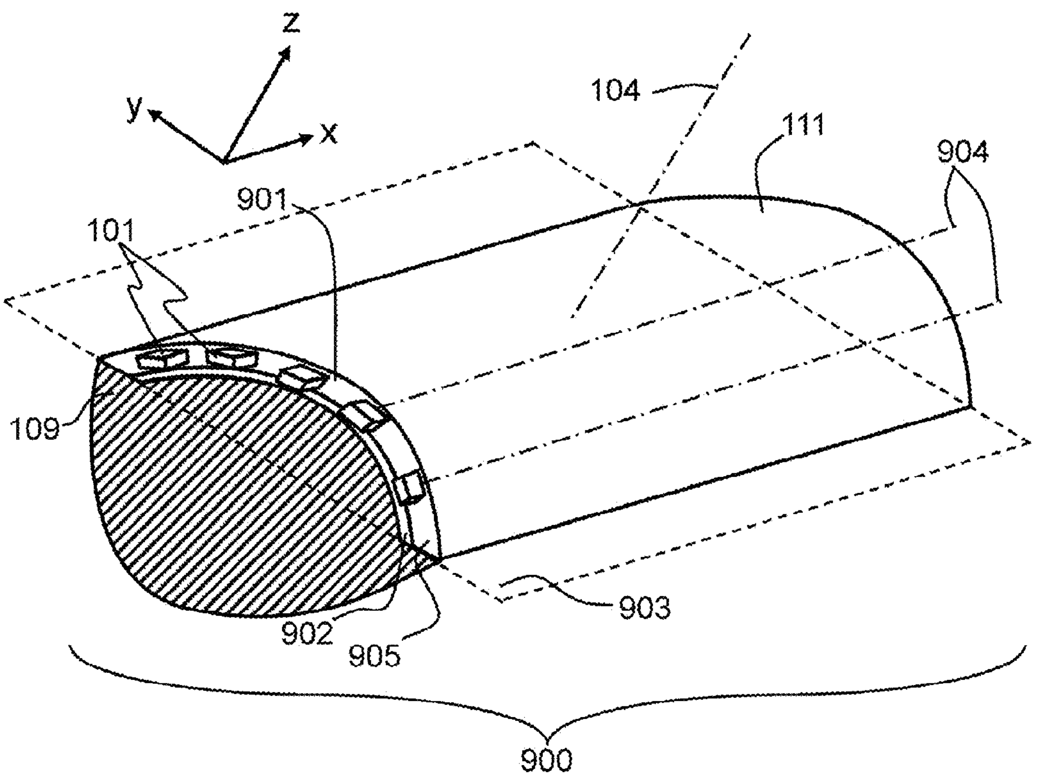
FIG. 9 is a perspective view of a light emitting device of one embodiment of this invention comprising an arcuate lightguide with an array of LEDs disposed along the curved edge of the lightguide.

FIG. 9 is a perspective view of a light emitting device 900 comprising an arcuate lightguide 901 with a curved light input edge 905 with an array of LEDs 101 disposed along the curved light input edge 905 of the arcuate lightguide 901. The light emitting device 900 further comprises a light reflecting element 902 disposed between the arcuate lightguide 901 and a thermal transfer element 109. In the embodiment shown in FIG. 9, the thermal transfer element 109 extends in a direction parallel to the light emitting device optical axis 104 past the plane 903 perpendicular to the light emitting device optical axis 104 and parallel to the optical axes 904 of the LEDs 101 intersecting the lower edge of the curved light input edge 905 in the direction away from the light emitting device optical axis 104.

Figure 10:
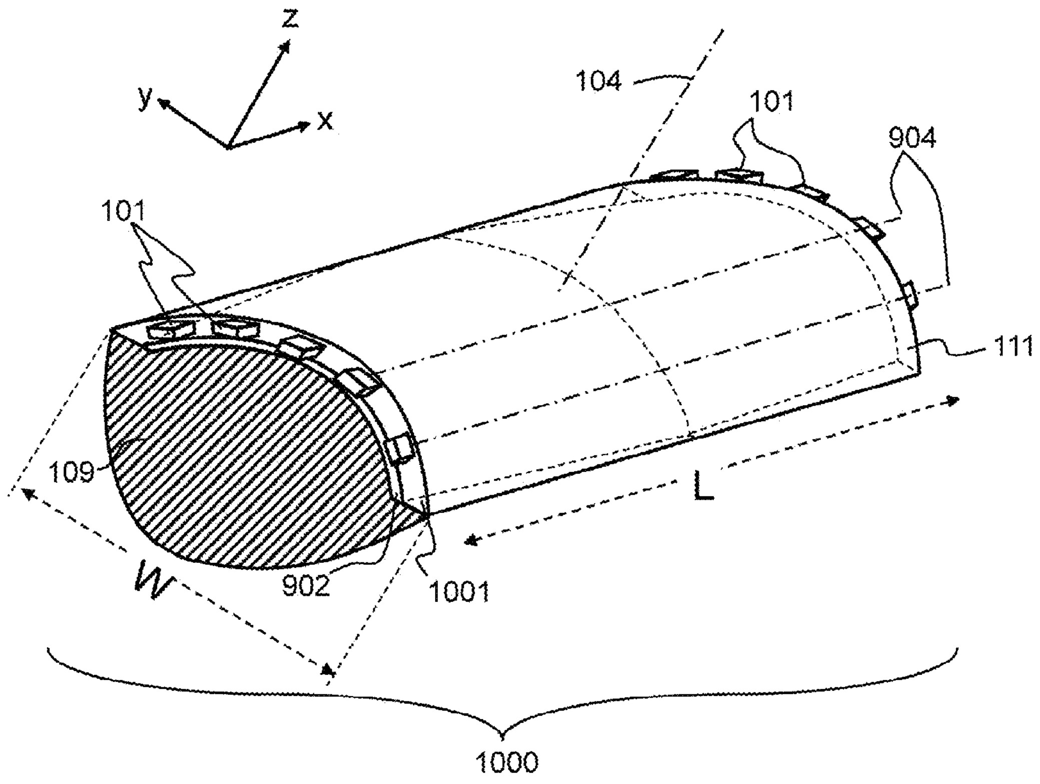
FIG. 10 is a perspective view of a light emitting device of one embodiment of this invention comprising an arcuate tapered lightguide with an array of LEDs disposed along the curved edge of the lightguide.

FIG. 10 is a perspective view of a light emitting device 1000 comprising a tapered arcuate lightguide 1001 with a curved light input edge with an array of LEDs 101 disposed along the curved light input edge of the arcuate tapered lightguide 1001. The light emitting device 1000 further comprises a light reflecting element 902 disposed between the arcuate tapered lightguide 1001 and a thermal transfer element 109 where the arcuate tapered lightguide is tapered in the direction parallel to the LED optical axes 904. In the embodiment shown in FIG. 10, the thermal transfer element 109 extends in a direction parallel to the light emitting device optical axis 104 past the plane perpendicular to the light emitting device optical axis 104 and parallel to the optical axes 904 of the LEDs 101 intersecting the lower edge of the curved light input edge in the direction away from the light emitting device optical axis 104. The width, W, of the lightguide and the length, L, of the tapered arcuate lightguide 1001 are shown in FIG. 10. The LED's 101 are arranged in an array parallel to the width dimension, W, and perpendicular to the light emitting device optical axis 104.

Figure 11:
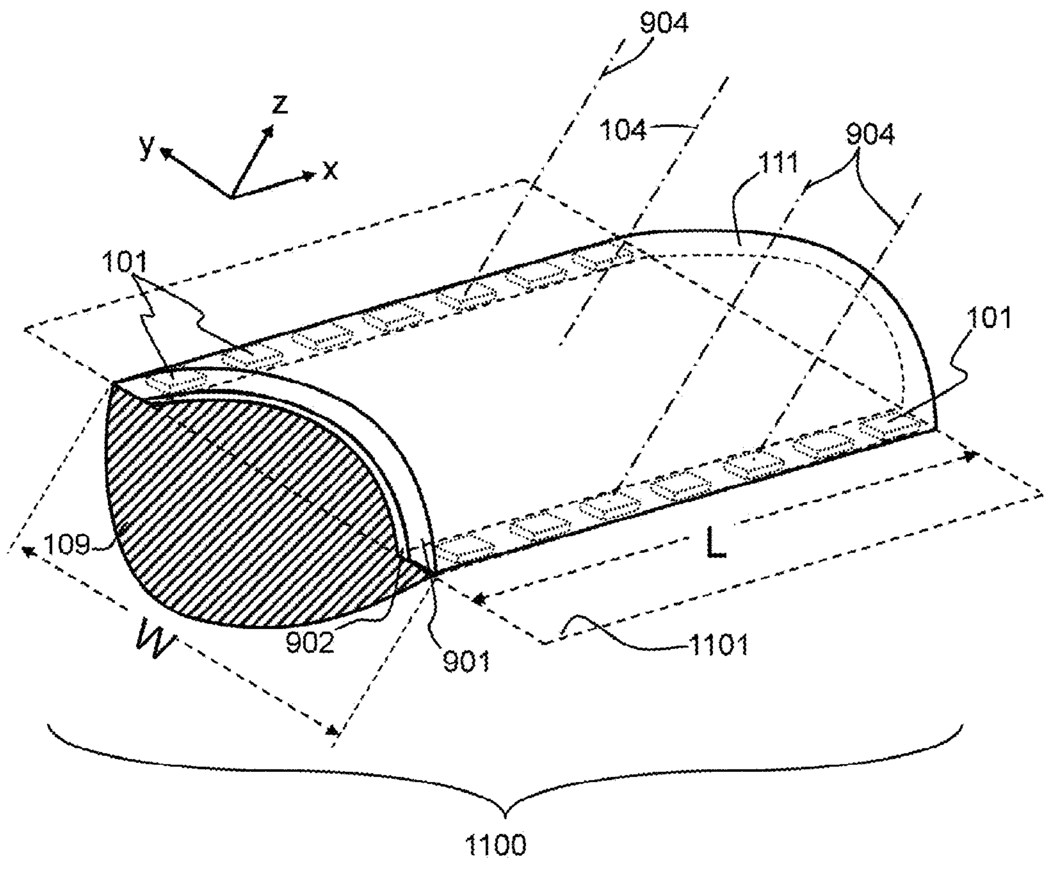
FIG. 11 is a perspective view of a light emitting device of one embodiment of this invention comprising an arcuate lightguide with an array of LEDs disposed along a flat edge of the lightguide.

FIG. 11 is a perspective view of a light emitting device 1100 comprising an arcuate lightguide 901 with an array of LEDs 101 disposed along a flat edge along the length, L, of the arcuate lightguide 901. The light emitting device 1100 further comprises a light reflecting element 902 disposed between the arcuate lightguide 901 and a thermal transfer element 109 The LED optical axes 904 are substantially parallel to the light emitting device optical axis 104. In the embodiment shown in FIG. 11, the thermal transfer element 109 extends in a direction parallel to the optical axis of the light emitting device 104 past the plane 1101 perpendicular to the light emitting device optical axis 104 at the output surface of the LED's 101. The width, W, of the lightguide and the length, L, of the arcuate lightguide 901 are shown in FIG. 11. The LED's 101 are arranged in an array parallel to the length dimension (L) and perpendicular to the light emitting device optical axis 104.

FIG. 12 is a perspective view of a light emitting device 1200 comprising an arcuate tapered lightguide 1201 with an array of LEDs 101 disposed along a flat edge parallel to the length, L, of the arcuate tapered lightguide 1201. The arcuate tapered lightguide 1201 is tapered in the width, W, direction. The light emitting device 1200 further comprises a light reflecting element 902 disposed between the arcuate tapered lightguide 1201 and a thermal transfer element 109 The LED optical axes 904 are substantially parallel to the light emitting device optical axis 104. In the embodiment shown in FIG. 12, the thermal transfer element 109 extends in a direction parallel to the light emitting device optical axis 104 past the plane 1101 perpendicular to the light emitting device optical axis 104 at the output surface of the LED's 101. The width, W, of the arcuate tapered lightguide 1201 and the length, L, of the arcuate tapered lightguide 1201 in the directions perpendicular to the light emitting device optical axis 104 are shown in FIG. 12. The LED's 101 are arranged in an array parallel to the length dimension (L) and perpendicular to the light emitting device optical axis 104. The sagittal depth, SD, of the arcuate tapered lightguide 1201 is shown in FIG. 12. The arcuate tapered lightguide 1201 is tapered along the arc in the plane parallel to the light emitting device optical axis 104 and perpendicular to the length dimension L (i.e. tapered in a plane parallel to the z and y axes).

Figure 13A:
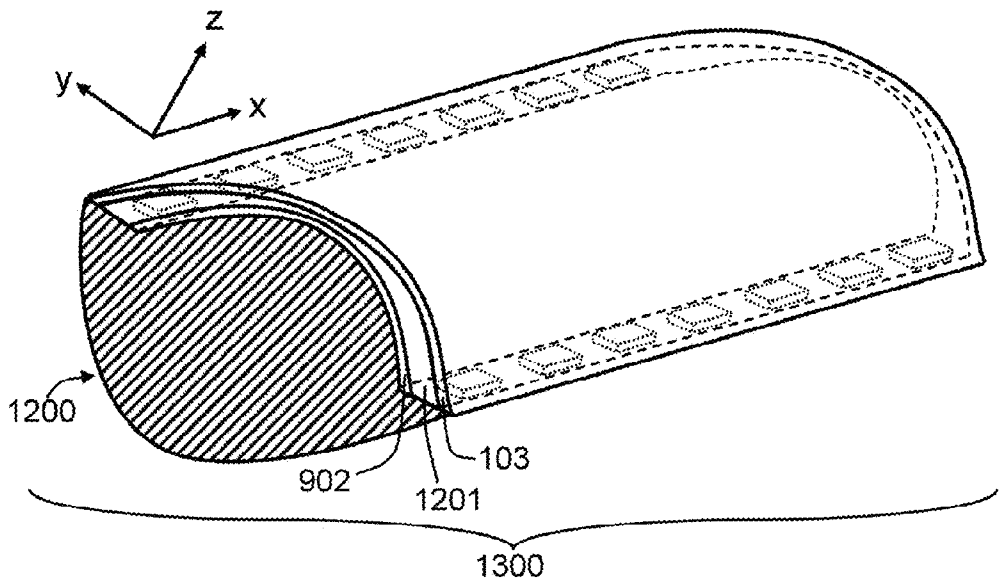
FIG. 13A is a perspective view of a light emitting device of one embodiment of this invention comprising an arcuate tapered lightguide with an array of LEDs disposed along a flat edge of the lightguide and a volumetric light scattering element.

FIG. 13A is a perspective view of a light emitting device 1300 comprising an arcuate tapered lightguide 1201 with an array of LEDs 101 disposed along a flat edge parallel to the length, L, of the arcuate tapered lightguide 1201. The arcuate tapered lightguide 1201 is tapered in the width, W, direction. The light emitting device 1300 further comprises a light reflecting element 902 disposed between the arcuate tapered lightguide 1201 and a thermal transfer element 109. The arcuate tapered lightguide 1201 is disposed between the light reflecting element 902 and a volumetric light scattering element 103. In the embodiment shown in FIG. 13A. The arcuate tapered lightguide 1201 is tapered along the arc in the plane parallel to the light emitting device optical axis 104 and perpendicular to the length dimension L (i.e. tapered in a plane parallel to the z and y axes). Light from the LED's 101 in the light emitting device 1300 of FIG. 13A travels in the arcuate tapered lightguide 1201 and is coupled out of the arcuate tapered lightguide 1201 from the interaction between the volumetric light scattering element 103 and the tapering surfaces of the arcuate tapered lightguide 1201.

Figure 13B:
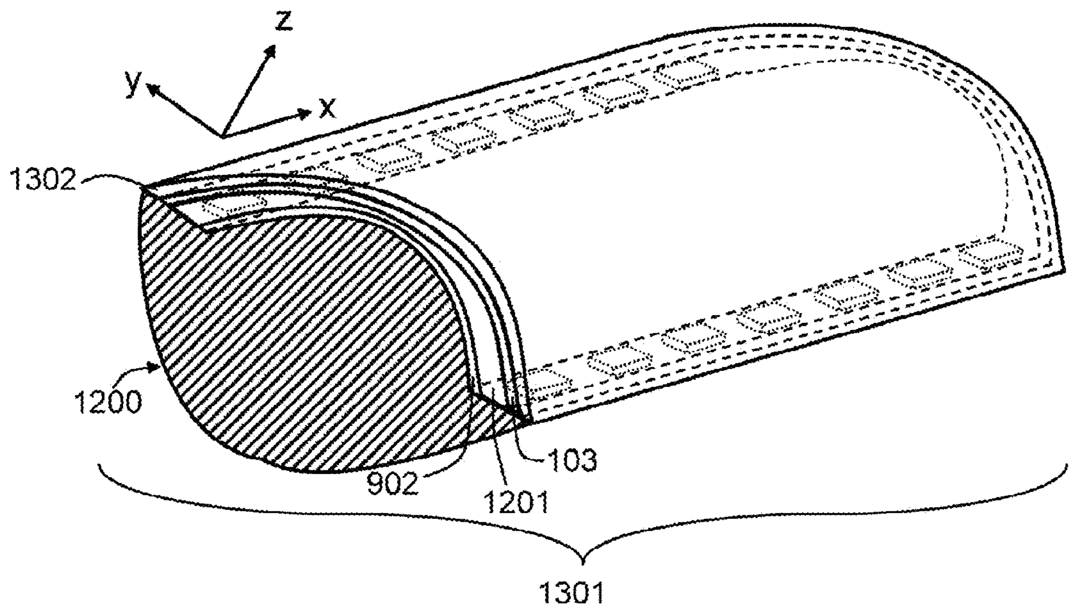
FIG. 13B is a perspective view of a light emitting device of one embodiment of this invention comprising an arcuate tapered lightguide with an array of LEDs disposed along a flat edge of the lightguide, a volumetric light scattering element, and a light redirecting element.

FIG. 13B is a perspective view of a light emitting device 1301 comprising the light emitting device 1300 of FIG. 13A and further comprising a light redirecting element 1302 physically coupled to the volumetric light scattering element 103. Light from the LED's 101 in the light emitting device 1301 of FIG. 13B travels in the arcuate tapered lightguide 1201 and is coupled out of the arcuate tapered lightguide 1201 from the interaction between the volumetric light scattering element 103 and the tapering surfaces of the arcuate tapered lightguide 1201. A portion of the light exiting the arcuate tapered lightguide 1201 is redirected by the light redirecting element 1302. In one embodiment of this invention, the light redirecting element redirects a portion of the light exiting the arcuate tapered lightguide light toward the light emitting device optical axis such that glare is reduced.

Figure 14:
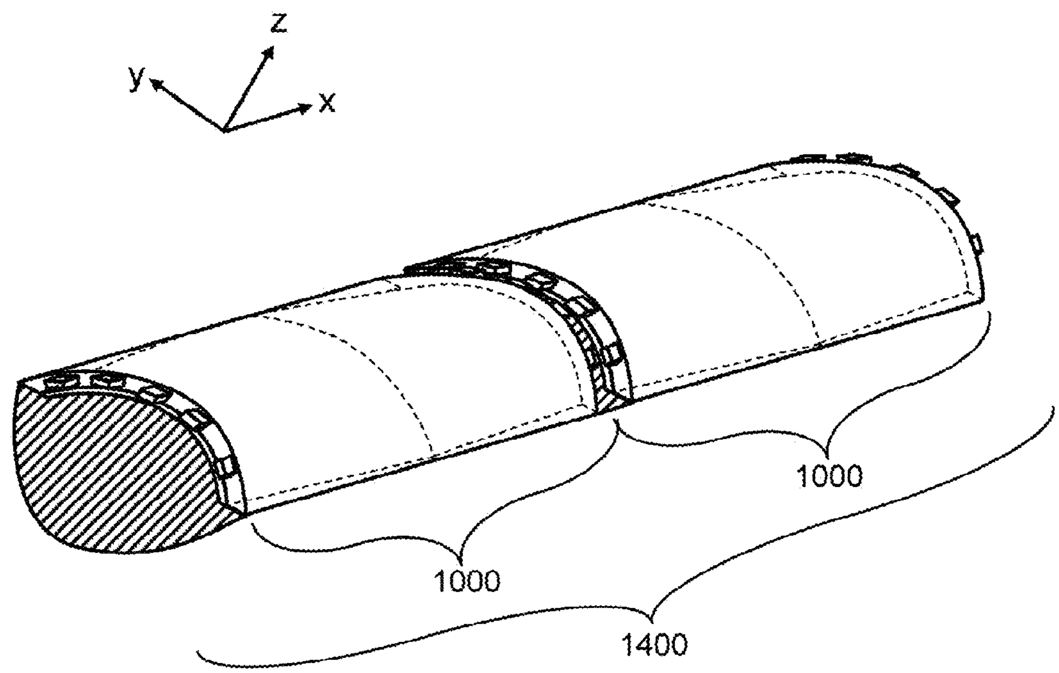
FIG. 14 is a perspective view of a light emitting device comprising two light emitting modules of the light emitting device of FIG. 10.

FIG. 14 is a perspective view of a light emitting device 1400 comprising two light emitting modules of the light emitting device 1000 of FIG. 10.

Figure 15:
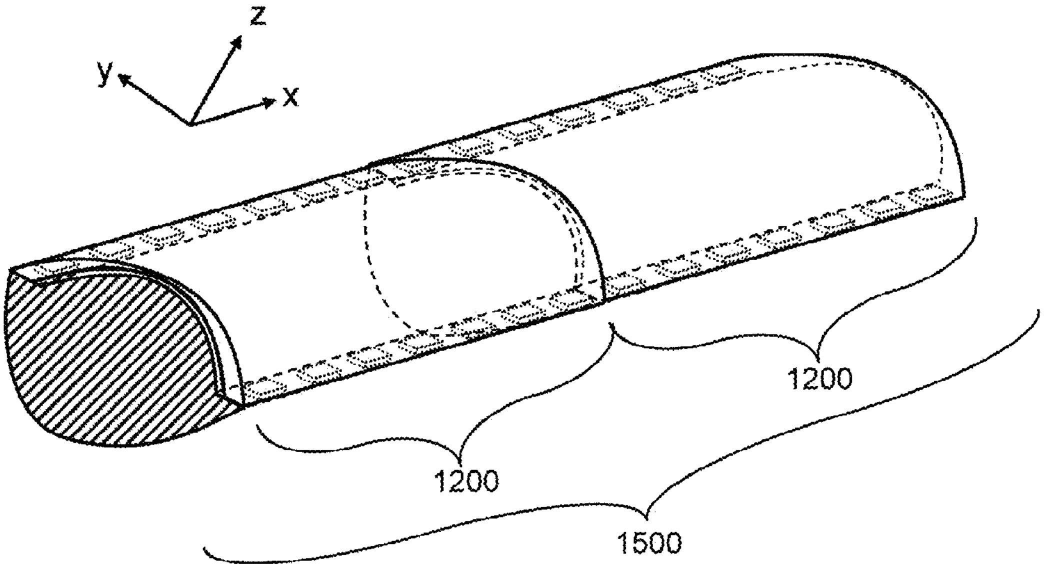
FIG. 15 is a perspective view of a light emitting device comprising two light emitting modules of the light emitting device of FIG. 12.

FIG. 15 is a perspective view of a light emitting device 1500 comprising two light emitting modules of the light emitting device 1200 of FIG. 12.

Figure 16:
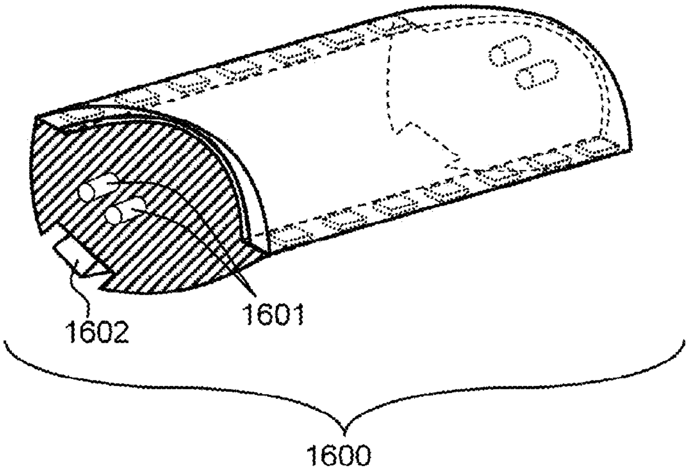
FIG. 16 is a perspective view of the light emitting device of FIG. 12 further comprising electrical connectors and electrical LED driver.

FIG. 16 is a perspective view of the light emitting device of FIG. 12 further comprising electrical connectors 1601 and an electrical LED driver 1602. In one embodiment of this invention, the electrical connectors may be disposed on more than one side of the light emitting device and the light emitting device may be a replacement for a linear fluorescent bulb, incandescent bulb, halogen or other light bulb or light fixture. The light emitting device may further comprise electronics to convert the electrical input from the existing light fixture or connector to a driving current and voltage for the light source such as an LED.

Figure 17:
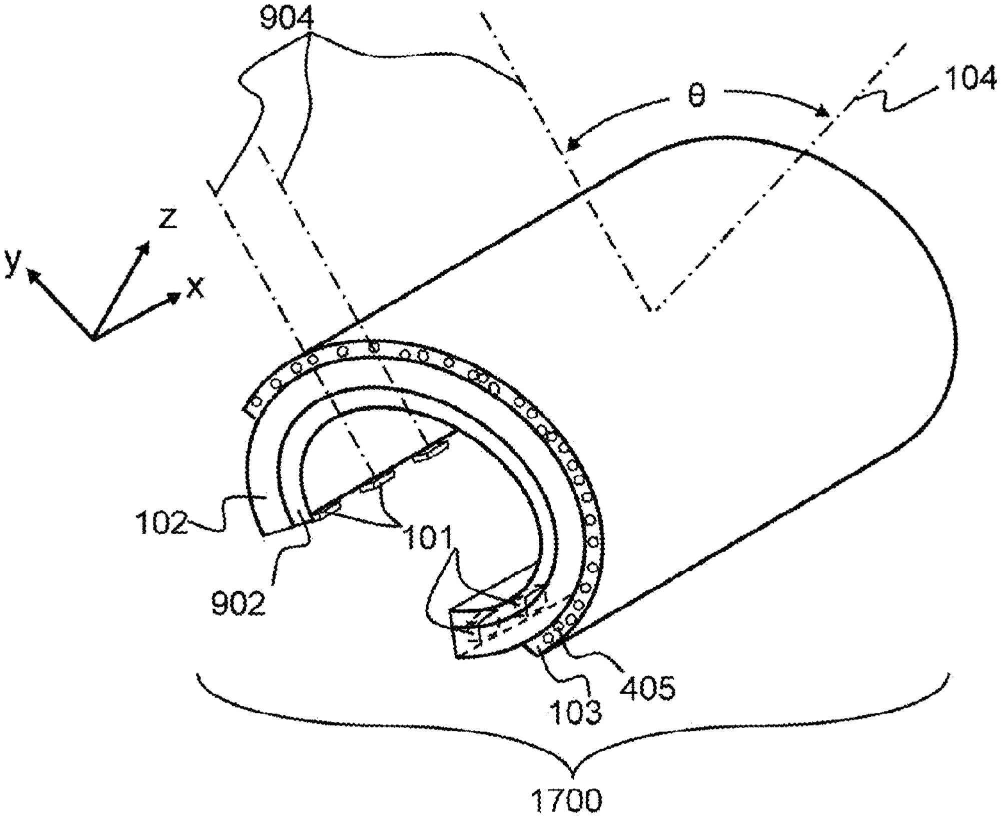
FIG. 17 is a perspective view of a light emitting device of one embodiment of this invention comprising an arcuate lightguide with an angularly extended surface with an angle θ between the optical axis of the LEDs and the optical axis of the light emitting device.

FIG. 17 is a perspective view of a light emitting device 1700 comprising an arcuate lightguide 102 with an angularly extended surface with an angle θ between the LED's optical axis 904 and the light emitting device optical axis 104. In one embodiment of this invention, θ is greater than one selected from the group of 80 degrees, 90 degrees, 100 degrees, and 110 degrees.

Figure 18:
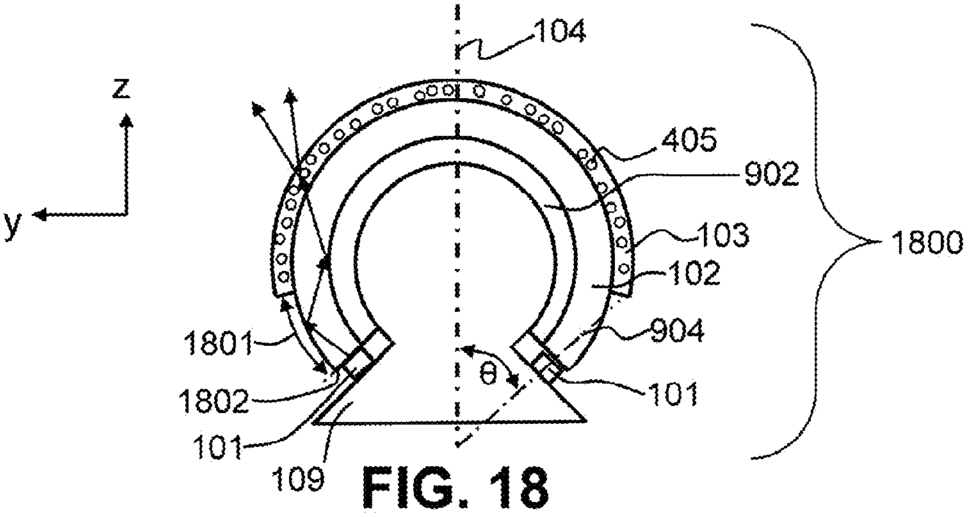
FIG. 18 is a perspective view of a light emitting device of one embodiment of this invention comprising an arcuate lightguide with an angle θ between the optical axis of the LEDs and the optical axis of the light emitting device and further comprising a thermal transfer element.

FIG. 18 is a perspective view of a light emitting device 1800 comprising an arcuate lightguide 102 with an angle θ between the LEDs optical axis 904 and the light emitting device optical axis 104 and further comprising a thermal transfer element 109. The separation distance is the distance between an input coupling edge and light extracting region. In the embodiment shown in FIG. 18, the separation distance 1801 is the distance from the light input coupling edge 1802 and the volumetric light scattering element 103.

Figure 19:
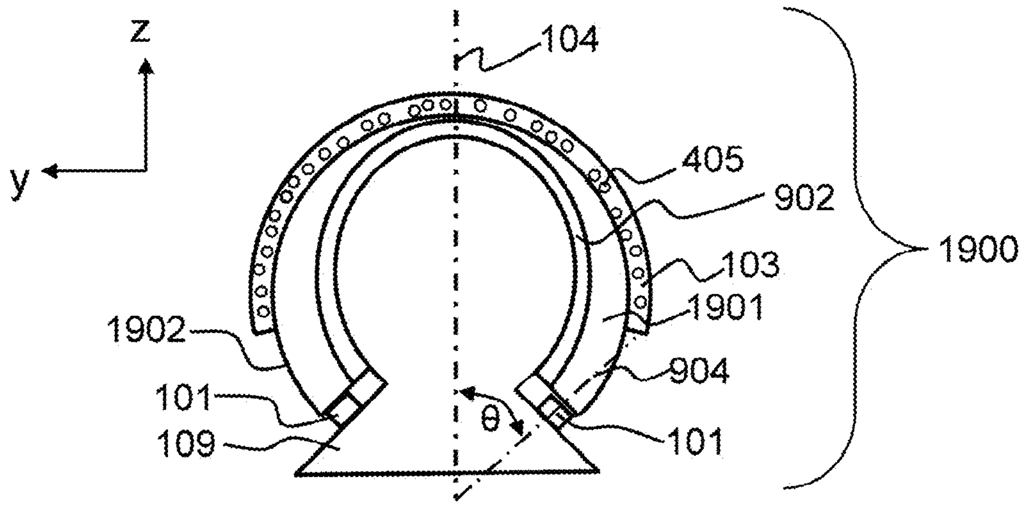
FIG. 19 is a perspective view of a light emitting device of one embodiment of this invention comprising an arcuate tapered lightguide with an angle θ between the optical axis of the LEDs and the optical axis of the light emitting device and further comprising a thermal transfer element.

FIG. 19 is a perspective view of a light emitting device 1900 comprising an arcuate tapered lightguide 1901 with an angle θ between the LED's optical axis 904 and the light emitting device optical axis 104 and further comprising a thermal transfer element 109. The arcuate tapered lightguide 1901 is angularly extended and tapered along the arc in the plane parallel to the light emitting device optical axis 104 and perpendicular to the array of LED's 101 aligned parallel to the x axis. The arcuate tapered lightguide 1901 comprises an angularly extended surface 1902 on the surface disposed between the LED's 101 and the volumetric light scattering element 103.

FIG. 20*a* is a cross-sectional side view of a light emitting device 2000 comprising two arcuate lightguides 2005 with a first light input edge 2003 and a second input edge 2004 disposed between the array of LED's 101 aligned in an array parallel to the x axis and the arcuate lightguides 2005. The light from the LED's 101 directed into the first light input edge 2003 has a first LED optical axis 2001 and the light from the LED directed into the second light input edge 2004 has a second LED optical axis 2002. The angular luminous intensity profile of the light emitting from the light emitting device 2000 comprises a first angular luminous intensity peak direction 2006 due to the light extracted from the arcuate lightguide 2005 from the LED's 101 directed into the first light input edge 2003. The angular luminous intensity profile of the light emitting from the light emitting device 2000 comprises a second angular luminous intensity peak direction 2007 due to the light extracted from the arcuate lightguide 2005 from the LED's 101 directed into the second light input edge 2004. The light emitting device 2000 comprises a maximum angle, δ, between the LED's optical axis 2001 directed into the first light input edge 2003 and a first plane 2008 perpendicular to the normal to the light emitting outer surface 2010 of the lightguide and parallel to the x axis.

Figure 20B:
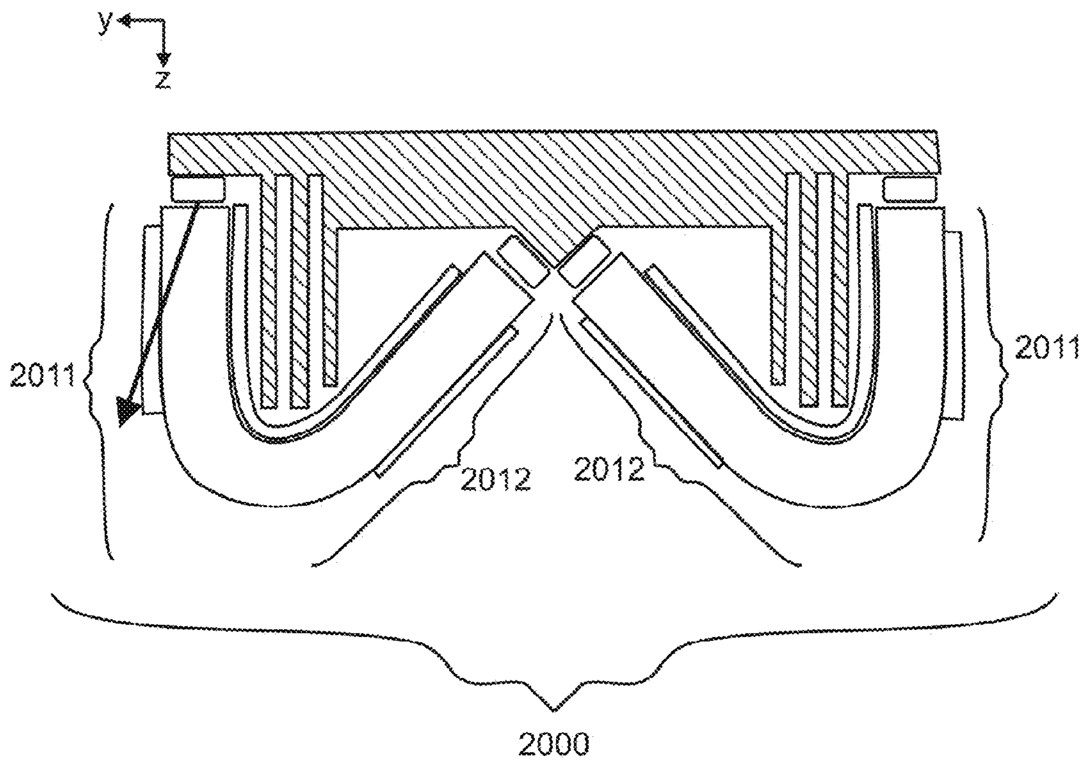
FIG. 20*b* is a cross-sectional side view of the light emitting device of FIG. 20*a* further illustrating the first and second light output regions on the outer light output surface of the lightguide.

FIG. 20*b* is a cross-sectional side view of the light emitting device 2000 of FIG. 20*a* further illustrating the first light output region 2011 corresponding to the light exiting the arcuate lightguide 2005 after entering the first light input edge 2003 on the outer light output surface 2010 of the arcuate lightguide 2005. FIG. 20*b* also illustrates the second light output region 2012 corresponding to the light exiting the arcuate lightguide 2005 after entering the second light input edge 2004 on the outer light output surface 2010 of the arcuate lightguide 2005.

Figure 21:
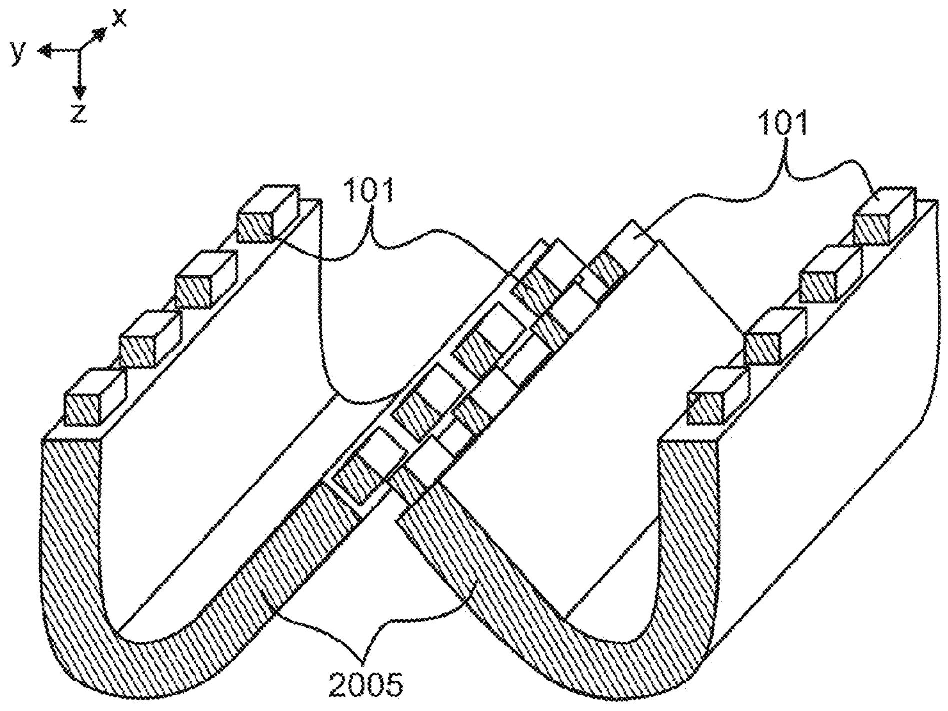
FIG. 21 is a perspective view of the lightguides and light sources of FIG. 20*a*.

FIG. 21 is a perspective view of the lightguides 2005 and LED's 101 of FIG. 20*a*.

FIG. 22 is a cross-sectional side view of a light emitting device 2200 comprising an arcuate lightguide 2204 comprising a first inflection region 2201, a second inflection region 2202, and a third inflection region 2203 on the outer light output surface 2205 of the arcuate lightguide 2204. Light 2206 from the LED's 101 is directed into the arcuate lightguide 2204 and is totally internally reflected until it reaches the second inflection region 2202 where it escapes the arcuate lightguide 2204 through the outer light output surface 2205 due to the curvature of the arcuate lightguide 2204 in the second inflection region 2202. The angular luminous intensity output from the light emitting device 2200 comprises an angular peak of luminous intensity in a first angular direction 2207 due to the first inflection region 2201 and an angular peak of luminous intensity in a second angular direction 2208 due to the second inflection region 2202.

Figure 23:
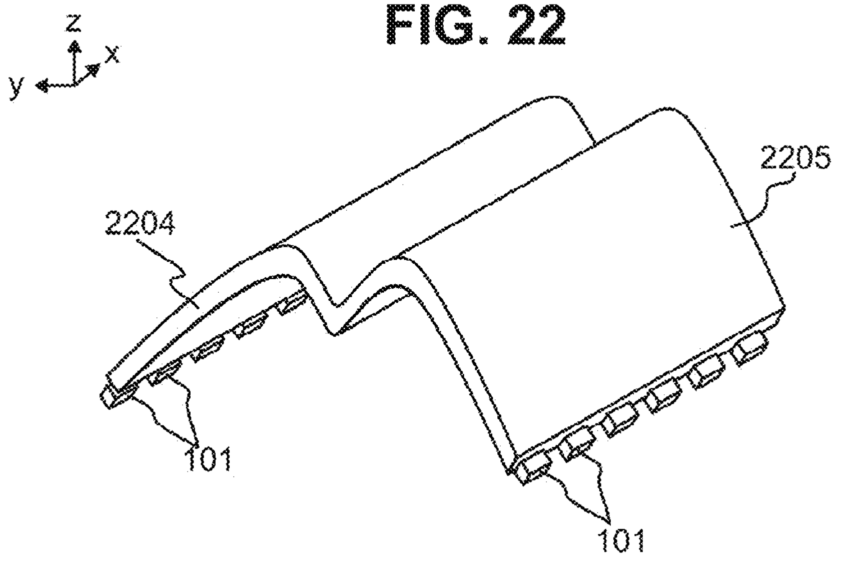
FIG. 23 is a perspective view of the lightguide and light sources of FIG. 22.

FIG. 23 is a perspective view of the arcuate lightguide 2204 with three inflection regions and the LED's 101 of FIG. 22.

Figure 24:
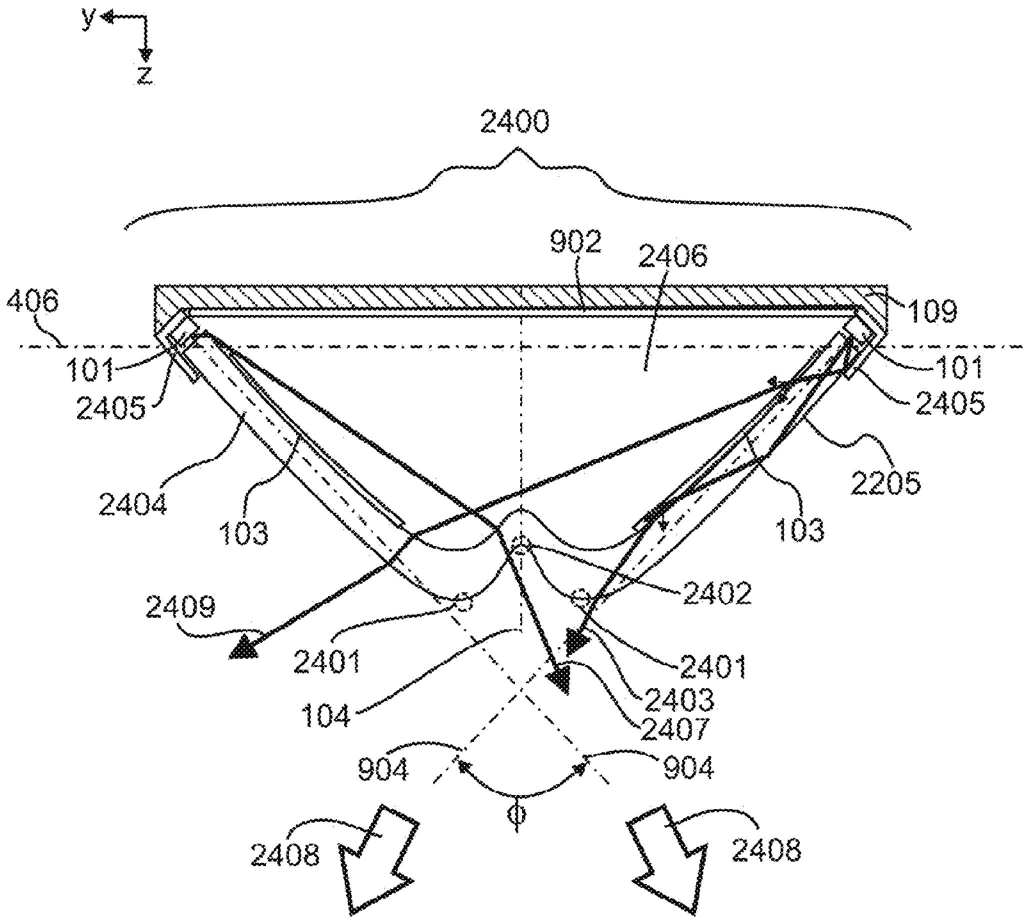
FIG. 24 is a cross-sectional side view of a light emitting device of one embodiment of this invention comprising a rotationally symmetric lightguide with two inflection regions on the outer surface of the lightguide.

FIG. 24 is a cross-sectional side view of a light emitting device 2400 comprising a rotationally symmetric lightguide 2404 with a first inflection region 2401 and a second inflection region 2402 on the outer light output surface 2205 of the rotationally symmetric lightguide 2404. The light emitting device 2400 comprises a interior region 2406 enclosed by the rotationally symmetric lightguide 2404 and the light output plane 406 orthogonal to the light emitting device optical axis 104 at the LEDs 101. First light 2403 from the LED's 101 totally internally reflects in the rotationally symmetric lightguide 2404 and scatters from the light scattering element 103 and escapes the rotationally symmetric lightguide 2404 in the region near the first inflection region 2401. Light 2409 coupled into the rotationally symmetric lightguide 2404 at an angle less than the critical angle reflects from the reflector 2405, scatters from the volumetric light scattering element 103, exits the rotationally symmetric lightguide 2404 in the interior region, and passes back through a second region of the rotationally symmetric lightguide 2404 and exits the light emitting device 2400. Light 2407 coupled into the rotationally symmetric lightguide 2404 at an angle less than the critical angle exits the rotationally symmetric lightguide 2404 into the interior region enclosed by the rotationally symmetric lightguide 2404 and passes back through the rotationally symmetric lightguide 2404 and exits the light emitting device 2400. The angular luminous intensity output from the light emitting device 2400 comprises symmetric angular peaks of luminous intensity in a angular directions 2408 due to the first inflection region 2401.

Figure 25:
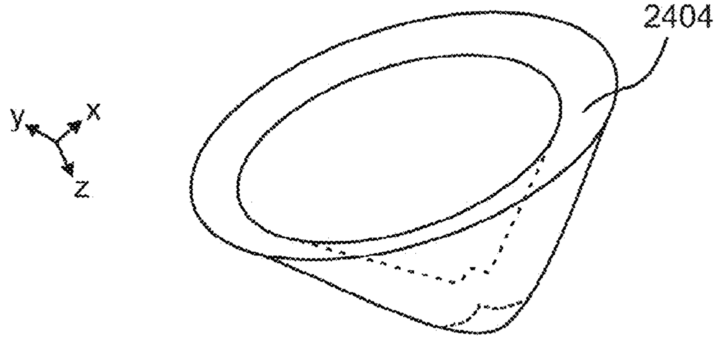
FIG. 25 is a perspective view of the lightguide of FIG. 24.

FIG. 25 is a perspective view of the rotationally symmetric lightguide 2404 of the light emitting device 2400 of FIG. 24.

FIG. 26 is a cross-sectional side view of a light emitting device 2600 comprising two substantially planar lightguides 2601 oriented at an angle ϕ to each other toward and a light scattering lens 2602. The substantially planar lightguides 2601 are oriented at an angle, c, to the light emitting device optical axis 104. A portion of light incident from the LED's 101 escapes out the beveled light output edge 2603 of the substantially planar lightguides 2601. The output edge shape or curvature may be one selected from the group of curved, beveled, angled, concave, convex, rigged, grooved, lensed, straight, 90 degrees from the large surface, or a combination of two or more of the aforementioned profiles. Light 2604 from the LED's 101 enters the substantially planar lightguides 2601, scatters from the volumetric light scattering element 103, refracts at the beveled light output edge 2603, exits the substantially planar lightguide 2601, and scatters from the light scattering lens 2602. The substantially planar lightguide 2601 has a first lightguide output surface 2607 with a surface normal less than 90 degree from the light emitting device optical axis 104 in the +z direction and is oriented along a first orientation axis 2605. The angular luminous intensity output from the light emitting device 2600 comprises a symmetric angular peaks of luminous intensity in a angular direction 2606.

FIG. 27 is a cross-sectional side view of a linear shaped light emitting device 2700 comprising two lightguides 2701 oriented away from the light emitting device optical axis 104 and a linear light scattering lens 2702 with a semi-circular cross-sectional profile comprising light scattering domains 502. The lightguides 2701 are oriented away from the light emitting device optical axis 104 of at an angle, $\epsilon$, from the light emitting device optical axis 104.

Figure 28:
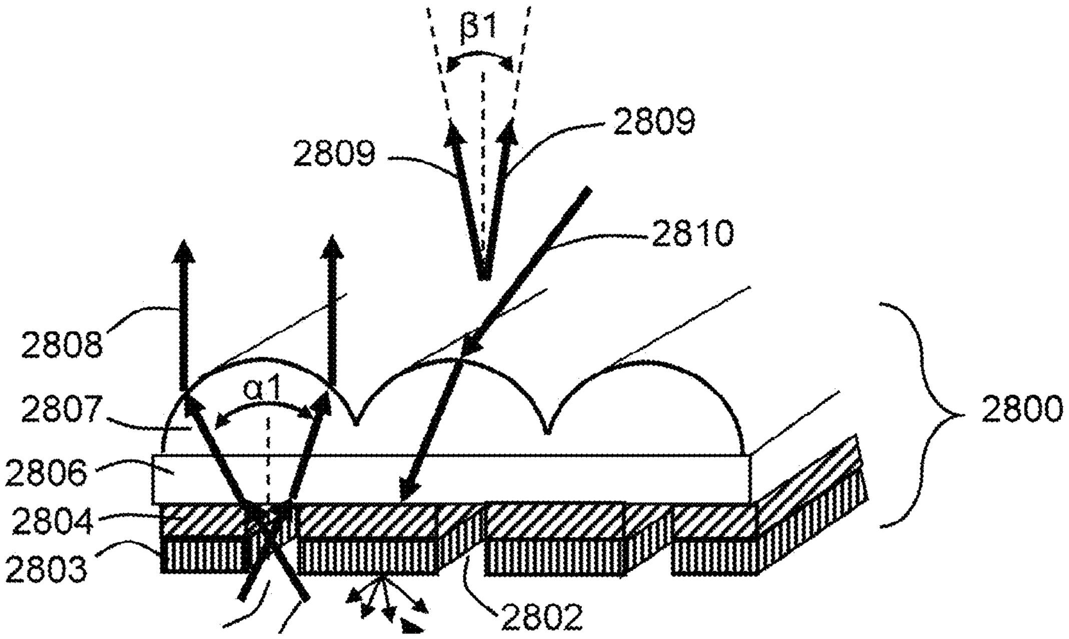
FIG. 28 is a perspective view of a light filtering direction control element in accordance with one embodiment of this invention.

FIG. 28 illustrates a perspective view of a light filtering directional control element that can be used as a light redirecting element in a light emitting device. A first portion of light 2801 incident on the light filtering directional control element 2800 passes through the light transmitting regions 2802 in a light reflecting region 2803 and a light absorbing region 2804. A second portion 2805 of incident light is reflected and scattered from the light reflecting regions 2803. The light passing through the lenticular lens substrate 2806 and the lenticules 2807 has an angular FWHM of $\alpha 1$ measured from the normal to the light filtering directional control element 2800 in the plane perpendicular to the lenticules. After refraction from the lenticules 2807, the output light 2808 is more collimated. The angular FWHM of the light 2809 emitted from the light filtering directional control element 2800 has an angular FWHM of $\beta 1$ in the plane perpendicular to the lenticules where $\beta 1<\alpha 1$. External light 2810 incident upon the light filtering directional control element 2800 from the side of the lenticules 2807 passes through the lenticules 2807 and the lenticular substrate 2806 and is absorbed in the light absorbing region 2804. In another embodiment of this invention, the portion of incident light on the light reflecting region side of the light filtering directional control element which is not reflected is substantially absorbed by the light absorbing region.

FIG. 29 is a cross-sectional side view of a light emitting device 2900 comprising a lightguide 2901 with two opposing quadric surfaces shaped similar to a biconvex lens. The light emitting device 2900 further comprises an array of LED's 101 disposed along a opposite outer edges of the lightguide 2901 and volumetric light scattering element 103 optically coupled to the lightguide 2901 and disposed between the lightguide 2901 and a light reflecting element 902.

FIG. 30 is a cross-sectional side view of a light emitting device 3000 comprising a lightguide 3001 with two opposing quadric surfaces shaped similar to a biconvex lens. The light emitting device 3000 further comprises an array of LED's 101 disposed along the inner edge of the lightguide 3001 and volumetric light scattering element 103 optically coupled to the lightguide 3001 and disposed between the lightguide 3001 and a light reflecting element 902.

Figure 31:
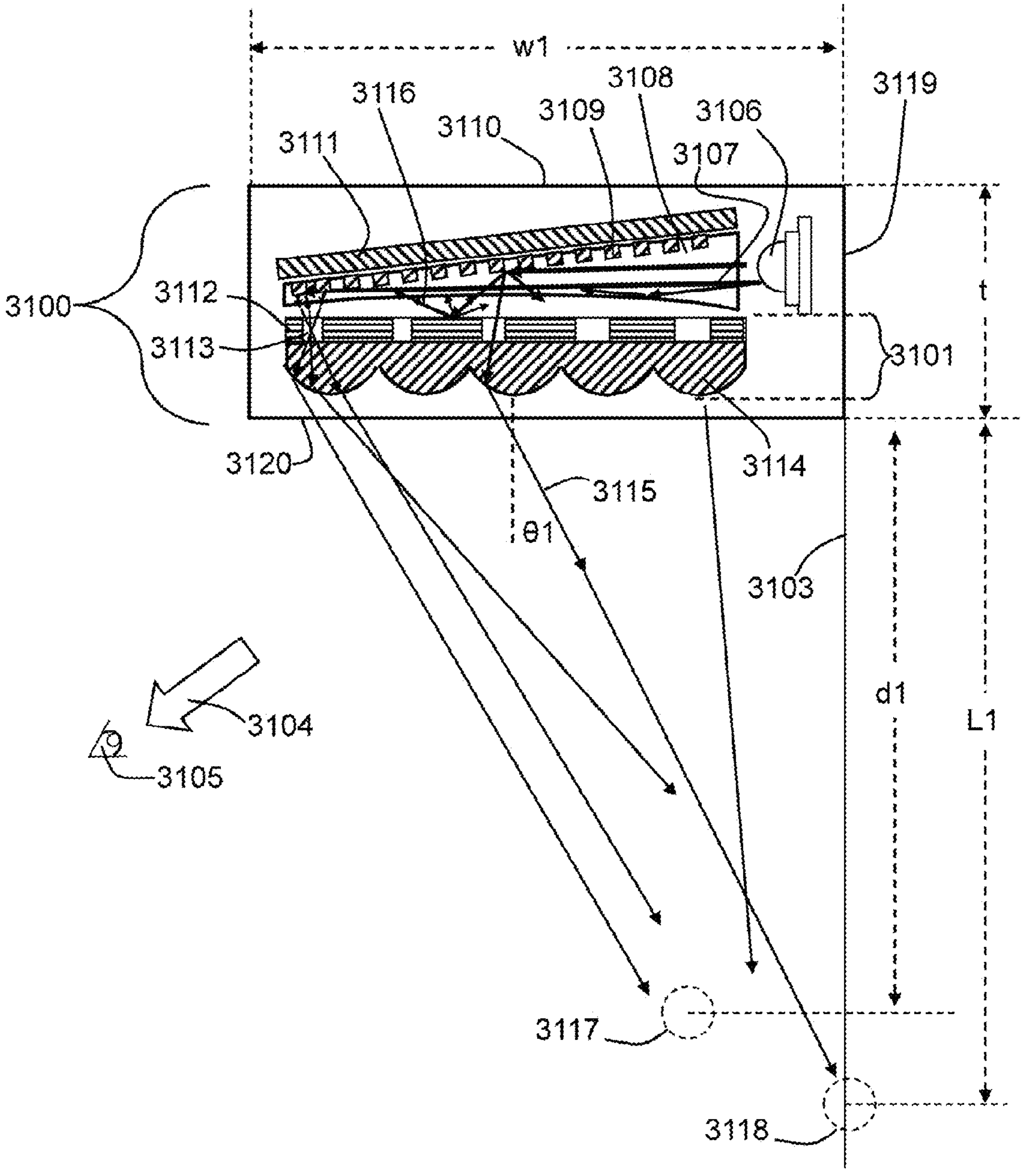
FIG. 31 is a cross-sectional side view of an edge-lit wall washing light fixture comprising an arcuate tapered lightguide and a light filtering directional control element with off-axis light output.

FIG. 31 illustrates a wall-washing light fixture 3100 comprising a light filtering directional control element 3101 designed to redirect light off-axis. The light fixture 3100 comprises an LED array 3106, a tapered arcuate lightguide 3108 with light extraction features 3109, a white reflector film 3111, light reflecting regions 3112, light transmitting regions 3113, and a lenticular lens film 3114 within a housing 3110. Light 3107 from an LED array 3106 is directed into the tapered arcuate lightguide 3108 where it is extracted by the light extraction features 3109. A portion of the light 3115 extracted from the tapered arcuate lightguide 3108 passes through one of the light transmissive regions 3113 which are disposed off-axis to the lenticules in the lenticular lens film 3114 such that upon refracting from the lenticule it is directed away from the normal to the output surface by an angle of $\theta 1$. A portion of the light 3116 extracted from the tapered arcuate lightguide 3108 reflects and scatters from the light reflecting region 3112 back toward the tapered arcuate lightguide 3108. The white reflector film 3111 diffusely reflects incident light that is not contained within the lightguide 3108 and is directed toward the white reflector film 3111. The light 3115 from the light fixture will be more efficiently directed toward a wall 3103 in a wall washing application due to the off-axis redirection from the light filtering directional control element 3101. As a result, less light 3104 is directed directly from the output surface 3120 toward an undesirable location in the room such as a into a fixture viewers eyes 3105. In one embodiment of this invention, the far-field light output has a far-field focal point 3117 at a distance, d1, from the light output surface 3120.

In one embodiment of this invention, a light emitting device 3100 comprises a light filtering directional control element 3101 and the thickness of the device, t, is less than 20 millimeters thick. In a further embodiments, the thickness is less than 10 millimeters, 8 millimeters or 5 millimeters. In one embodiment of this invention, the light emitting device is a wall washing light fixture comprises a first side 3119 disposed to be coupled to a wall. In a further embodiment, the distance, L1, along a line parallel to the first side 3119 from the light emitting device output surface 3120 to the point of peak luminance 3118 is greater than 20 centimeters. In one embodiment, the thickness of the light emitting device is less than 10 millimeters and the distance along the line parallel to the first side 3119 from the output surface 3120 to the point of peak illuminance 3118 is greater than 20 centimeters. In a further embodiment, d1 is equal to L1.

Figure 32:
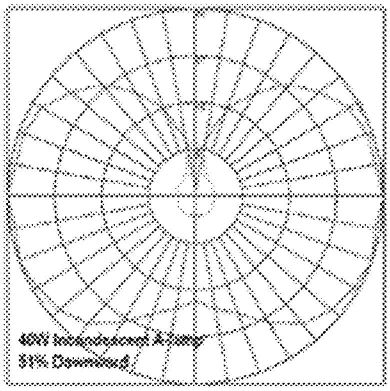
FIG. 32 (Prior Art)
FIG. 32 is a prior art illustration of typical light distributions for incandescent and LED A type lamps.
Figure 32:
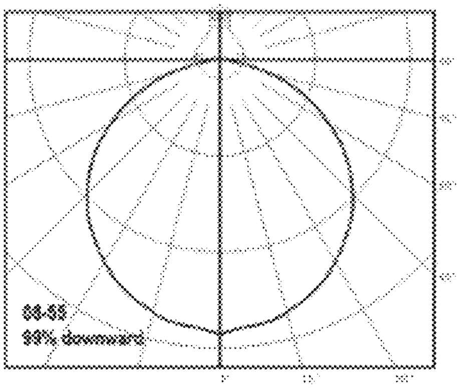
FIG. 32 (Prior Art)
Figure 32:
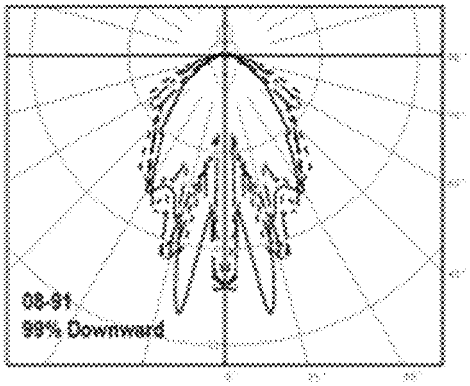
FIG. 32 (Prior Art)
Figure 32:
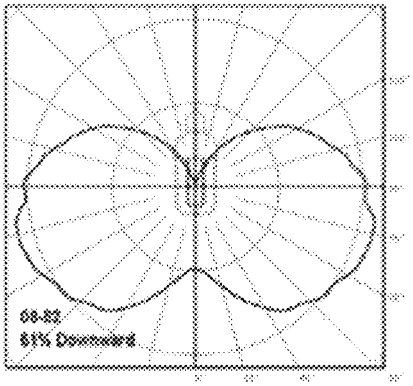
FIG. 32 (Prior Art)

FIG. 32 is prior art which illustrates various luminous intensity distributions typical of commercial LED lamps commonly marketed as replacements for omnidirectional incandescent lamps but which are in fact not possessing of omnidirectional luminous light distribution. The figure appears in the US Department of Energy Round 6 Caliper Report, November 2008 by R. D. Lingard, M. A. Myer, and M. L. Paget; FIG. 13 on page 13. As can be seen by FIG. 32, LED commercial lamps do not provide a sufficiently complete replacement solution for an incandescent A-type lamp.

Figure 33:
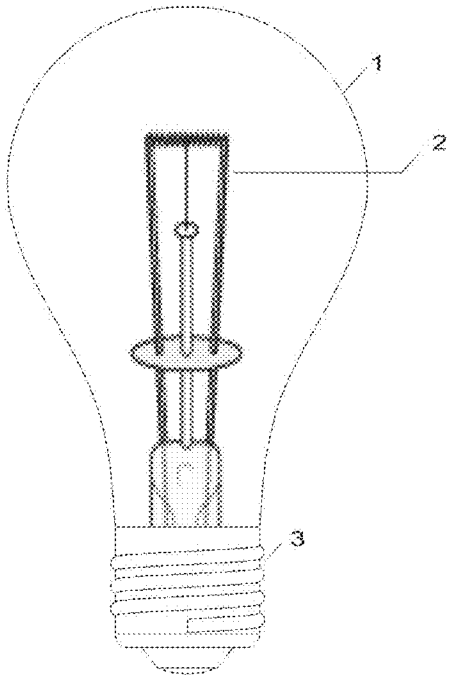
FIG. 33 (Prior Art)
FIG. 33 is a prior art side view of an incandescent A type lamp.

FIG. 33 is a prior art side plan cross-sectional assembly view of a conventional incandescent screw-in A19 type light bulb in accordance with the prior art. The bulb comprises a tungsten filament 2, a glass envelope 1, and a lamp base 3. Light is produced from the tungsten filament 2 that glows when heated by an electrical current coming from a power source to the lamps base 3.

Figure 34:
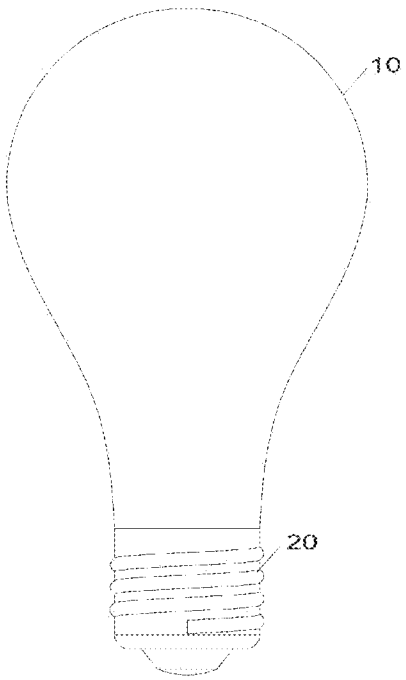
FIG. 34 is a side view of an embodiment LED A type lamp.

FIG. 34 is a side view of an A-type light emitting diode (LED) light bulb in accordance with the present invention and comprises an outcoupling optic 10 and an LED lamp base 20. The outcoupling optic is configured to cover and be placed over one or more LED members that are connected to the fixture and stored in the lamp base 20. A medium screw base, also known as an E26 base, is a very common lamp base which embodiments of the invention may use.

Figure 35:
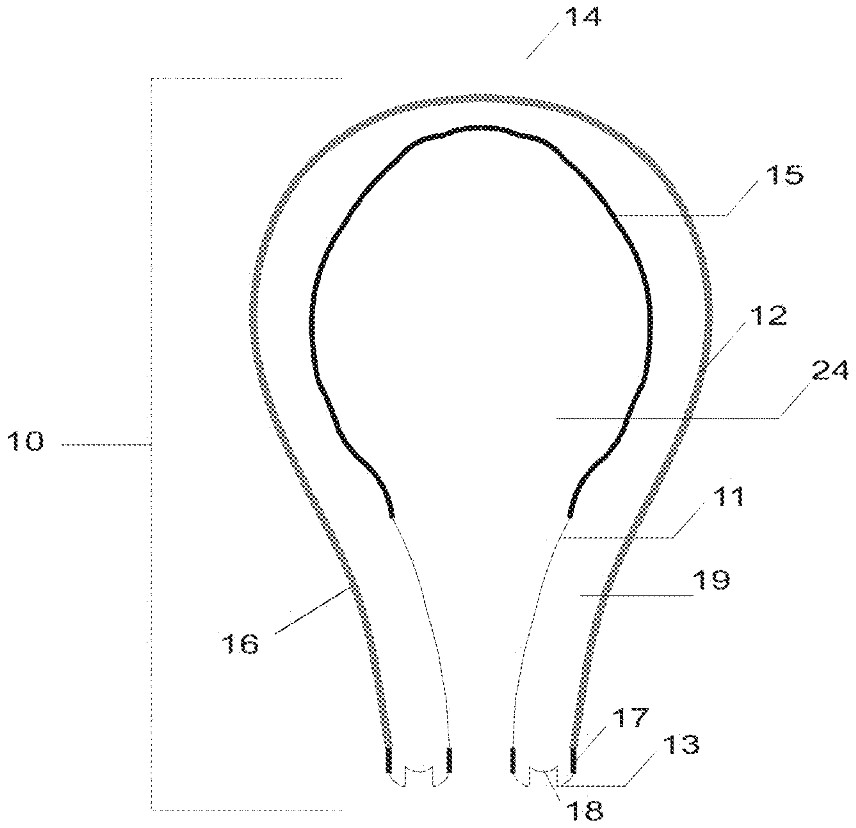
FIG. 35 is a cross-sectional view of the optic of an embodiment LED A19 Lamp.

FIG. 35 is a cross sectional view showing the outcoupling optic of a preferred embodiment of the present invention. The outcoupling optic 10 acts to effectively emit light from a geometric shape substantially similar to a standard incandescent A19 lamp. The distribution pattern of light emitted from the outcoupling optic is also substantially similar to a conventional incandescent A19 lamp. The outcoupling optic of the present invention performs the aforementioned functions by utilizing a multi-part assembly as described further below. When the lens is placed adjacent to or optically coupled with an LED or LED members in a lamp configuration, such as the one shown in FIG. 37, the light rays from the LED are both reflected within the assembly of the inner portion 11 and outer portion 12 of the optic and directed into a usable output pattern by the combination of the inner surface 11 and outer surface 12 of the outcoupling optic present invention. The lens is made from an optically clear material, such as PC, PMMA or the like, allowing light to transmit through their respective surfaces with only a small loss of light throughput. The outcoupling surfaces 11 and 12 of the lens provides for an effective light distribution pattern for light fixtures. As can be clearly seen with reference to FIG. 35, the diameter of the lens assembly gradually decreases (tapers) from the bottom end 13 to the top end 14. This is such that the light rays traveling from bottom edge of one of the sides of the lens to the top of the lens collide with rays received from the opposite edge of the lens in a minimal manner. However, alternate embodiments of the inner and outer portion may be configured without tapering ends. The light outcoupling layer 16 is important in partially extracting light from the lightguide 19 in a manner distributed over the surface of the outcoupling optic. An embodiment was made and tested with the configuration of FIG. 35 with a Fusion Optix ADF3030 volumetric light scattering diffuser specifically used as the outcoupling layer 16. Other embodiments of the invention may locate the outcoupling layer at the inner surface or within the lightguide 19.

The inner surface of the lens 11, as shown in FIG. 34, is substantially radiused, allowing reflection portion of light to avoid internal reflection and become emitted from the outcoupling optic. Thus, the overall output of useable light is increased. The light emitted from the LED members is more effectively radiated outward as a result of the inner surface design. However, note that alternative embodiments of the inner surface of the lens may feature a combination of smooth, 3 dimensionally patterned or curved surfaces (not shown).

The inner portion of the top section of the lens features a reflective surface 15 such that the traveling of light rays through the lens is prohibited, or limited, from entering into the back hollow portion 16 of the lens. The hollow portion 16 can thus be considered optically isolated. The reflective surface 15 may be either a reflective paint or reflective tape, but is not so limited.

Still referring to FIG. 35, a recessed cavity 18 exist on the bottom end of the presently preferred embodiment of the lens which provides means for increasing the efficiency of light input from LEDs into the outcoupling optic. Additionally the geometry of the recessed cavity can be constructed as known in the art to direct light preferentially along the optical path of the light guide 19. To further increase the efficiency of light propagation along the optical path of the light guide 19, highly reflective material 17, such as reflective tape, and be applied to reflect light rays emitted by the LED members; thereby increasing the overall optical efficiency of the lamp and preserving the light distribution of intended light outcoupling features. The recessed cavity 18, is configured to mate with correspondingly array of LEDs, circuit board, and lamp base. Additionally, a slot or similar structure formed on the outcoupling optic may permit a user of the present invention to remove the outcoupling optic from a fixture by reasonable means, such as rotating the lens assembly. Any other means for attaching the lens assembly to a fixture, detachably or non-detachably, are contemplated and may be implemented with respect to alternate embodiments as will be appreciated by those of ordinary skill in the art.

Figure 39:
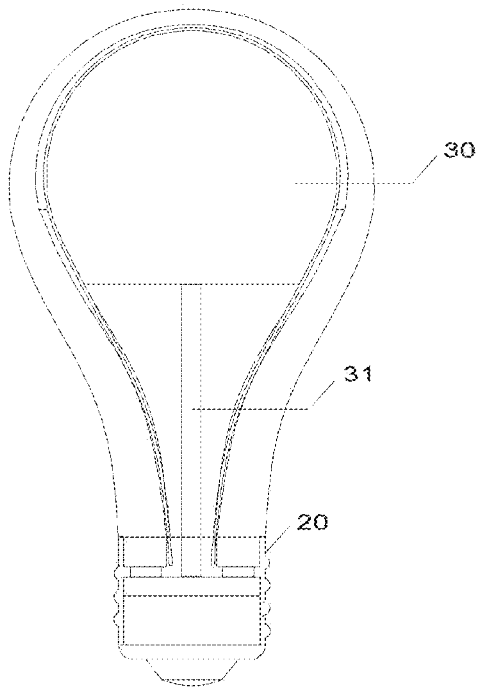
FIG. 39 shows an A type LED embodiment whereby further optics, electrical components, and the like are inserted into the hollow cavity of the optic.

Still referring to FIG. 35, it is important to note that although the presently preferred embodiment of the lens is assembled in one piece, it is contemplated that alternate embodiments of the lens may be assembled in several pieces and detachably secured to one another, allowing the user or manufacturer of the invention to easily separate the portions to insert additional optical components, electronics, and the like, as shown in FIG. 39.

Figure 36:
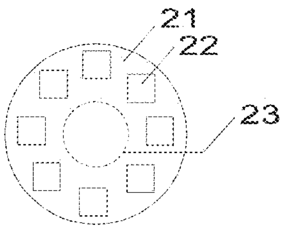
FIG. 36 shows a preferred embodiment of the arrangement of LED members of which the outcoupling optic of FIG. 35 is mounted adjacent.

FIG. 36 shows a preferred embodiment of the arrangement of LED members of which the outcoupling optic of FIG. 35 is mounted adjacent. Preferably, the multiple LED members 22 are symmetrically arranged on the plane circuit board 21 as shown in FIG. 36. The LED lamps are aligned in a way that provides for a light gathering effect and even light distribution. It is envisioned that the center 23 of plane circuit board 21 containing the LED members 22 may be either solid or cut out for the insertion of additional optics, electrical components, and the like. Furthermore, the plane circuit board 21 may consist of a reflective top surface for the purpose of reflecting light that has escaped from the outcoupling optic. The plane circuit board 21 is mounted in the LED lamp base.

Figure 37:
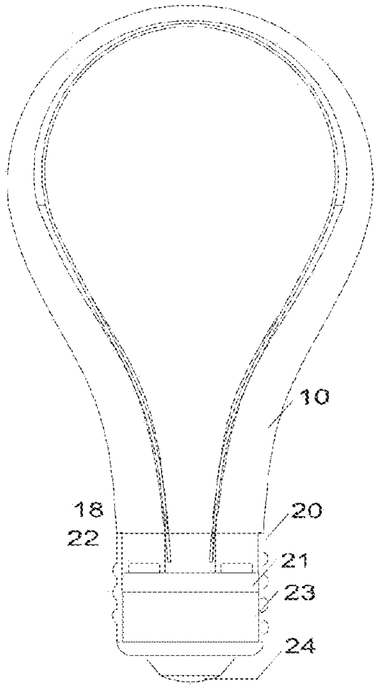
FIG. 37 illustrates an A type LED lamp embodiment outcoupling optic LED light bulb with an outcoupling optic.
Figure 38:
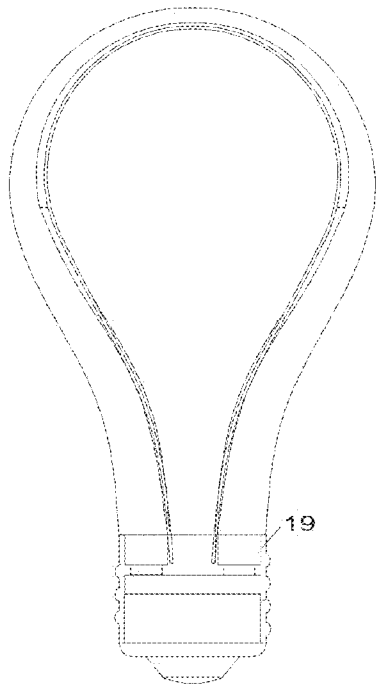
FIG. 38 shows an alternative A type LED lamp embodiment whereby the outcoupling optic has flat base which is positioned immediately adjacent to the LED light sources.

FIGS. 37-39 are side plan cross-sectional views of several variations of the outcoupling optic light emitting diode (LED) light bulb. FIG. 37 illustrates an outcoupling optic LED light bulb with an outcoupling optic, like that of FIG. 35, which slides over the LEDs. The multiple LED members 22 are connected with each other on the plane circuit board 21, and are connected to the bulb copper head 24 of the LED lamp base 20 through the drive circuit 23. The outcoupling optic is mounted on the LED lamp base 20, so that the multiple LED members 22 are fixed in the positioning segments 18 of the outcoupling optic 10. The fixing of the position of the LED members enhances the projecting angles and illuminance of the light emitted.

FIG. 38 shows an alternative embodiment of the present invention whereby the outcoupling optic consists of a flat base 19 to be mounted over the lens. The present arrangement allows for a different light gathering effect than that of the preferred embodiment of FIG. 37, whereby light is no longer directed into the inner cavity of the bottom of the outcoupling optic, resulting in slightly higher light distributions at the base of the lamp and less direct light distributions.

FIG. 39 shows another alternative embodiment of the present invention whereby further optics, electrical components, and the like 30 are inserted into the hollow cavity of the lens. Since the outcoupling optic, as described in FIG. 35, reflects very little to no light in the hollow cavity of the lens, such portion of the lens may be utilized for additional applications. Contemplated uses for the hollow cavity include storage of batteries of fuel cells to run LEDs without outside connections, photovoltaic cell to power LEDs or charge internal batteries to power LEDs, wifi module for wifi hotspot utilized to collect and transmit energy usage data, and LED power supply and driver. Those familiar with the art may recognized additional uses and applications of the hollow cavity. The component may receive or provide power by means of a wire, or the like 31, from the hollow cavity to the lamp base.

FIG. 40 shows typical light distribution of a 40 W incandescent A-lamp. As illustrated in FIG. 40, incandescent A-lamps are omnidirectional sources, emitting light uniformly over a wide angular range. The distribution is symmetric and uniform, except where the fixture base blocks the flux at near-nadir angles of <20°. The variations from perfect symmetry arise from the linear orientation of the tungsten filament and lamp elongation, but the lamp geometry and frosting of the bulb holds these variations to a minimum.

FIG. 41 shows the intensity distribution of an A-type LED light bulb of the present invention. LEDS, unlike an incandescent filament, are inherently directional light sources. The embodiment utilizes a volumetric diffuser as an outcoupling layer applied to the outer surface of the outcoupling surface as shown in FIG. 35. The volumetric diffuser was extruded as an optical film and laminated to optically couple to the light guide 19. As a film, the volumetric diffuser was measured to have a full width half max of 30 degrees. A reflective paint with titanium dioxide was used as a reflecting layer 15 as shown in FIG. 35. As illustrated in FIG. 41, the present invention comes close to approximating the omnidirectional distribution of an incandescent A-lamp shown in FIG. 40. The outcoupling optic LED light bulb of the present invention, like the incandescent A-lamp, has a more intense output at the crucial nadir and zenith angles. Similar to the 40W incandescent A-lamp of FIG. 40, the outcoupling optic LED light bulb of the present invention is most intense at 90° because of its predominantly vertical illuminating surfaces. Additionally, similar to the 40 W incandescent A-lamp of FIG. 40, the intensity of the outcoupling optic LED light bulb of the present invention diminishes near nadir.

Figure 43:
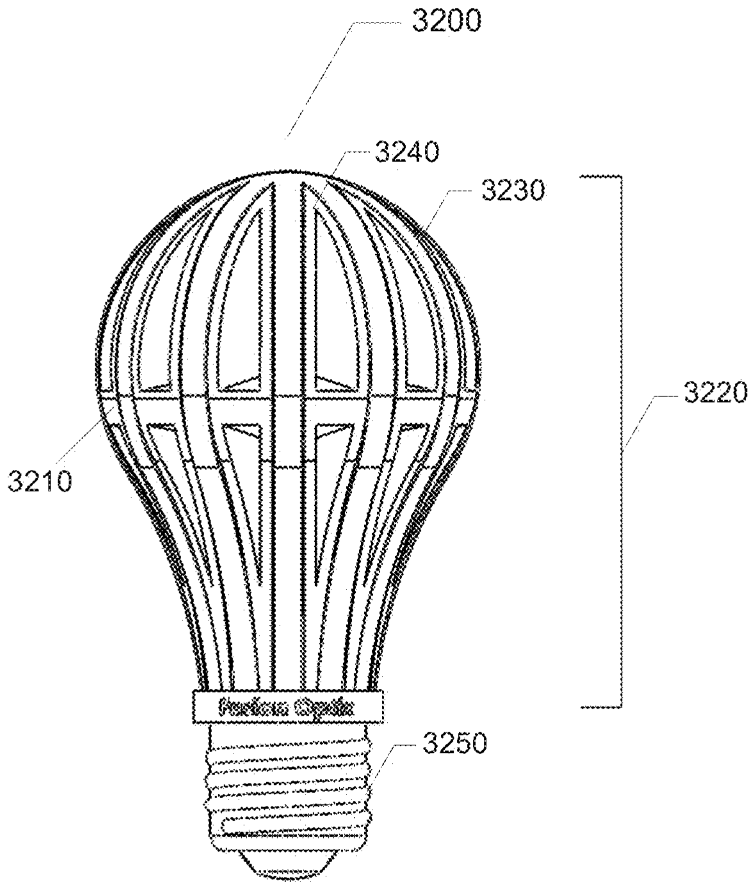
FIG. 43 is a perspective view of an LED A19 lamp with optical and thermal splines according to an embodiment of the present invention.

FIG. 43 is a perspective view of an A19 LED lamp 3200 with optical and thermal splines in accordance with aspects of the present invention. The lamp, a non-planar outcoupling optic, comprises an LED assembly 3210 with at least one light-emitting diode and a light bulb-like structure 3220 with a plurality of optical 3230 and thermal 3240 splines. Said optical 3230 and thermal 3240 splines are interspersed and integrated into the bulb body 3220, providing for optimal heat transfer, while still obtaining the standard light distribution to be expected from the A19 bulb type. Furthermore, the splines, referred to collectively, guide light from an internal light source provided by the LED assembly 3210 to increase the angular range of illumination and facilitate the dissipation of heat from the LED assembly 3210 to better ensure long-term operation of the LED lamp. The LEDs of the LED assembly 3210 are arranged along the perimeter of the bulb body 3220 and positioned to direct emitted light into the perimeter of the bulb body 3220, specifically the optical splines 3230, allowing for a large volume inside of the lamp to be isolated from any optical path and therefore available for placement of lamp components, controls, or reflectors, extending from the central body portion, for reflecting light emitted by the light emitting diode towards the illuminated space. Upon final assembly, the LED lamp 3200 can be connected to a conventional AC light bulb socket 3250 in a manner readily understood by virtually any end-user. The socket base is depicted in FIG. 1 to fit in a standard Edison screw-type light socket with its threaded portion. The base may, however, be made to fit any type of lighting interface, including the candela screw base, as used in other small lighting applications. Adapting the disclosed preferred embodiment to fit these lighting interfaces should be intuitive for those skilled in the art.

Figure 44:
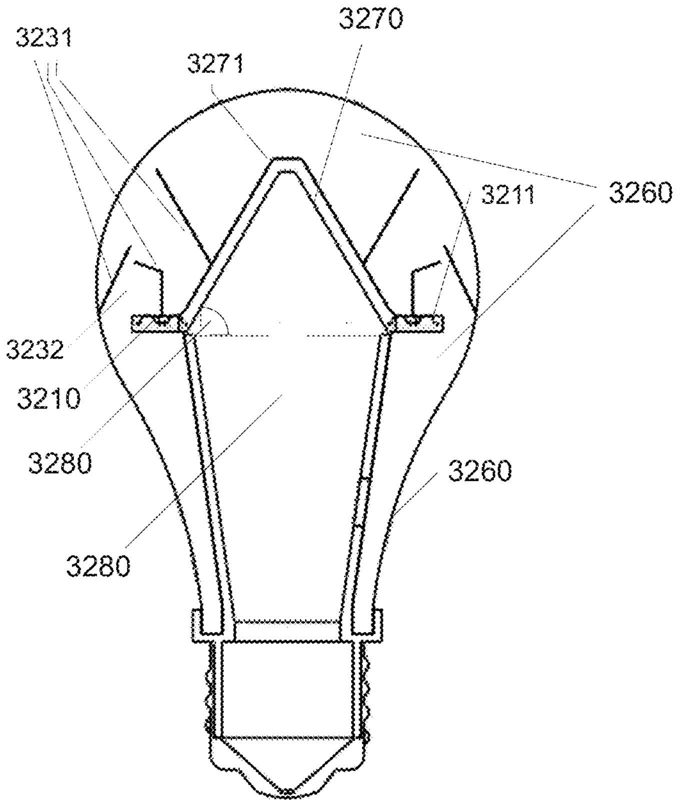
FIG. 44 is a cross section view of an LED A19 lamp with optical and thermal splines according to an embodiment of the present invention.

FIG. 44 is a cross section view of an A19 LED lamp 3200 embodiment with optical and thermal splines. The lamp includes optical splines 3230, which act as a light guide 3260, condensing light emitted from the LED assembly 3210 towards a desired region. The optical splines 230 are edge lit by the LED light source 3211, thereby establishing optical paths interspersed with thermal splines. The optical splines 3230 may contain reflective voids 3231, or air-voids, in one embodiment fabricated through cuts with a $CO_2$ laser, which provide reflecting walls that function as total internal reflection (TIR) optics. Said reflecting walls comprise an incident angle that is less than the critical angle of internal reflection, which redirects light within the optical spline 3230 to facilitate outcoupling at angles necessary to meet standard A19 light distribution (uniform from 0 to 135 degrees). Such reflective voids 3231 may come in a wide variety of shapes and sizes to improve the light extraction through the lamp 3200. To further aid in distributing light at higher angles, reflective films can be inserted into the reflective void spaces 3232, allowing light with a critical angle exceeding that of TIR to be reflected rather than passed through the TIR optic. The optical splines 3230 may further include diffusers or refractors for direct or indirect transmission of light.

The LED light source 3211 of the embodiment disclosed in FIG. 44 and referenced in FIG. 43 can be configured into any foreseeable pattern and can be of any style, shape, color, or package that will be apparent to those of skill in the art. Furthermore, the LED light source 3211 can assume a variety of forms known in the art and conventionally employed for light emitting diodes. In one embodiment, the LED assembly 3210 is positioned in the upper region of the bulb body 3210, but is not so limited. The LED assembly 3210 will be suspended between the upper and lower optical and thermal spline assembly of the A19 LED lamp of the current invention. Mounting options include, but are not limited to, threaded holes on the upper and lower optical and thermal spline assembly, as well as grooves running the perimeter of the assembly to allow the LED assembly to be flush mounted between the assemblies with no additional components. Furthermore, LED assembly 3210 is contemplated as being positioned in a variety of spaces within the length of the bulb-body 3220, depending on the particular lighting application, LED types, power level, but it is not so limited.

The A19 LED lamp 3200 according to the present invention may further include an inner reflector 3270 that fills in part or in full the existing empty internal volume 3280 and may reflect light emitted from the LED assembly 3210 in a predetermined direction. The reflector 3270 may be provided between the LED light source 3211 and the optical splines 3230. The reflector 3270 may reflect a portion of light emitted from the LED light source 3211 toward the lens. The reflector 3270 may also expand an angular range of the light projected through the lens. The reflector 3270, in one embodiment, comprises a reflective surface 3271 which may also be chemically coated for increased performance.

The combination of optical components with a reflector 3270 adds to the versatility of the present invention by changing the light direction and intensity of the LED light source 3211. If the light guide 3260 is transparent or translucent, some stray light may not be properly directed by the light guide. In that case, the stray light bounces off the reflector into the proper direction. The reflection angle 3272 can be changed as required. Furthermore, the reflective voids 3231 can also be cut as need to additionally enhance the angular range of illumination.

Figure 45:
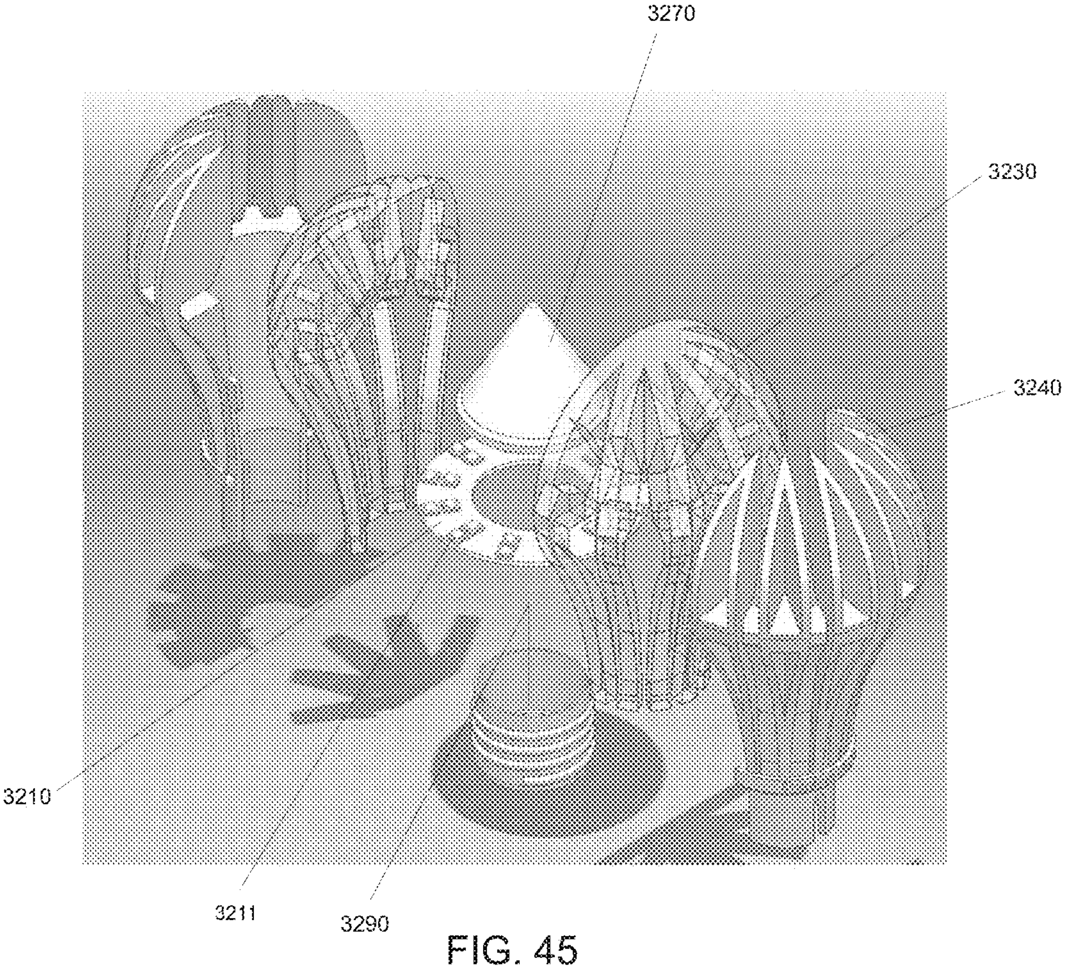
FIG. 45 is an exploded perspective view of an LED A19 lamp with optical and thermal splines according to an embodiment of the present invention.

FIG. 45 is an exploded view of an A19 LED lamp 3200 embodiment with optical 3230 and thermal splines 3240 which together form an external envelope of the bulb. LED light sources 3211 are mounted radially near the perimeter of the LED assembly 3210. This places them in a position which facilitates heat transfer out of the lamp through the thermal splines 3240. Additionally, the positioning provides large spacing 3212 between LED light source pairs which also aids in thermal management by minimizing thermal conductance between them.

The thermal splines 3240 dissipate heat from the LED assembly 3210 and power circuitry 3290, better ensuring long-term operation of the LED light bulb device. The thermal splines 3240 may be spaced apart from one another by a predetermined distance and extend vertical along the side surface of the bulb body 3220. Furthermore, the thermal splines 3240 can be straight sided, included angle forms (serrations) or involute form. In general, the thermal splines 3240 can be made from any material with high thermal conductivity including, but not limited to, aluminum, copper, and thermally conductive polymers. The large surface area of the thermal splines 3240 increases the heat dissipation rate as compared to prior art LED lighting devices. As a result, high output LED light sources 3211 can realize a longer operating life.

The optical 3230 and thermal 3240 splines may, upon final assembly, additionally serve to encase the LED light source 3211 relative to the bulb body 3220, thereby protecting the LEDs from external contaminants including, but not limited to, dust. Together, the optical 3230 and thermal 3240 splines create an external envelope of the bulb.

All the components of the A19 LED lamp embodiment can be assembled in a simple process and construct a single structure such that the manufacturing is feasible and the costs are minimalized, thereby enhancing the practicability of the present invention. As such, the present invention can be utilized in a variety of lighting applications.

Figure 46:
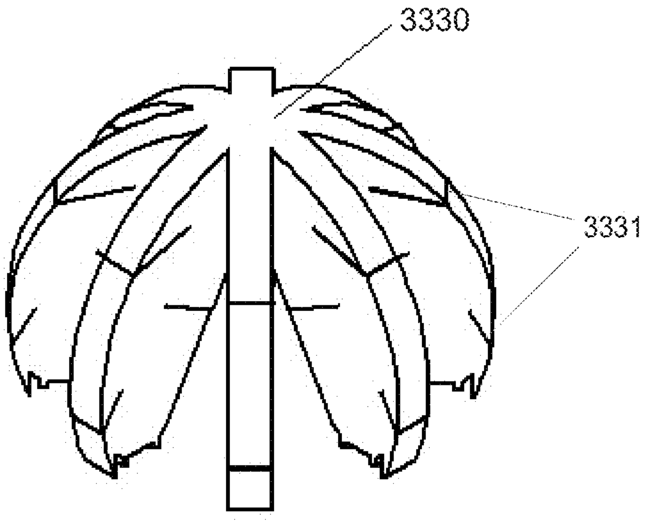
FIG. 46 is a perspective view of an alternative optical spline of an LED A19 lamp containing reflective voids according to an embodiment of the present invention.
Figure 47:
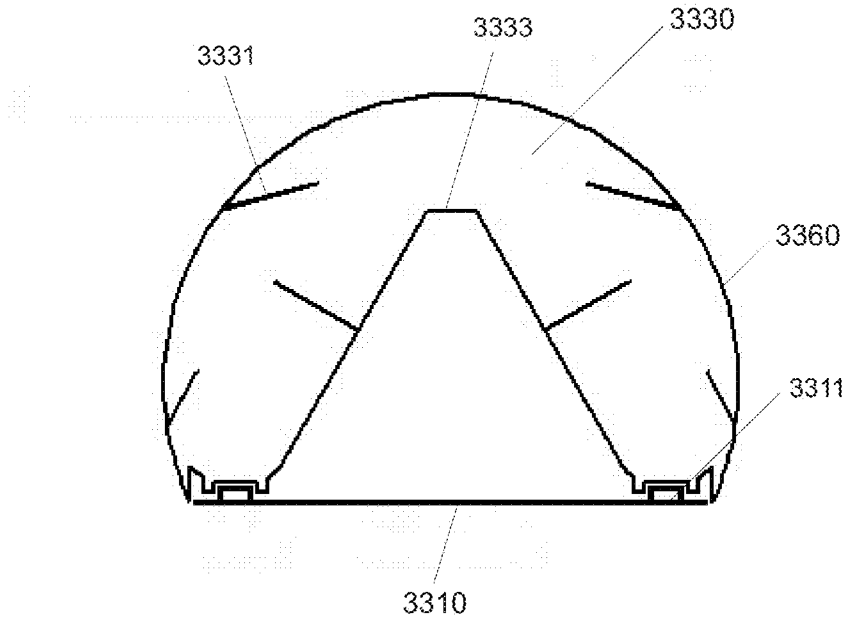
FIG. 47 is cross sectional view of the alternative optical spline of FIG. 46 containing reflective voids according to an embodiment of the present invention

FIG. 46 is a perspective view of an alternative optical spline 3330 of an LED A19 lamp 3300 containing reflective voids 3331 according to an embodiment of the present invention. The reflective voids 3331 in one embodiment are cut into the optical spline 3330 to further enhance the light distribution of the LED A19 lamp 3300. FIG. 47 is a cross-sectional view of the alternative optical spline 3330 of FIG. 46 containing reflective voids 3331. In this particular embodiment the LED light sources 3311 are positioned within a slotted receptacle, cut for instance by a laser-cutter to provide apertures to allow the LED light sources 3311 to protrude upward therewith, so as to direct light upward into the light guide 3360, but it is not so limited. In accordance with another aspect of the invention, the LED light sources 3311 are mounted in a slotted receptacle in the lighting assembly comprising a surface lined with a reflective material 3310 to direct the light upward into the translucent light guide 3360. Furthermore, the edge of the interior of the alternative optical spline 3330 may comprise a reflective material 3333 for preventing stray light from entering the LED A19 lamp assembly. In all of the embodiments with reference to FIGS. 43-47, as well as alternatives, variations, and modifications thereof, diffuser powder and/or films powders can be selectively added to the optical splines to smoothen the light transmitting through and redirected by the light guide.

It will now be evident to those skilled in the art that there has been described herein an A19 LED lamp. Although the invention disclosed herein has been described by way of a preferred embodiment, it will be evident that other adaptations and modifications can be employed without departing from the spirit and scope thereof. The terms and expressions employed herein have been used as terms of description and not of limitation; and thus, there is no intent of excluding equivalents, but on the contrary it is intended to cover any and all equivalents that may be employed without departing from the spirit and scope of the invention. Therefore, any and all variations and modifications that may occur to those skilled in the applicable art are to be considered as being within the scope and spirit of the invention.

Figure 48:
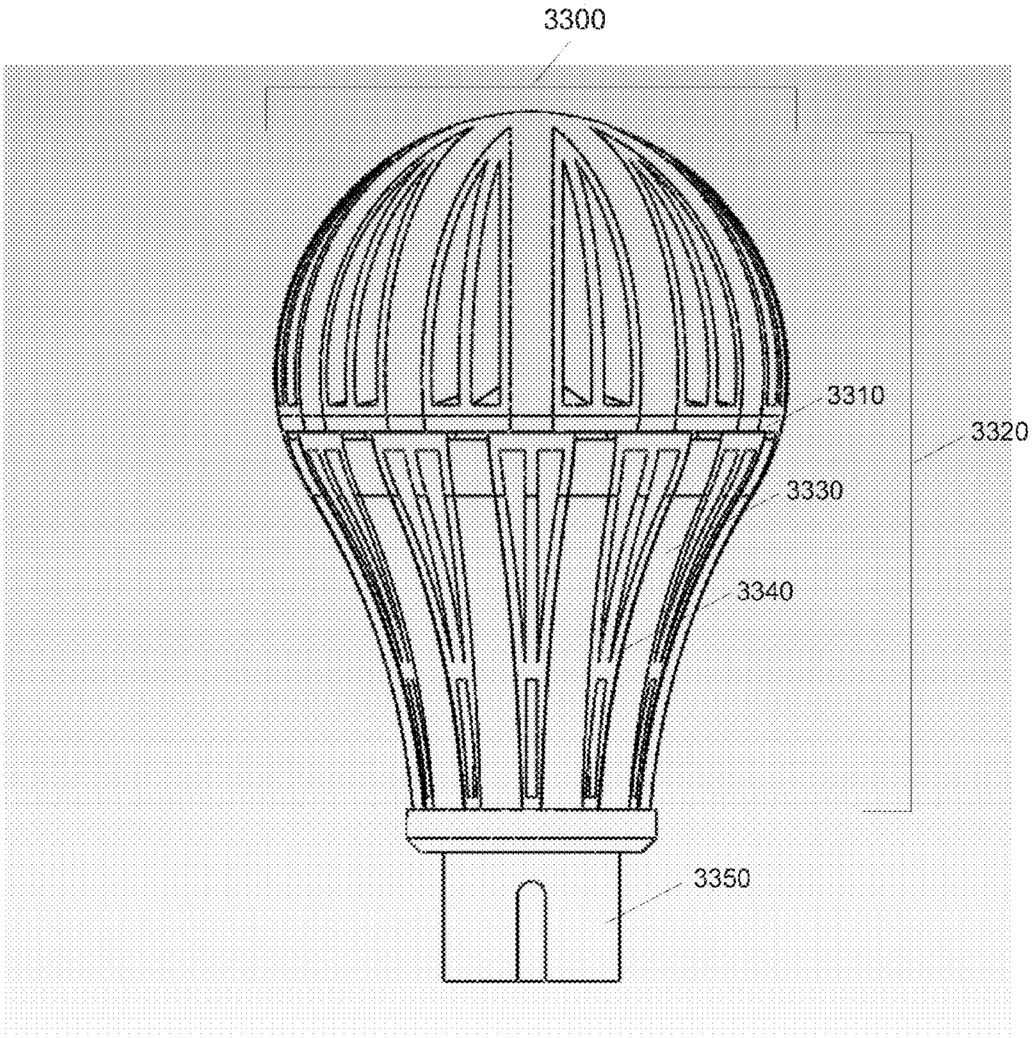
FIG. 48 is a perspective view of an alternative A19 LED lamp with optical and thermal splines and a double-sided LED assembly according to an embodiment of the present invention.

FIG. 48 is a perspective view of an alternative A19 LED lamp 3300 with optical and thermal splines in accordance with another preferred embodiment of the present invention. The lamp, a non-planar outcoupling optic, comprises a double-sided LED assembly 3310 with at least one light-emitting diode and a light bulb-like structure 3320 with a plurality of optical 3330 and thermal 3340 splines. Said optical 3330 and thermal 3340 splines are interspersed and integrated into the bulb body 3320, a thermally-conductive housing, providing for improved heat transfer, while still obtaining the same dimensional form factor and light distribution to be expected from the A19 bulb type. As shown in this figure, a base element 3350 and the interspersed optical 3330 and thermal splines 3340 form the outer body of the A19 LED lamp assembly. This bulb body 3320, in addition to possessing ideal thermal and optical properties, may protect the internal components of the lamp. The aforementioned embodiment disclosed in FIG. 48 may be assembled in the same manner as the previous embodiments disclosed in FIGS. 43-46. However, it is notable that the upper and lower portions of the optical 3330 and thermal 3340 splines are rotationally offset to account for the LED light sources being interspersed on both sides of the LED assembly 3310.

Figure 49:
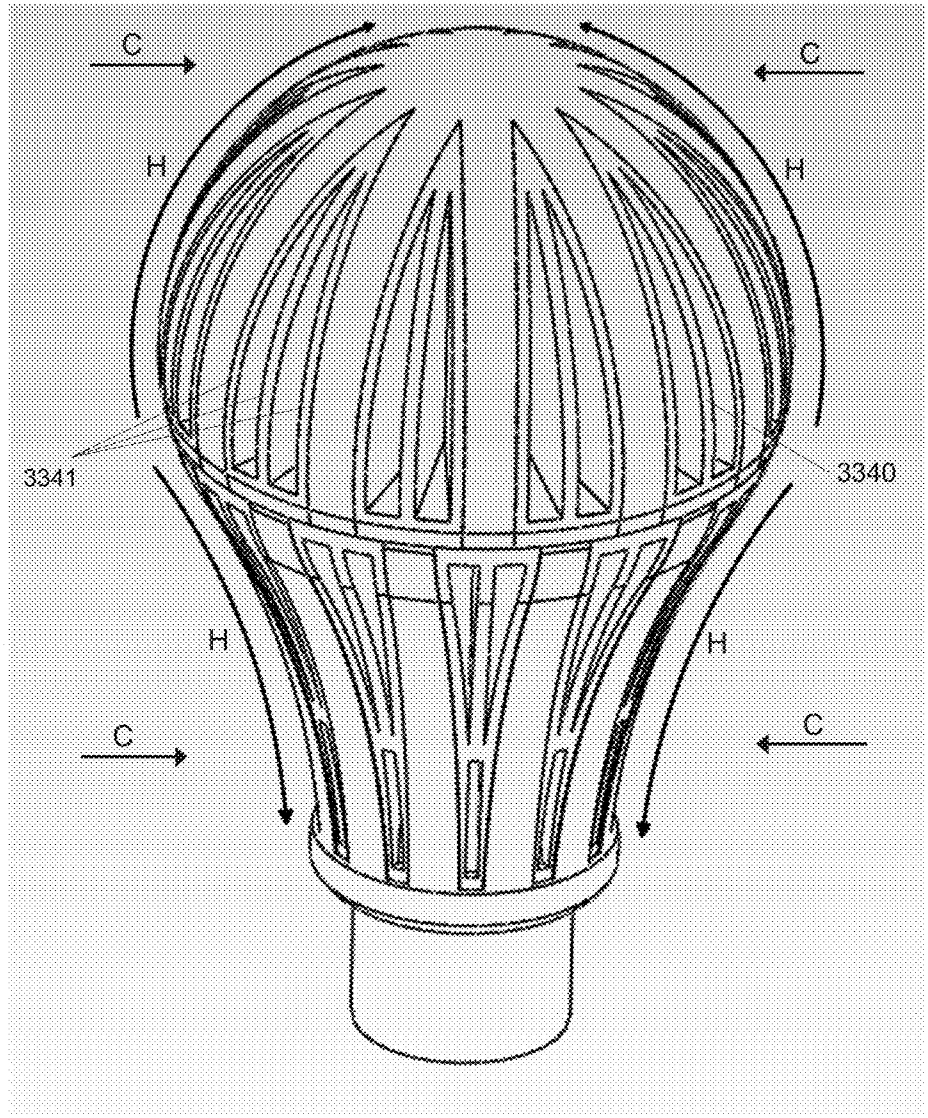
FIG. 49 is an exploded perspective view of the alternative A19 LED lamp of FIG. 48.

FIG. 49 is an exploded perspective view of the alternative A19 LED lamp 3300 disclosed in FIG. 48. In the depicted embodiment, each thermal spline 3340 has a plurality of arcuate heat fins 3341 that extend longitudinally along the entire length of the thermal spline. Heat generated by the LED light sources, as designated by arrows H in FIG. 2, is forced outward and away from the thermal splines 3340. Cooling air, exemplarily designated by arrows C in FIG. 2, is drawn towards the thermal splines 3340 from the surrounding environment. The fins 3341 of the thermal splines 3340 further aid in heat removal from the lamp 3300 and natural convection. The shape and orientation of the heat fins 3341 in the depicted embodiment forces heat outward and away from the thermal splines while drawing in cool air. Furthermore, the shape of the heat fins 3341 also provides additional surface area for improved convection.

Figure 50:
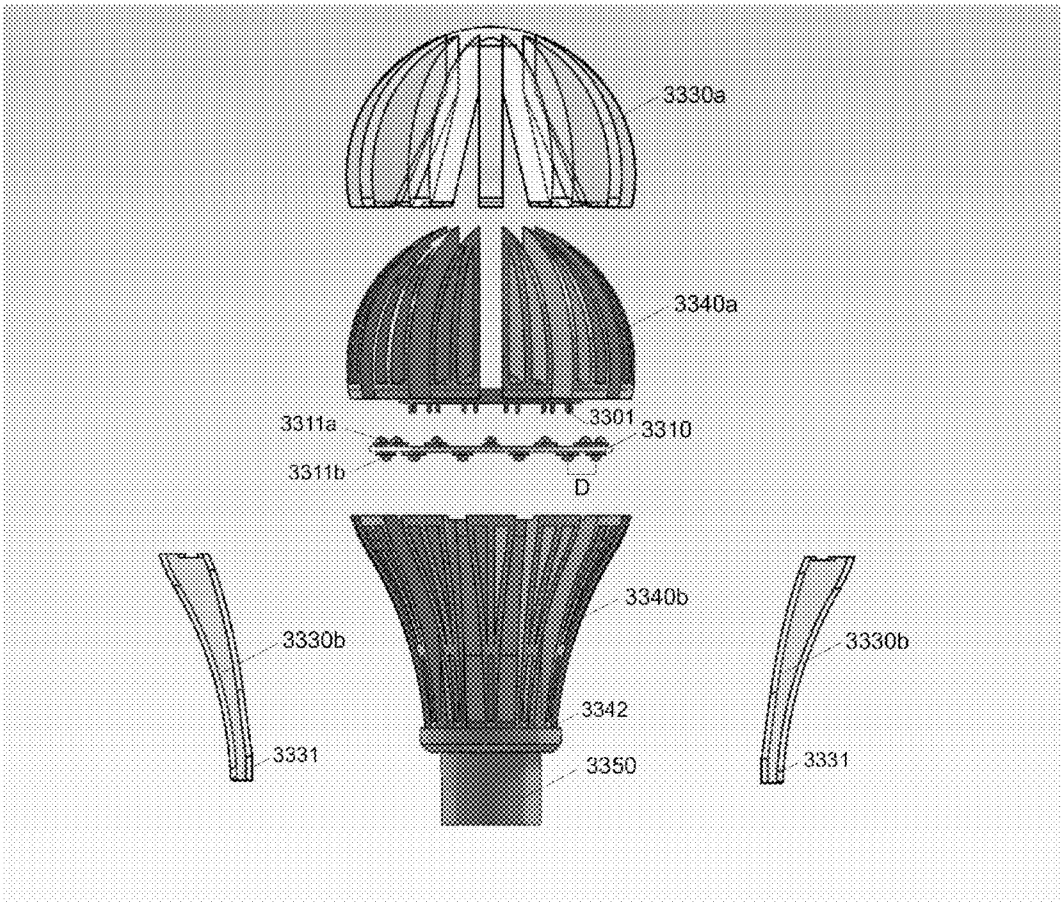
FIG. 50 is a detailed perspective view of the alternative A19 LED lamp of FIG. 48.

FIG. 50 is a detailed perspective view of the alternative A19 LED lamp of the present invention. As shown in FIG. 50, the alternative A19 LED lamp comprises an upper and lower optical spline 3330 assembly, 3330*a* and 3330*b*, respectively. The upper optical spline 3330*a* directs light primarily in a direction away from the base 3350 while the lower optical spline 3330*b* redirects light in an orientation primarily opposite the optical axis of the double-sided LED assembly 3310, hereinafter "LED assembly", thereby creating a bifurcated optical path and achieving the desired A19 light distribution pattern. The upper optical spline assembly 3330*a* is shown converging into one piece while the lower optical spline assembly 3330*b* consists of separate components. Alternative embodiments may be configured with or without each optical spline type converging to form one piece. As depicted in FIG. 50, the alternative A19 LED lamp additionally comprises an upper and lower thermal spline 3340 assembly, 3340*a* and 3340*b*, respectively. The splines, referred to collectively, include a flat surface upon which the double-sided LED assembly 3310 of the present invention is mounted. The LED assembly 3310 is in thermal contact with the thermal splines 3340 for transfer of heat from the LED assembly 3310 to the thermal splines 3340.

The LED assembly 3310 may comprise a plurality of LED light sources 3311*a* and 3311*b*, respectively, and the plurality of LED light sources 3311 may be spaced a predetermined distance D from each other on the LED assembly circuit board. The circuit board of the LED assembly 3310, comprising a general printed circuit board (PCB), a metal core PCB, a flexible PCB, or a ceramic PCB, may be formed of a material to efficiently reflect light. Furthermore, the circuit board comprises electronic circuitry for supplying the LED light sources with power in accordance with the electrical requirements of the LED assembly 3310 and electronics.

The number and type of LED light sources 3311 chosen is dependent upon a wide range of factors including, but not limited to, power constraints and lighting requirements of the A19 LED lamp within which the bulb operates. Furthermore, the relative positions of the LED light sources 3311 and the configuration of the optical splines 3330 determine the beam direction. One skilled in the art will recognize that any number of LED light sources 3311 may be utilized, and that an increase in the number of LED light sources 3311 may result in a directly proportional increase in the operating temperature of the LED assembly 3310. An increase in the number of LED light sources 3311 may require additional drive power, which may translate into sufficiently more heat being dissipated within the LED assembly 3310. The present invention design affords sufficient thermal-reducing capabilities due to the unique internal configuration of the bulb body 3320 and the orientation of the thermal splines 3340. Furthermore, the body of the optical splines 3330 may feature a plurality of reflective properties 3331 that serve to influence the distribution of the light pattern that emanates from the LED assembly 3310. In one embodiment, the optical splines 3330 may be injection-molded using a light transmitting material, such as glass, poly methyl methacrylate (PMMA), or polycarbonate (PC).

In the present embodiment, the base 3350 features an inner surface that is sized to form a cavity that is appropriate for accepting the internal contents of the A19 LED lamp, including the LED driver circuitry and optical and thermal spline flanges, 3331 and 3342, respectively, for assembly of the lamp. The base 3350 may further comprise a heat sink element, which is made from a material having high thermal conductivity, such as gold, silver, copper, titanium, aluminum and the like.

In one embodiment, the alternative A19 lamp of the present invention and its according components are held in place by fastening devices 3301, such as screws, that pass through apertures of the upper thermal spline 3340*a* to the LED assembly 3310 to the lower thermal spline 3340*b* to retain the entire lamp. In the same embodiment, the upper and lower optical splines, 3330*a* and 3330*b*, respectively, are then inserted into the hollow cavities of the thermal spline 3340 to form the complete optic. In another embodiment, the A19 LED lamp is assembled by screwing the upper thermal spline 3340*a* into the lower thermal spline 3340*b* with the LED assembly 3310 sitting in the interior of the screwing mechanism. One skilled in the art will appreciate that assembly of the A19 LED lamp of the present invention can be accomplished in a number of ways.

Figure 51:
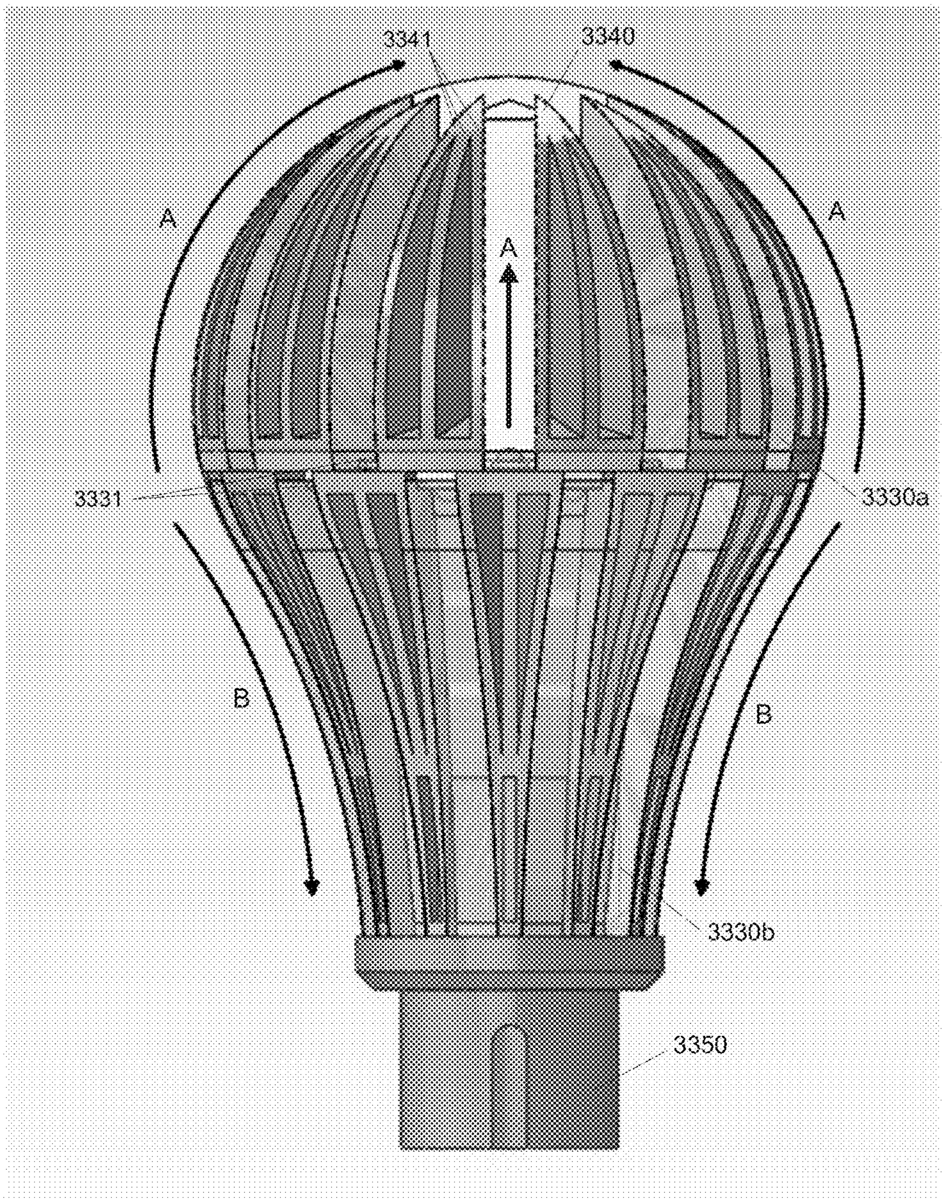
FIG. 51 is a perspective cross-sectional view of the alternative A19 LED lamp of FIG. 48.

FIG. 51 is a perspective cross-sectional view of an exemplary embodiment of the present invention, further illustrating the separate optical spline assemblies, upper optical spline 3330*a* and lower optical spline 3330*b*. In this embodiment, the lower optical spline assembly 3330*b* aids in achieving increased light output at higher angles which is typically difficult to achieve in a LED A19 lamp. The positioning of the LED light sources 3311 on both sides of the LED assembly provides two separate optical paths, A and B, which in combination can be optimized to provide a light distribution similar to that of an A19 bulb. As will be apparent to one of skill in the art, the configuration, size, and shape of the upper 3330*a* and lower 3330*b* optical spline assemblies may be adjusted accordingly to achieve different optical paths. Furthermore, in optimizing the design for a desired light distribution, the number and intensity of the LED light sources 3311 inputting into the optical spline assemblies can be altered as needed. The optical splines 3330 may contain diffusive properties, a reflective surface, or be chemically coated for increased performance and additional control over the beam shaping.

The LED light sources 3311 are mounted radially near the perimeter of the alternative A19 lamp of the present invention, which places them in a position to facilitate heat transfer out of the lamp through the thermal splines 3340. The separation of the LED light sources via interspersed optical 3330 and thermal 3340 splines provides a compact means of effectively reducing peak LED assembly temperatures while efficiently removing waste heat. Dividing heat generating LED light sources 3311 and placing them between separate cooling thermal splines 3340 is one method of mitigating the negative temperature effects on LED lighting sources 3311.

In the depicted embodiment, each thermal spline 3340 has a plurality of arcuate heat fins 3341 that extend longitudinally along the entire length of the thermal spline 3340. Although the thermal splines have been illustrated and described in detail, it should not be limited to the precise forms disclosed and obviously many modifications and variations to the thermal splines 3340 are possible in light of the teaching contained herein. For example, in alternative embodiments of the A19 LED lamp of the present invention other forms of thermal splines 3340 may be utilized, such as thermal splines 3340 with a plurality of linear or parallel fins.

It is also contemplated that alternate configurations of optical 3330 and thermal 3340 splines may be connected to the base 3350 for reasons such as altering the light distribution pattern and luminous intensity of the lamp. However, as one in the art will recognize, such will mean that the lamp is no longer an A19 LED lamp and thus will not produce the desired output of said lamp. Nonetheless, the ability to selectively detach and reattach the optical 3330 and thermal 3340 splines provides for an easily customizable lamp.

Figure 52:
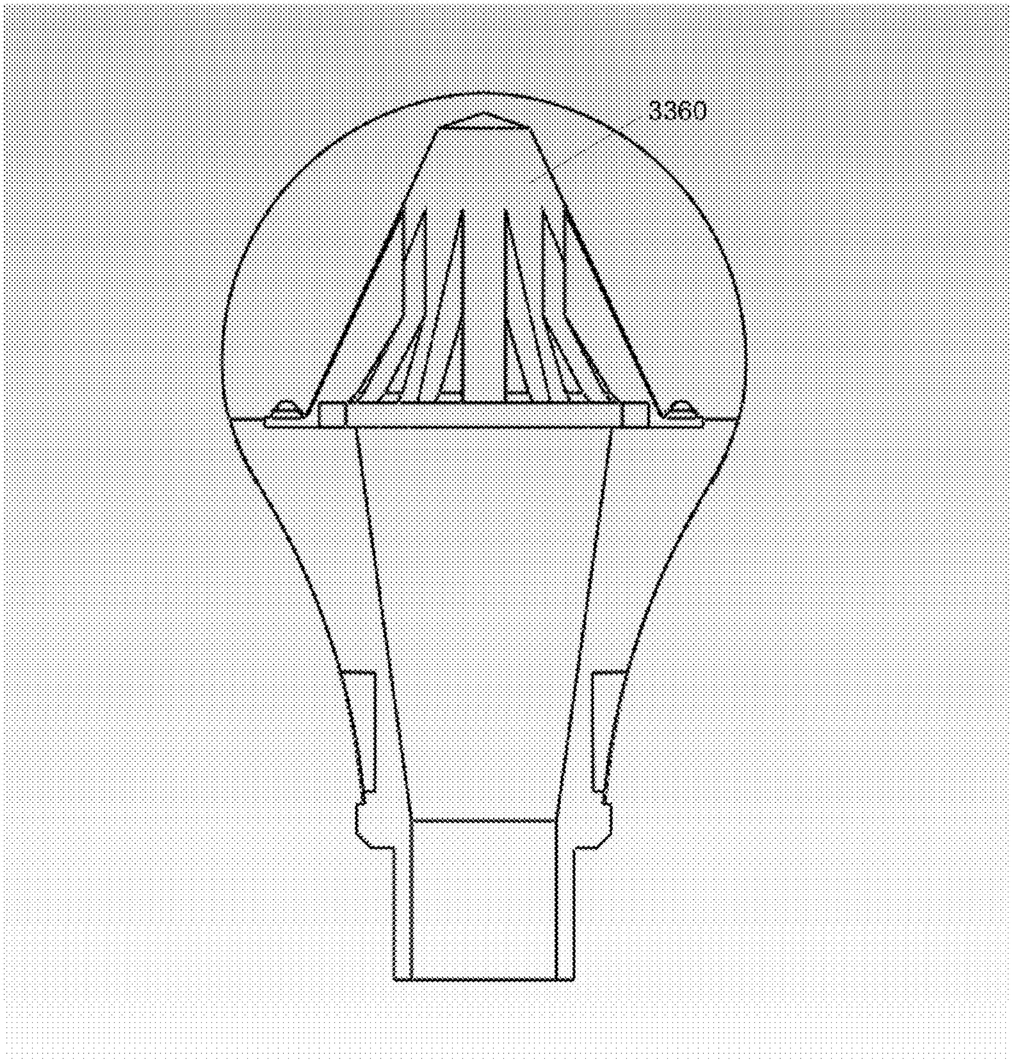
FIG. 52 is cross sectional view of the alternative A19 LED lamp of FIG. 48 with a hollow cavity, according to another exemplary embodiment.

Furthermore, it is contemplated that less than all of the optical splines 3330 need be provided with an LED light source 3311. This allows for the manufacturer or user to utilize the same A19 LED lamp with a variable amount of LED light sources 3311, thereby affording flexibility in luminous output or light distribution from the A19 LED lamp of the present invention and optimizing optical and thermal output. As shown in FIG. 52, the alternative A19 LED lamp of the present invention may comprise a hollow cavity 3360 in the center of the bulb free from any optical path, and therefore available for placement of lamp components, controls, or reflectors, extending from the central body portion, for reflecting light emitted by the light emitting diode towards the illuminated space. Embodiments may utilize light scattering features such as a volumetric diffusing films, patterns of surface features, or coatings of light scattering particles. In another embodiment, the hollow cavity may have further thermal dissipation components. Other embodiments of the invention will be apparent to those skilled in the art from consideration of the specification and practice of the invention disclosed herein. It is intended that the specification and examples be considered as exemplary only, with a true scope and spirit of the invention being indicated by the claims.

Example 1

A volumetric light scattering film produced as described in U.S. Pat. No. 5,932,342 is inserted into the cavity of a mold with a quadric surface and held in place by a vacuum. Light transmitting PMMA is injected into the mold such that it is optically coupled to the a surface of the volumetric light scattering film. The mold is cooled and the resulting tapered lightguide with a quadric surface and a polished edge is removed. A light source comprised of an array of light emitting diodes (white Rebel LEDs produced by Lumileds) on a circular metal core annulus is disposed next to the input edge of the lightguide.

Example 2

An anisotropic light scattering diffuser film produced as described in U.S. Pat. No. 5,932,342 is inserted into the cavity of a mold and held in place by a vacuum. A light source comprised of an array of light emitting diodes (white Rebel LEDs produced by Lumileds) on a metal core strip. The diffuser is oriented with the domains substantially parallel to the optical axis of the LEDs. Light transmitting PMMA is injected into the mold such that it is optically coupled to the output surface of the LEDs and the anisotropic light scattering diffuser film. The mold is cooled and the resulting article is removed.

Example 3

Two anisotropic light scattering diffuser films produced as described in U.S. Pat. No. 5,932,342 are inserted onto opposite surfaces of the cavity of a mold and held in place by a vacuum. A light source comprised of an array of light emitting diodes (white Rebel LEDs produced by Lumileds) on a metal core strip. The diffusers are oriented with the domains substantially parallel to the optical axis of the LEDs. Light transmitting PMMA is injected into the mold such that it is optically coupled to the output surface of the LEDs and the anisotropic light scattering diffuser films. The mold is cooled and the resulting article is removed.

Example 4

An optical element is made from a 187 micron lenticular lens array film printed on the flat side with linear array of white lines using a laser transfer process. The white lines were aligned substantially parallel to the lenticules and in the regions directly beneath the apex of the lenticules. The white lines are approximately 100 μm wide with a pitch of approximately 187 μm. The optical element is positioned above an edge-lit lightguide with light extraction features and a white PET-based reflector on the opposite side. The light output from the resulting light emitting device has far-field peak illuminance angles greater than 30 degrees from the normal.

Example 5

An optical element is made from a 187 micron lenticular lens array film laminated with Cromalin light sensitive film from DuPont Inc. Collimated UV light from a 1 kW Tamarack UV exposure system is directed to the lenticular film at angle of 15 degrees from the normal to the film such that the light passes through the lenticular elements and exposes the Cromalin light sensitive film. The protective cover is removed from the Cromalin and white titanium dioxide powder is then applied by soft brush to the Cromalin film. The film is then blanket UV cured to fully cure the Cromalin. When the optical element is positioned on a diffuser sheet which is directly illuminated by LEDs with the light incident on the light reflecting surface, the far-field peak angle of illuminance is at 15 degrees and light is visible in the angular ranges corresponding to light passing through the white regions.

Example 6

An optical element is made from a 187 micron lenticular lens array film laminated with Cromalin light sensitive film from DuPont Inc. Collimated UV light from a 1 kW Tamarack UV exposure system is directed to the lenticular film at angle of 15 degrees from the normal to the film such that the light passes through the lenticular elements and exposes the Cromalin light sensitive film. The protective cover is removed from the Cromalin and carbon black powder is then applied by soft brush to the Cromalin film. The film is then blanket UV cured to fully cure the Cromalin. A second layer of Cromalin film is laminated to the first Cromalin film. The optical element is then exposed similarly with collimated UV light directed at 15 degrees. The protective cover is removed from the Cromalin and white titanium dioxide powder is then applied by soft brush to the second layer of Cromalin film. The film is then blanket UV cured to fully cure the Cromalin. This resulted in an optical element with black regions disposed in-between the lenticular elements and the white reflecting regions. When the optical element is positioned on a diffuser sheet which is directly illuminated by LEDs with the light incident on the light reflecting surface, the far-field peak angle of illuminance is at 15 degrees and light is not visible in the angular ranges corresponding to light passing through the white and black regions.

Example 7

An optical element is made from a 187 micron linear lenticular lens array film laminated with Cromalin light sensitive film from DuPont Inc. A temporary light blocking mask is placed on a portion of the lenticular film, leaving a first region comprising a first group of lenticular elements exposed. Collimated UV light from a 1 kW Tamarack UV exposure system is directed to the lenticular film at angle of 0 degrees from the normal to the film such that the light passes through the lenticular elements and exposes the Cromalin light sensitive film. The light blocking mask is moved such that it exposes a middle, second region of the film while blocking light from reaching the first and a third regions of the film. The film is further exposed to UV light at an angle of 15 degrees from the normal toward the first region. The light blocking mask is then moved such that it exposes the third region of the film while blocking light from reaching the first and a second regions of the film. The film is further exposed to UV light at an angle of 30 degrees from the normal toward the first region. The protective cover is removed from the Cromalin and barium sulfate powder is then applied by soft brush to the cromalin film. The film is then blanket UV cured to fully cure the Cromalin. When the optical element is positioned on a diffuser sheet which is directly illuminated by LEDs with the light incident on the light reflecting surface, the far-field peak angle of illuminance is at 15 degrees and the light output has a positive far field focal point closer to the first region than the third region of the film.

Example 8

An arcuate cone-like shaped lightguide in the shape of the lightguide 102 of FIG. 2 is formed by an injection molding process using transparent PMMA resin. During the injection molding process, a volumetric light scattering film based on a polycarbonate matrix with an adhesion promoter is insert molded such that it bonds to the injection molded PMMA. An LED thermally connected to an aluminum alloy thermal transfer element is physically coupled to the entrance edge of the lightguide. A white PET-based light reflecting film is disposed between the thermal transfer element and the lightguide with an air gap between the light reflecting film and the lightguide. The resulting light emitting device is an Edison screw-type light bulb as shown in FIG. 4. The volumetric light scattering film may alternatively be formed by vacuum thermoforming a flat volumetric light scattering film to the shape corresponding to the injection molded lightguide and adhering the film to the lightguide using an optical adhesive and a vacuum to remove the air bubbles before curing, by UV radiation or heat, for example.

Example 9

A light emitting device comprising an arcuate surface relief light scattering region such as the one illustrated in FIG. 3 is formed by using a planar sheet of transparent PMMA. Using a $CO_2$ laser, surface relief features in a pre-determined pattern are ablated on the surface. The resulting planar lightguide is vacuum thermoformed over a tool such that the resulting lightguide is arcuate and tapered. The temperature and processing conditions can be controlled to achieve the desired taper and shape properties. If desired, the resulting lightguide may be cut or trimmed to achieve polished edges that are substantially planar and perpendicular to the light emitting device optical axis 104. A white PET-based light reflecting film is disposed between the lightguide and the thermal transfer element while maintaining an air-gap between the light reflecting film and the lightguide.

Example 10

The arcuate, rotationally symmetrically lightguide 503 of FIG. 5 is manufactured by a two-step injection molding process wherein a transparent PMMA resin is injection molded into a mold to form the transparent, non-scattering region. In the second step, a PMMA resin containing light scattering domains such as hollow glass microspheres or cross-linked polystyrene microspheres is injection molded onto a surface of the lightguide to achieve the arcuate rotationally symmetric lightguide 503. An injection molded volumetric light scattering lens comprising a PMMA resin with light scattering cross-linked polystyrene microspheres is adhered to the lightguide to achieve the lightguide and lens combination shown in FIG. 5.

Example 11

An arcuate non-tapered lightguide as shown in FIG. 9 can be formed by laser cutting a 5 mm sheet of transparent PMMA and subsequently heating the PMMA over a mold in an oven until the acrylic softens and forms the arcuate shape as shown in FIG. 9. A light extracting region (not shown) may be used with the lightguide of FIG. 9. A light extracting region comprising a volumetric light scattering film may be employed by optically adhering a volumetric light scattering film to the outer or inner surface of the lightguide using a UV or thermally cured optical adhesive. Alternatively, a light extracting region comprising surface relief features on a surface of the lightguide may be formed by using a CO2 laser to ablate microstructures on the surface of the PMMA before (preferably) or after thermoforming the PMMA in the oven.

Example 12

A light emitting device as shown in FIG. 13B is formed by injection molding an arcuate tapered lightguide 1201 with a transparent PMMA. An aluminum-alloy thermal transfer element heat-sink is thermally coupled to a metal-core board comprising two linear arrays of white LED's. A light reflecting element comprising a white PET film is physically coupled between the lightguide and the thermal transfer element with an air gap between the light reflecting film and the lightguide. A volumetric light scattering PMMA-based film comprising light scattering domains is optically coupled to the opposite surface of the lightguide. A light redirecting element comprising a linear array of lenticules (lenticular lens film) is physically coupled around the edges to a housing, the lightguide, or the volumetric light scattering region such that there is an air gap between the light redirecting element and the volumetric light scattering film. In another embodiment, the volumetric light scattering film is optically coupled to the lightguide on the same side of the lightguide as the light reflecting film.

Example 13

A light emitting device as shown in FIG. 18 is formed by creating an arcuate lightguide 102 with an angularly extended surface by injection molding or thermoforming the lightguide 102 from a transparent PMMA resin. A light extracting region comprising a volumetric light scattering film is optically adhered to the outer surface of the lightguide using a UV cured optical adhesive. A light reflecting element comprising a white PET film is physically coupled on the surface opposite the light emitting surface of the lightguide with an air gap between the light reflecting film and the lightguide. The white PET film can be coupled to the housing, thermal transfer element or small regions of the lightguide or sandwiched in place by another element such as the thermal transfer element. LED's with an optical axis 904 are disposed along two opposite light input edges of the lightguide.

Example 14

A light emitting device 2200 illustrated in FIG. 22 may be formed by thermoforming a PMMA sheet in an oven on a tool of the desired shape to achieve the lightguide 2204 shown in FIG. 23. Alternatively, the sheet may be heated in an oven, brought out of the oven, and draped over a cooler mold to create the shape. A volumetric light scattering film is optically adhered to the lower surface of the lightguide in two regions. A light reflecting element comprising a white PET film is physically coupled to the thermal transfer element with an air-gap between the light reflecting film and the lightguide. Two linear arrays of LED's on a metal core board are thermally coupled to the thermal transfer element. By placing the light extracting region on the surface of the lightguide not facing the light output direction of the light emitting device, the light extracting region is protected from the environment by the lightguide. For example, surface relief light scattering regions are less likely to be scratched or the grooves or pits less likely to be "filled in" with dirt or dust if they are behind the outer surface of the light emitting device. Similarly, a volumetric light scattering element may be protected from the environment by optically coupling it to the surface of the lightguide not facing the light output direction of the light emitting device.

Example 15

A linear-shaped light emitting device 2700 illustrated in FIG. 27 is made by cutting two sheets of acrylic using a laser cutter and beveling one of the edges of each. A volumetric light scattering film 103 comprising light scattering domains dispersed in a PMMA matrix is optically adhered using UV curable optical adhesive to the lower surfaces of the lightguides 2701 in two regions. A light reflecting element 902 comprising a white PET film is physically coupled to the thermal transfer element with an air-gap between the light reflecting film and the lightguide. Two linear arrays of LED's 101 with the arrays oriented in the x direction on a metal core board are thermally coupled to the thermal transfer element 109. Light exiting each surface of the lightguide (through the volumetric light scattering film 103) and through the opposite surface on the lightguide 2701 is directed toward a linear volumetric light scattering lens 2702 with a semi-circular cross-sectional profile formed by profile extruding a PMMA resin with light scattering cross-linked polystyrene microspheres. The angular luminous intensity from the light emitting device 2700 has a substantially batwing-type light distribution that can provide a more uniform illuminance on a surface parallel to the mounting surface such as a ceiling. FIG. 21 is a cross-section of a substantially linear device. However, a substantially rotationally symmetric lightguide, circular array of LED's, and a dome-shaped light scattering lens may be used, having a similar cross-section to that in FIG. 27, to achieve a substantially hemispherical light emitting output surface shape and corresponding light emitting device.

Example 16

A light emitting device 2900 with a bi-convex cross-sectional profile as illustrated in FIG. 29 is formed by profile extruding a transparent, non-scattering PMMA with the shape profile of the lightguide 2901 cross-section while simultaneously extruding a volumetric light scattering region comprising PMMA with light scattering domains. A light reflecting element comprising a white PET film is physically coupled on the surface opposite the light emitting surface of the lightguide with an air gap between the light reflecting film and the lightguide. Two linear arrays of LED's 101 on a metal core board are thermally coupled to the thermal transfer element (not-shown). Similarly, a light emitting device with a lightguide that is a bi-concave, or concave-convex (concave up or concave down) may be formed by changing profile shape of the extrusion die. In the bi-concave lightguide of FIG. 30, a central opening region for the LED's (extending all the way through as shown, or partially into the lightguide (not shown) may be formed by machining out a central region or laser cutting or other machining methods.

EQUIVALENTS

Those skilled in the art will recognize, or be able to ascertain using no more than routine experimentation, numerous equivalents to the specific procedures described herein. Such equivalents are considered to be within the scope of the invention. Various substitutions, alterations, and modifications may be made to the invention without departing from the spirit and scope of the invention. Other aspects, advantages, and modifications are within the scope of the invention. The contents of all references, issued patents, and published patent applications cited throughout this application are hereby incorporated by reference. The appropriate components, processes, and methods of those patents, applications and other documents may be selected for the invention and embodiments thereof. The contents of all references, including patents and patent applications, cited throughout this application are hereby incorporated by reference in their entirety. The appropriate components and methods of those references may be selected for the invention and embodiments thereof. Still further, the components and methods identified in the Background section are integral to this disclosure and can be used in conjunction with or substituted for components and methods described elsewhere in the disclosure within the scope of the invention.

In describing embodiments of the invention, specific terminology is used for the sake of clarity. For purposes of description, each specific term is intended to at least include all technical and functional equivalents that operate in a similar manner to accomplish a similar purpose. Additionally, in some instances where a particular embodiment of the invention includes a plurality of system elements or method steps, those elements or steps may be replaced with a single element or step; likewise, a single element or step may be replaced with a plurality of elements or steps that serve the same purpose. Further, where parameters for various properties are specified herein for embodiments of the invention, those parameters can be adjusted up or down by 1/20$^{th}$, 1/10$^{th}$, 1/5$^{th}$, 1/3$^{rd}$, 1/2, etc., or by rounded-off approximations thereof, within the scope of the invention unless otherwise specified.

What is claimed is:

1. A light emitting device comprising;

a. light sources oriented in back to back opposing directions;

b. an exterior envelope comprising optical splines and thermal splines;

c. a thermally conductive connection between light source and thermal spline;

d. an optical connection between each light source and optical spline which inputs light within the exterior envelope in an orientation substantially perpendicular to the output surface of the exterior envelope.

2. The light emitting device of claim 1 in which light sources are light emitting diodes.

3. The light emitting device of claim 1 in a light source may be an aggregate of smaller light emitting units.

4. The light emitting device of claim 1 wherein opposing light sources are positioned at or near a dividing plane that cross-sections the light emitting device.

5. The light emitting device of claim 1 wherein light sources are positioned on opposing sides of a circuit board.

6. The light emitting device of claim 1 wherein light sources are positioned on opposing sides an electrically patterned substrate.

7. The light emitting device of claim 1 wherein light sources are arranged in a pattern such that each light source is positioned having adjacent light sources oriented in opposing direction.

8. The light emitting device of claim 1 in which a thermally conductive connection between light source and thermal spline is formed along the optical axis of a light source.

9. The light emitting device of claim 1 in which an optical connection optical is aligned with a light source.

10. The light emitting device of claim 1 wherein multiple light sources are arranged in a radial pattern with alternating orientation in opposing direction.

11. The light emitting device of claim 1 wherein the device is in the shape of a bulb.

12. The light emitting device of claim 11 wherein opposing light sources are positioned at or near the largest diameter cross-section across the bulb shape.

13. The light emitting device of claim 1 in which optical and thermal splines are arranged in alternating sequence.

14. The light emitting device of claim 1 in which alternating patterns of optical and thermal splines are positioned on both sides of a dividing plane.

15. The light emitting device of claim 14 wherein alternating patterns of optical and thermal splines on opposing sides of a dividing plane are offset so optical splines of one opposing side are aligned with thermal splines of the other opposing side.

16. The light emitting device of claim 1 wherein luminous output from two opposing sides is adjusted to create a different light distribution.

* * * * *